United States Patent [19]
Ikeda et al.

[11] Patent Number: 5,963,204
[45] Date of Patent: Oct. 5, 1999

[54] ELECTRONIC CAMERA WITH REPRODUCTION AND DISPLAY OF IMAGES AT THE SAME TIMING

[75] Inventors: Osamu Ikeda, Yokohama; Norikazu Yokonuma, Tokyo; Kenji Toyoda, Chigasaki; Kazuyuki Kazami, Tokyo, all of Japan

[73] Assignee: Nikon Corporation, Tokyo, Japan

[21] Appl. No.: 08/934,074

[22] Filed: Sep. 19, 1997

[30] Foreign Application Priority Data

Sep. 20, 1996 [JP] Japan ................................. 8-250015
Sep. 26, 1996 [JP] Japan ................................. 8-254776

[51] Int. Cl.⁶ .......................... G06F 3/14; H04N 5/232
[52] U.S. Cl. ..................... 345/328; 345/348; 348/335; 358/906
[58] Field of Search ................................. 345/302, 327, 345/328, 348, 349, 354, 972, 977; 386/69, 70, 117; 348/333, 334, 341; 358/909.1, 906

[56] References Cited

U.S. PATENT DOCUMENTS

| | | | |
|---|---|---|---|
| 4,899,231 | 2/1990 | Maeda et al. ........................... | 360/33.1 |
| 5,353,391 | 10/1994 | Cohen et al. ........................... | 345/435 |
| 5,404,316 | 4/1995 | Klingler et al. ........................ | 345/328 |
| 5,500,743 | 3/1996 | Sakaegi et al. ......................... | 358/403 |
| 5,537,528 | 7/1996 | Takahashi et al. ...................... | 707/512 |
| 5,638,184 | 6/1997 | Fujimoto et al. ....................... | 386/112 |
| 5,664,087 | 9/1997 | Tani et al. .............................. | 345/437 |
| 5,828,986 | 10/1998 | Horigome et al. ..................... | 702/126 |

*Primary Examiner*—Raymond J. Bayerl
*Assistant Examiner*—Cuong T. Thai
*Attorney, Agent, or Firm*—Vorys, Sater, Seymour and Pease LLP

[57] ABSTRACT

An electronic camera with an image reproducing apparatus which starts concurrently reproducing a plurality of motion images at the same timing includes a display which displays on a screen a plurality of thumbnails (symbols) respectively corresponding to a plurality of motion images recorded on a recording medium, and a selector which selects some of the thumbnails displayed by the display in accordance with an external selecting operation. A reproducing device starts reproducing a plurality of motion images respectively corresponding to the thumbnails selected by the selector at the same timing in accordance with an external reproducing operation. The motion images reproduced by the reproducing device are displayed in the form of an array on the screen.

16 Claims, 44 Drawing Sheets

ELECTRONIC CAMERA WITH REPRODUCTION AND DISPLAY OF IMAGES AT THE SAME TIMING

BACKGROUND OF THE INVENTION

1. Field of the Invention

The present invention relates to an electronic camera having an image reproducing apparatus for performing simultaneous reproduction and, more particularly, to an image reproducing apparatus which displays a plurality of motion images (image files) by overlapping them in a nested form (i.e. in a manner in which an image is inset into another). In particular, the present invention relates to an image reproducing apparatus which starts concurrently reproducing a plurality of motion images at the same timing.

2. Related Background Art

Generally, an image reproducing apparatus for reproducing images from two tape media is known. In this image reproducing apparatus, one rotary head and the other rotary head are separated from each other. Therefore, while one rotary head is performing recording or reproduction, the other rotary head also performs recording or reproduction.

A current personal computer is also an apparatus for reproducing a plurality of motion images. A personal computer time-divisionally accesses motion image files recorded on a hard disk or the like and simultaneously reproduces a plurality of motion images.

Conventional image reproducing apparatuses, however, selectively reproduce one motion image and then selectively reproduce another motion image. Accordingly, a plurality of motion images cannot be started to be reproduced at the same timing.

Consequently, it is impossible to start reproducing two motion images at the same timing and compare these two images. For example, when a user wants to compare an image of his or her golf swing with an image of a sample swing, he or she cannot check the form by comparison if the two images are not started to be reproduced at the same timing.

Conventional image reproducing apparatuses merely reproduce a plurality of motion images and display the images on the screen at different timings. That is, a plurality of motion images have no relation (e.g., the display positions of the motion images or the timings of simultaneous reproduction) during reproduction or display. Consequently, the relationship between a plurality of motion images is unclear.

SUMMARY OF THE INVENTION

According to a first aspect of the present invention, to solve the above problems, the present invention has as its object to provide an image reproducing apparatus capable of starting reproducing a plurality of motion images at the same timing.

According to a second aspect of the present invention, in addition to the above object, the present invention has as its object to provide an image reproducing apparatus capable of efficiently using a screen display.

According to third and fourth aspects of the present invention, in addition to the above objects, the present invention has as its object to provide an image reproducing apparatus which omits the repetition of an operation of reproduction at the same timing.

According to fifth to seventh aspects of the present invention, in addition to the above objects, the present invention has as its object to provide an image reproducing apparatus capable of displaying motion images by comparing them more clearly.

According to eighth to eleventh aspects of the present invention, to solve the above problems, the present invention has as its object to provide an image reproducing apparatus capable of displaying a plurality of motion images by relating these motion images to each other.

According to twelfth to fourteenth aspects of the present invention, in addition to the object of the eighth to eleventh aspects, the present invention has as its object to provide an image reproducing apparatus which omits the repetition of an operation of concurrent reproduction.

More particularly, a first electronic camera embodiment of the invention comprises, in one portable unit:

a photoelectric convertor to convert an image into output electronic image information;

a recording medium to store the electronic image information as a motion image file;

a display to display a plurality of symbols respectively representing a plurality of the motion image files on a display screen;

a selecting device to select some of the symbols displayed by the display in accordance with an external selecting operation;

a reproducing device to reproduce motion image files respectively corresponding to the symbols selected by the selecting device at the same time in accordance with an external reproducing operation; and an array display device to display an array of the motion image files reproduced by said reproducing device on the display screen.

A second electronic camera embodiment of the invention comprises, in one portable unit:

a photoelectric convertor to convert an image into output electronic image information;

a recording medium to store the electronic image information as a motion image file;

a display to display a plurality of symbols respectively representing a plurality of the motion image files on a display screen;

a selecting device to select some of the symbols displayed by the display in accordance with an external selecting operation;

a reproducing device to reproduce motion image files respectively corresponding to the symbols selected by the selecting device concurrently in accordance with an external selecting operation;

a reproducing device to reproduce motion image files respectively corresponding to the symbols selected by the selecting device concurrently in accordance with an external reproducing operation; and a synthetical display device to synthetically display the motion image files concurrently reproduced by the reproducing device by overlapping the images in a nested form on the display screen.

FIG. 1 is a block diagram showing the principle of the first, second, and fifth aspects of the present invention.

The first aspect of the present invention comprises display means 1 for displaying on a screen a plurality of thumbnails (symbols) respectively corresponding to a plurality of motion images recorded on a recording medium, selecting means 2 for selecting some of the thumbnails displayed by the display means 1 in accordance with an external selecting operation, reproducing means 3 for starting reproducing motion images respectively corresponding to the thumbnails selected by the selecting means 2 at the same timing in accordance with an external reproducing operation, and array display means 4 for displaying an array of the motion images reproduced by the reproducing means 3 on the screen.

This image reproducing apparatus displays thumbnails of motion images. Thumbnails are images displayed in the form of a list. The display means 1 reads an image (to be referred to as a "thumbnail image" hereinafter) to be displayed as a thumbnail for each of a plurality of motion images recorded on a recording medium, and displays these thumbnails in the form of a list. An operator selects motion images he or she wants to reproduce by using the selecting means 2. When a reproducing operation is performed, the reproducing means 3 concurrently reproduces the selected motion images at the same timing. The array display means 4 displays an array of the reproduced motion images on the screen. Note that sounds can also be added to these motion images. If this is the case, it is possible to reproduce a plurality of sounds at the same timing together with motion images or reproduce only a plurality of sounds at the same timing without reproducing motion images.

The image reproducing apparatus of the first aspect can concurrently reproduce a plurality of motion images accurately at the same timing with a simple operation. Accordingly, in reproducing a plurality of motion images and comparing them, e.g., in presentation, the performances of two products can be clearly compared by reproducing motion images of the two products at the same timing.

The invention of the second aspect is the apparatus of the above first aspect, wherein the array display means 4 changes display regions of motion images to be displayed in the form of an array in accordance with the number of motion images to be reproduced by the reproducing means 3. In this image reproducing apparatus, the array display means 4 automatically changes display regions of motion images in accordance with the number of motion images to be reproduced by the reproducing means 3.

The image reproducing apparatus of the second aspect automatically changes display regions of motion images in accordance with the number of motion images to be reproduced. Therefore, large motion images are constantly displayed, and this improves the visibility to an operator. In other words, the display space can be effectively used.

FIG. 2 is a block diagram showing the principle of the third aspect of the present invention. The invention of the third aspect is the image reproducing apparatus of the first or second aspect, further comprising reproduction information storage means 5 for storing identification information for identifying a plurality of motion images to be reproduced by the reproducing means 3, wherein the reproducing means 3 concurrently reproduces a plurality of motion images corresponding to the identification information in accordance with a calling operation for the identification information stored in the reproduction information storage means 5. In this image reproducing apparatus, the reproduction information storage means 5 stores the identification information (e.g., the file name, the recording date, the identification code, and the file size) of each of a plurality of motion images to be reproduced by the reproducing means 3. When an identification information calling operation is performed, the identification information stored in the reproduction information storage means 5 is transmitted to the reproducing means 3. The reproducing means 3 concurrently reproduces motion images corresponding to the identification information at the same timing.

In the image reproducing apparatus of the third aspect, the reproduction information storage means stores the identification information of motion images reproduced at the same timing. Therefore, once a certain scene is stored, an operator can call and regenerate the scene with a simple operation whenever he or she wants. This is particularly very effective when the operator wants to repetitively see the scene because he or she need not repeat the operation of concurrent reproduction at the same timing.

FIG. 3 is a block diagram showing the principle of the fourth aspect of the present invention. The invention of the fourth aspect is the image reproducing apparatus of the third aspect, wherein the reproduction information storage means 5 stores, in addition to the identification information, a reproduction state indicating a way each of the motion images is reproduced the last time, and the reproducing means 3 regenerates the reproduction state stored in the reproduction information storage means 5 for each of the motion images in accordance with the calling operation. In this image reproducing apparatus, the reproduction information storage means 5 stores the reproduction state indicating the way a motion image is reproduced in addition to the identification information. When an identification information calling operation is performed, the reproducing means 3 regenerates the reproduction state and reproduces a motion image.

In the image reproducing apparatus of the fourth aspect, the reproduction information storage means also stores the reproduction states of a plurality of motion images. Therefore, an operator can regenerate the reproduction states with a simple operation.

The invention of the fifth aspect is the image reproducing apparatus of any of the above aspects, wherein when two thumbnails are selected by the selecting means 2, the display means 1 switches display positions of the two thumbnails. In this image reproducing apparatus, when two thumbnails are selected by the selecting means 2, the display positions of these thumbnails are switched.

The image reproducing apparatus of the fifth aspect can switch two thumbnails with a simple operation. Accordingly, by freely arranging thumbnails, an operator can display a plurality of motion images by effectively comparing them in concurrent reproduction at the same timing.

FIG. 4 is a block diagram showing the principle of the sixth and seventh aspects of the present invention. The invention of the sixth aspect is the image reproducing apparatus of the invention of any of the above aspects, further comprising screen operating means 6 for accepting an operation on the screen, wherein the display means 1 moves a thumbnail corresponding to a start position of an operation accepted by the screen operating means 6 to an end position of the operation, and, if the end position is present between two thumbnails on the screen, displays the moved thumbnail between the two thumbnails to rearrange the thumbnails on the screen. In this image reproducing apparatus, when an operator starts operating a thumbnail on the screen, a thumbnail corresponding to the start position of the operation is moved following the operation. If the end position of the operation is present between two thumbnails on the screen, the display means 1 inserts the moved thumbnail between these two thumbnails to rearrange the thumbnails on the screen.

The invention of the seventh aspect is the image reproducing apparatus of the invention of any of the above aspects, wherein the operation on the screen is a drag-and-drop operation. In this image reproducing apparatus, when an operator starts a drag operation for a thumbnail on the screen, a thumbnail corresponding to the start point of the drag operation is moved following the drag operation. If a drop operation is performed between two thumbnails on the screen, the display means 1 inserts the moved thumbnail between these two thumbnails to rearrange the thumbnails on the screen.

The image reproducing apparatuses of the sixth and seventh aspects can freely rearrange thumbnails. Therefore, by freely rearranging thumbnails, an operator can reproduce and display a plurality of motion images so that the images are compared more clearly.

As described above, the image reproducing apparatuses according to the present invention can reliably and accurately reproduce a plurality of motion images concurrently at the same timing.

FIG. 29 is a block diagram showing the principle of the inventions of the eighth to eleventh aspects.

The invention of the eighth aspect comprises list display means 101 for displaying on a screen a list of thumbnails respectively corresponding to a plurality of motion images recorded on a recording medium, selecting means 102 for selecting some of the thumbnails displayed by the list display means 101 in accordance with an external selecting operation, reproducing means 103 for concurrently reproducing motion images respectively corresponding to the thumbnails selected by the selecting means 102 in accordance with an external reproducing operation, and synthetical display means 104 for synthetically displaying the motion images concurrently reproduced by the reproducing means 103 by overlapping the images in a nested form (i.e. in a manner in which an image is inset into another).

This image reproducing apparatus displays thumbnails of motion images on the screen display. A thumbnail is an image formed by reducing an original image so that a plurality of images are displayed in the form of a list. The list display means 101 reads an image to be displayed as a thumbnail for each of a plurality of motion images recorded on a recording medium, and displays a list of the images. An operator selects motion images he or she wants to reproduce by using the selecting means 102. When a reproducing operation is performed, the reproducing means 103 sequentially or simultaneously reproduces the selected motion images. The synthetical display means 104 synthetically displays the concurrently reproduced motion images by overlapping the images in a nested form. A "nested form" means the state in which a plurality of motion images overlap each other such that the display area of an overlying motion image is smaller than the display area of an underlying motion image. Note that sounds can also be added to these motion images. If this is the case, it is possible to reproduce a plurality of sounds together with motion images or reproduce only a plurality of sounds without reproducing motion images.

This image reproducing apparatus can display a plurality of motion images by overlapping them in a nested form. Therefore, an interesting image can be displayed by relating motion images displayed in an overlapped state. For example, a motion image of a landscape and a motion image of a person taken in another location can be concurrently reproduced by insetting the person image into the landscape image and synthetically displaying them on the screen. Consequently, a very interesting image can be created.

The invention of the ninth aspect is the image reproducing apparatus of the eighth aspect, wherein the reproducing means 103 starts concurrently reproducing the motion images at the same timing. In this image reproducing apparatus, the reproducing means 103 starts concurrently reproducing a plurality of motion images at the same timing.

This image reproducing apparatus can start concurrently reproducing a plurality of motion images at the same timing. Therefore, a plurality of motion images simultaneously start moving in an overlapped state, and this makes complicated and varied reproduction feasible. Consequently, an interesting image can be created.

The invention of the tenth aspect is the image reproducing apparatus of the eighth or ninth aspect, wherein the synthetical display means 104 displays at least one of the motion images concurrently reproduced by the reproducing means 103 as a still image by repetitively displaying one predetermined frame or field constituting the motion image. In this image reproducing apparatus, the synthetical display means 104 displays at least one of a plurality of concurrently reproduced motion images as a still image.

This image reproducing apparatus can display at least one motion image as a still image. Accordingly, a motion image and a still image can be displayed while being compared with each other.

The invention of the eleventh aspect is the image reproducing apparatus of the eighth to tenth aspects, wherein the synthetical display means 104 displays a boundary of two motion images synthetically displayed on the screen in a predetermined form other than a rectangle. In this image reproducing apparatus, the synthetical display means 104 displays the boundary of two of a plurality of motion images overlapped in a nested form in various shapes other than a rectangle. That is, the display frame of an overlying motion image is changed into various shapes.

This image reproducing apparatus can display the display frame of a motion image in various shapes other than a rectangle. Therefore, it is possible to display a motion image of an ocean as a background and display a motion image to be overlapped on the background in the form of, e.g., a yacht, rather than a rectangle. Consequently, an interesting image can be created.

FIG. 30 is a block diagram showing the principle of the invention of the twelfth aspect. The invention of the twelfth aspect is the image reproducing apparatus of the eighth to eleventh aspects, further comprising reproduction information storage means 105 for storing identification information for identifying a plurality of motion images to be concurrently reproduced by the reproducing means 103, wherein the reproducing means 103 concurrently reproduces a plurality of motion images corresponding to the identification information in accordance with a calling operation for the identification information stored in the reproduction information storage means 105. In this image reproducing apparatus, the reproduction information storage means 105 stores the identification information (e.g., the file name, the recording date, and the identification code) of each of a plurality of motion images to be reproduced by the reproducing means 103. When an identification information calling operation is performed, the identification information stored in the reproduction information storage means 105 is transmitted to the reproducing means 103. The reproducing means 103 concurrently reproduces a plurality of motion images corresponding to the identification information.

FIG. 31 is a block diagram showing the principle of the inventions of the thirteenth and fourteenth aspects. The invention of the thirteenth aspect is the image reproducing apparatus of the twelfth aspect, wherein the reproduction information storage means 105 stores, in addition to the identification information, a reproduction state indicating a way each of the motion images is reproduced the last time, and, when the reproduction state is stored in the reproduction information storage means 105, the reproducing means 103 regenerates the reproduction state of each of the motion images in accordance with the calling operation. In this image reproducing apparatus, the reproduction information storage means 105 stores, in addition to the identification information, a reproduction state indicating the way a motion image is reproduced the last time. When a calling operation is performed, the reproducing means 103 regenerates the reproduction state and reproduces the motion image.

The invention of the fourteenth aspect is the image reproducing apparatus of the twelfth aspect, wherein the reproduction information storage means 105 stores, in addition to the identification information, a display state indicating a way each of the motion images is displayed the last time, and, when the display state is stored in the reproduction information storage means 105, the synthetical display means 104 regenerates the display state of each of the motion images in accordance with the calling operation. In this image reproducing apparatus, the reproduction information storage means 105 stores, in addition to the identification information, a display state indicating the way a motion image is displayed the last time. When a calling operation is performed, the synthetical display means 104 regenerates the display state and reproduces the motion image.

In the image reproducing apparatuses of the twelfth to fourteenth aspects, the reproduction information storage means stores the identification information, reproduction state, or display state of a reproduced motion image. Therefore, once a certain scene is stored, an operator can call and regenerate the scene with a simple operation whenever he or she wants. This is particularly very effective when the operator wants to repetitively see the scene because he or she need not repeat the operation of concurrent reproduction at the same timing.

As described above, the image reproducing apparatuses according to the present invention can create a new image work and instantaneously call and reproduce the image without repeating a reproducing operation.

DETAILED DESCRIPTION OF THE PREFERRED EMBODIMENTS

Embodiments of the present invention will be described below with reference to the accompanying drawings.

Figure 1:
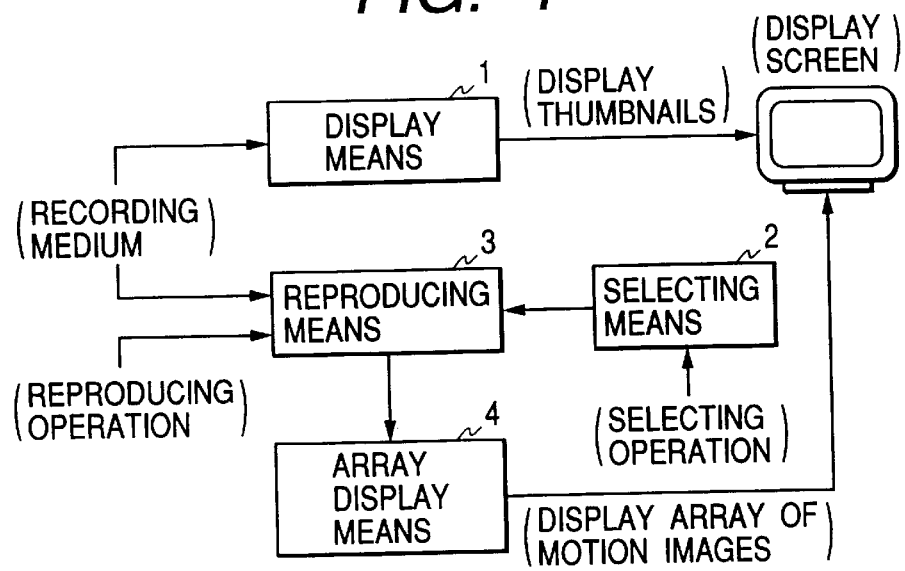
FIG. 1 is a block diagram for explaining the principle of the first, second, and fifth aspects of the present invention.
Figure 2:
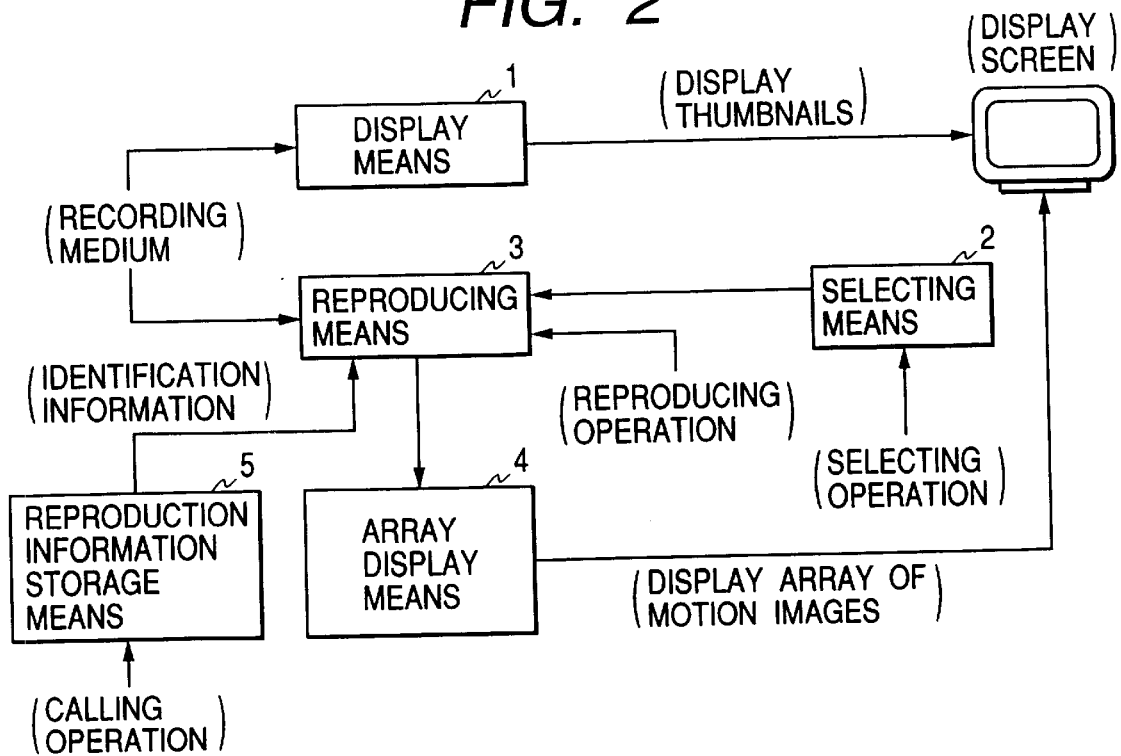
FIG. 2 is a block diagram for explaining the principle of the third aspect of the present invention.
Figure 3:
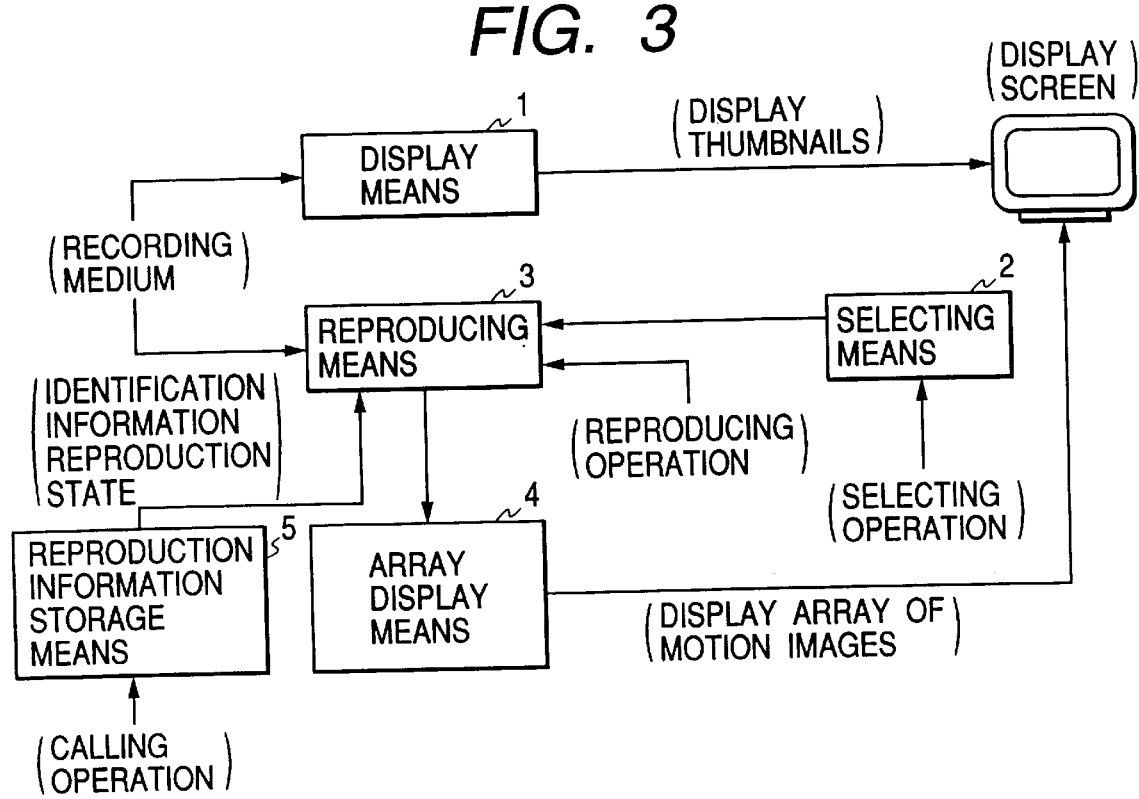
FIG. 3 is a block diagram for explaining the principle of the fourth aspect of the present invention.
Figure 4:
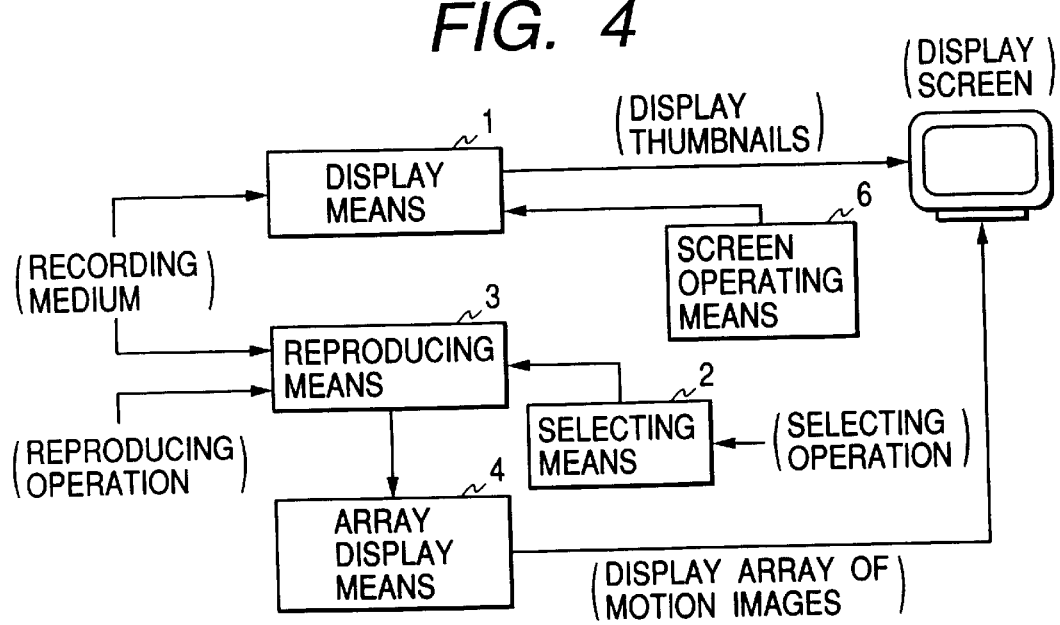
FIG. 4 is a block diagram for explaining the principle of the sixth and seventh aspects of the present invention.
Figure 5:
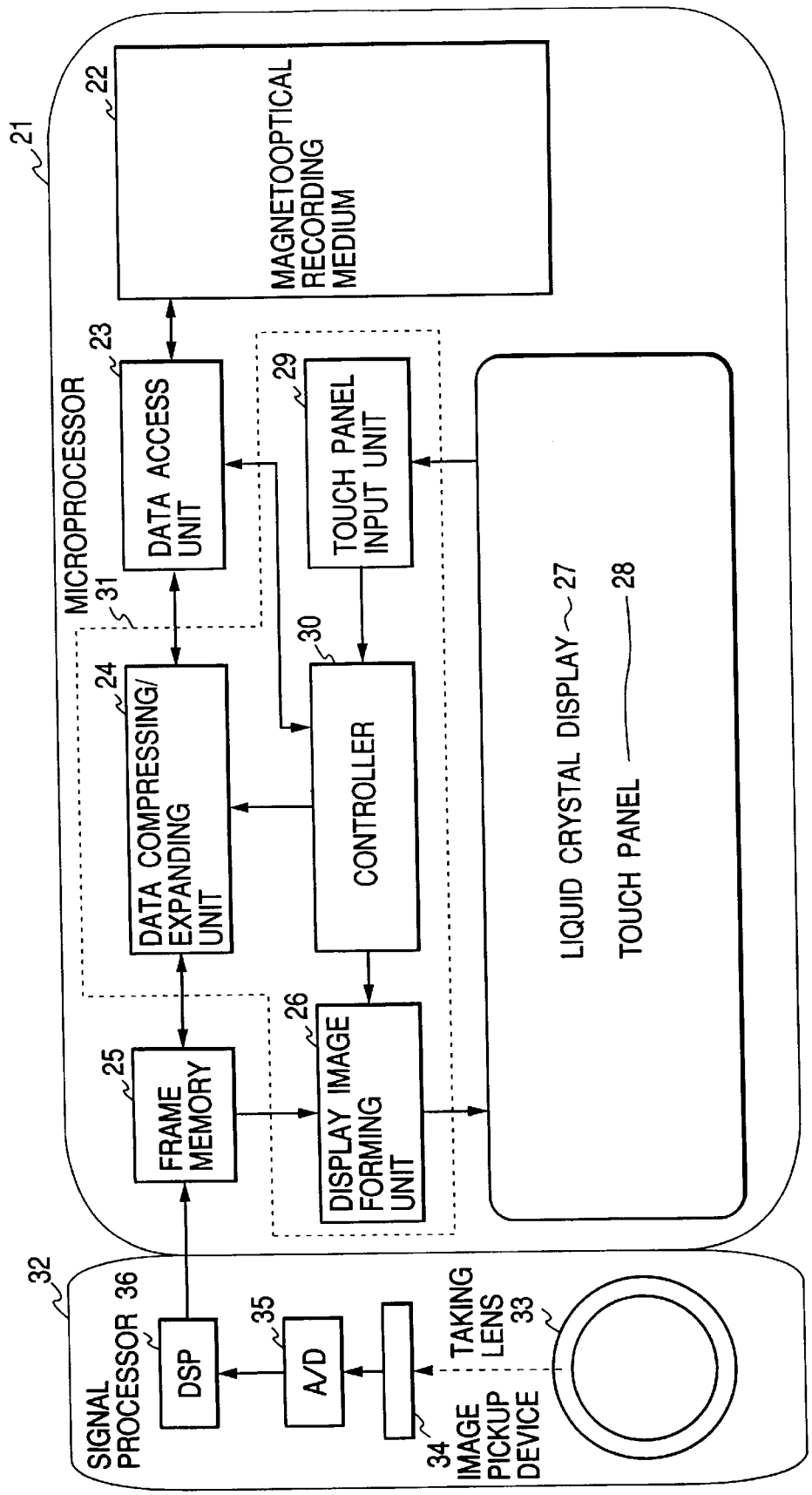
FIG. 5 is a functional block diagram of the first embodiment of the present invention in an electronic camera.

FIG. 5 is a functional block diagram of an electronic camera embodiment (corresponding to the first to seventh aspects of the present invention) of the present invention.

Referring to FIG. 5, a magnetooptical recording medium 22 is detachably loaded in a main body 21.

A data access unit 23 for performing read and write operations to the magnetooptical recording medium 22 is connected to a frame memory 25 via a data compressing/expanding unit 24. An output from the frame memory 25 is applied to a liquid crystal display 27 via a display image forming unit 26.

A touch panel 28 is attached to the liquid crystal display 27. Position information detected by the touch panel 28 is input to a controller 30 via a touch panel input unit 29.

A control output from the controller 30 is input to the data compressing/expanding unit 24 and the display image forming unit 26. The output from the controller 30 is also connected to the data access unit 23.

The functions of the data compressing/expanding unit 24, the display image forming unit 26, the touch panel input unit 29, and the controller 30 are realized by a microprocessor 31.

A camera unit 32 of the main body 21 includes a taking lens 33. An image pickup device 34 is arranged in a position where an image of an object obtained through the taking lens 33 is received.

An output signal from the image pickup device 34 is input to the frame memory 25 via an A/D converter 35 and a signal processor (digital signal processor) 36.

The correspondence of the components of the first, second, and fifth aspects of the present invention previously briefly described with the components of this embodiment is as follows. The display means 1 corresponds to the function of causing the data access unit 23, the data compressing/expanding unit 24, the frame memory 25, and the display image forming unit 26 to acquire or form thumbnails and display them in the form of a list. The selecting means 2 corresponds to the touch panel 28 and the touch panel input unit 29. The reproducing means 3 corresponds to the data compressing/expanding unit 24, the touch panel input unit 29, and the controller 30. The array display means 4 corresponds to the function of synthetically displaying a reproduced image of the display image forming unit 26.

The correspondence of the components of the third and fourth aspects of the present invention to the components of this embodiment is, in addition to the above correspondence, that the reproduction information storage means 5 corresponds to the magnetooptical recording medium 22, the data access unit 23, and the controller 30.

The correspondence of the components of the sixth and seventh aspects of the present invention to the components of this embodiment is, in addition to the above correspondence, that the screen operating means 6 corresponds to the touch panel 28 and the touch panel input unit 29.

Figure 6:
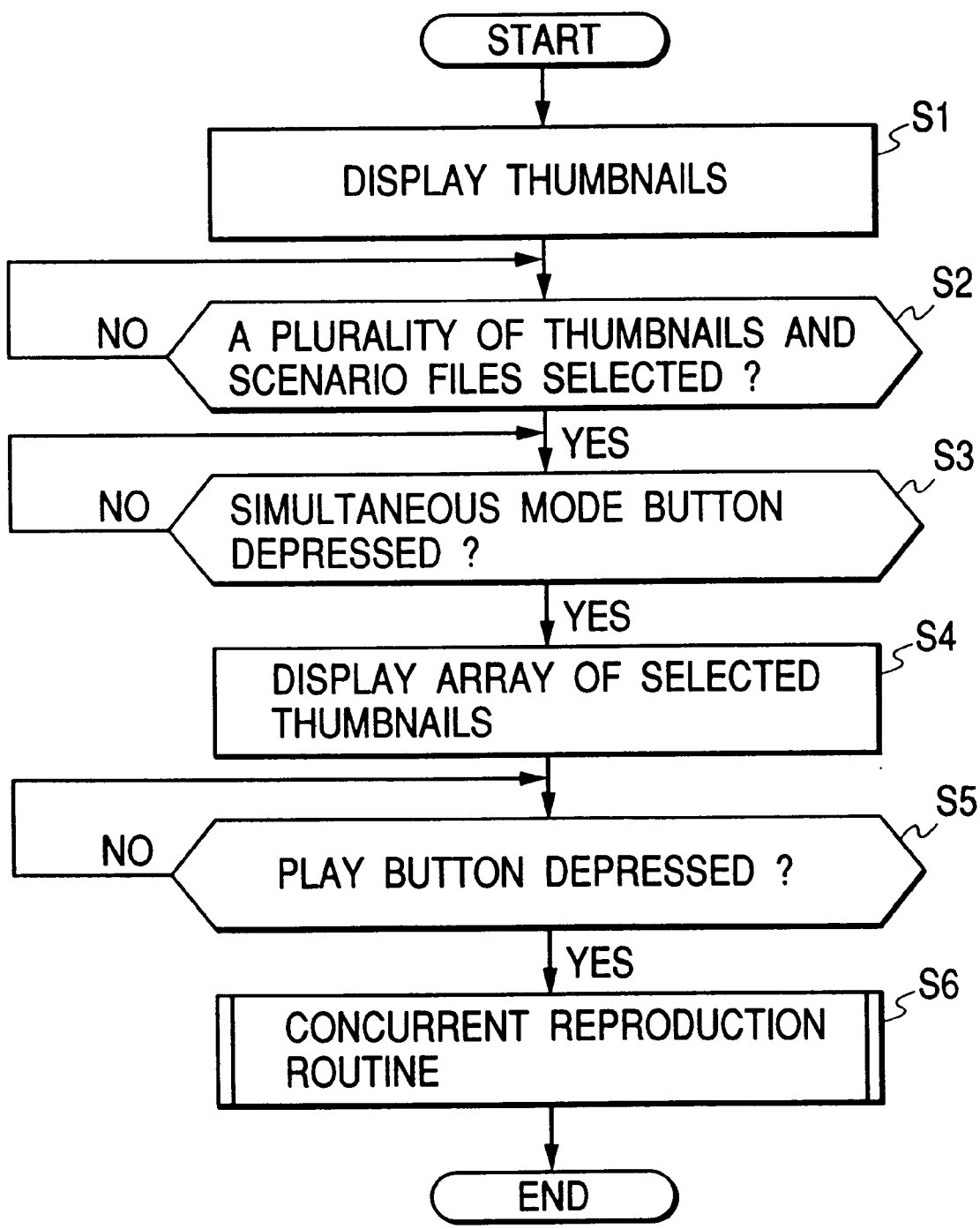
FIG. 6 is a flow chart for explaining the operation of the first embodiment of the present invention.

The operation of this embodiment will be described below with reference to FIGS. 6 and 7 as flow charts for explaining the operation of this embodiment and FIGS. 8 to 17 as views for explaining thumbnail screen displays.

When the magnetooptical recording medium 22 is loaded in the main body 21, the data access unit 23 reads the first scenes of a plurality of motion images recorded in the magnetooptical recording medium 22. The display image forming unit 26 forms thumbnails on the basis of these image data and displays a list on the liquid crystal display 27 (step S1 in FIG. 6).

Figure 8:
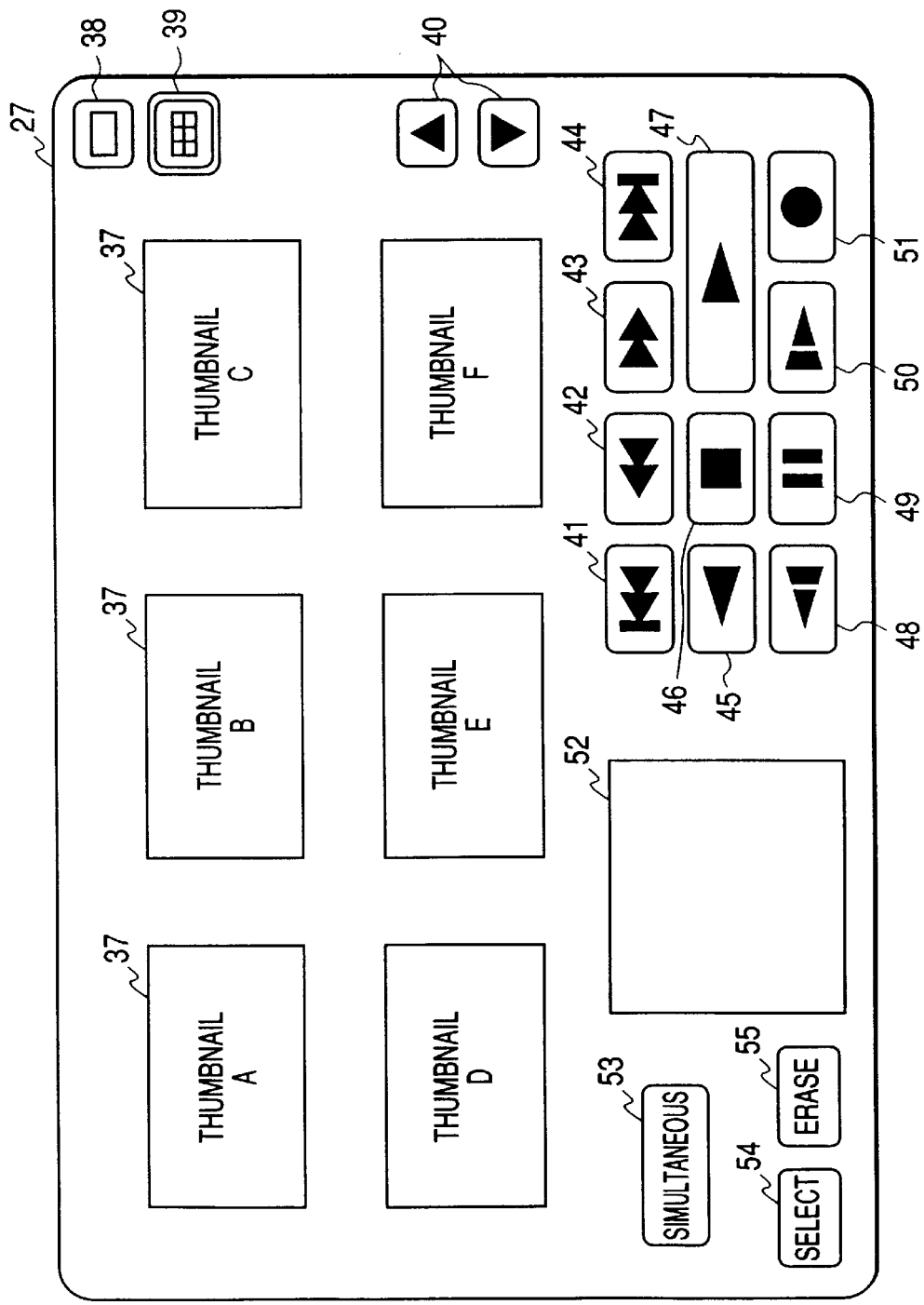
FIG. 8 is a view for explaining an initial thumbnail screen display.

FIG. 8 is a view for explaining an initial display screen on the liquid crystal display 27.

A list of thumbnails 37 is displayed on the screen of the liquid crystal display 27. A standard size button 38 and a thumbnail display button 39 are arranged in the upper right corner of the liquid crystal display 27. Scroll buttons 40 for scrolling the thumbnails 37 are arranged below the buttons 38 and 39.

Operation buttons for recording and reproduction are arranged in the lower right portion of the liquid crystal display 27. That is, a reverse skip button 41, a fast rewind button 42, fast forward button 43, a skip button 44, a reverse play button 45, a stop button 46, a play button 47, a slow reverse button 48, a pause button 49, a slow forward button 50, and a record button 51 are arranged in this order from the upper left one.

A selected scenario display window 52, a simultaneous mode button 53, a select button 54, and an erase button 55 are arranged to the left of the operation buttons.

When any of these operation buttons is operated, the operated button is highlighted to indicate its operating state.

Note that the arrangement of these operation buttons can be changed by a drag-and-drop operation. Note also that buttons which cannot be operated depending on a condition can be displayed as halftone buttons.

Figure 9:
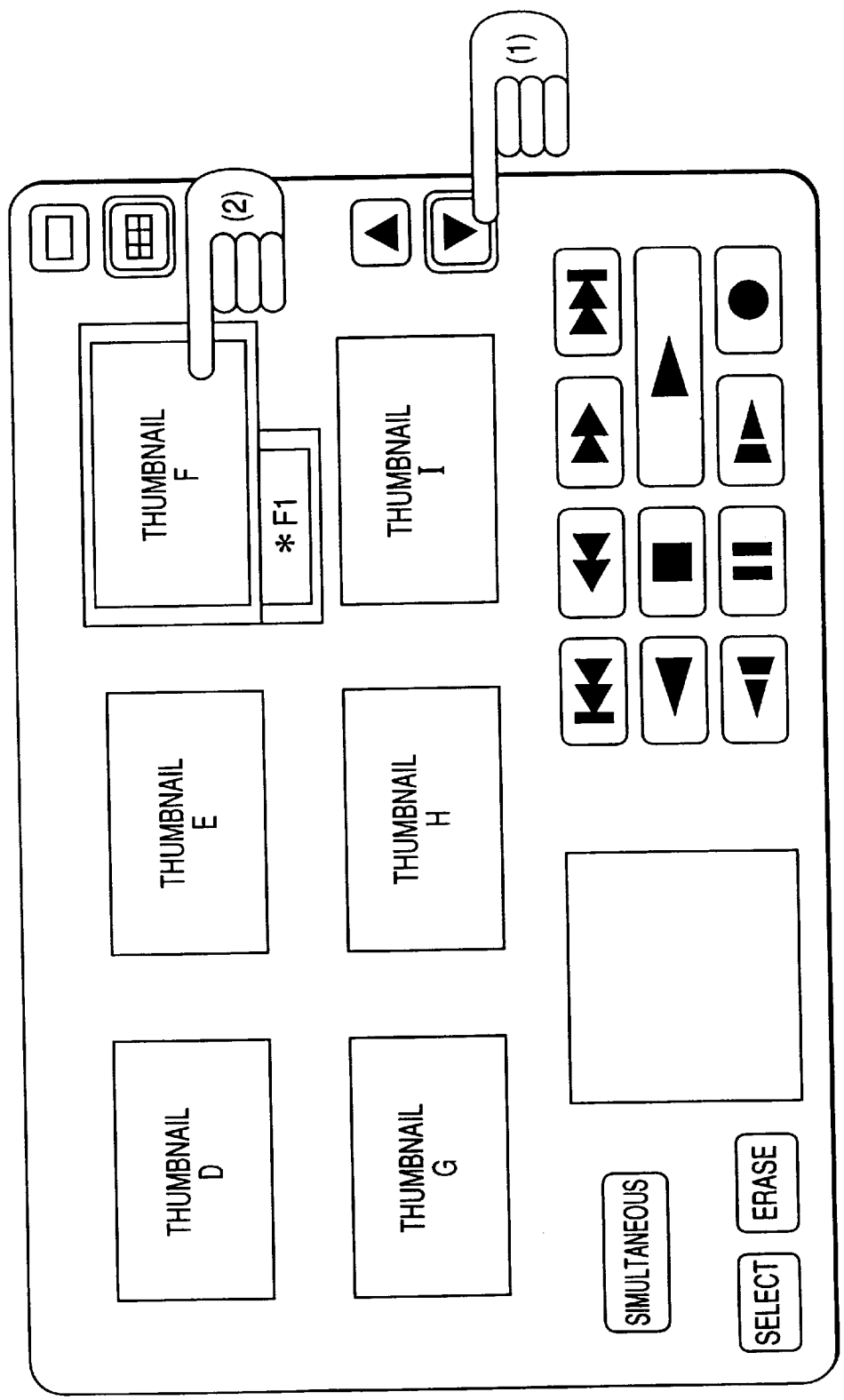
FIG. 9 is a view for explaining a thumbnail screen display for scroll.

When the scroll button 40 is touched (operation 1) as shown in FIG. 9, the display image forming unit 26 scrolls the screen display. In this embodiment, motion images A to P are recorded on the magnetooptical recording medium 22, and the display image forming unit 26 displays thumbnails corresponding to these motion images as thumbnails A to P.

An operator performs all operations via the touch panel 28 by using a GUI (Graphical User Interface) as a well-known technology or the like.

That is, the liquid crystal display 27 displays the thumbnails and operation buttons as objects, and the touch panel 28 and the touch panel input unit 29 sense a touch of an operator to these objects.

In accordance with this touch, the controller 30 generates a message related to the object on the screen. The display image forming unit 26 acquires the message and changes the screen display or the like. A description of this part of the operation will be omitted.

When a thumbnail is touched, the microprocessor 31 detects that the thumbnail and a motion image corresponding to the thumbnail are selected, and highlights the thumbnail.

The selected motion image is added with a scenario file which indicates in the form of data the way the motion image is to be reproduced (e.g., slow reproduction, fast-forward reproduction, fade-in fade-out reproduction, or the size of a display region). This scenario file is added to, e.g., the header of each motion image file and recorded on the magnetooptical recording medium 22. Note that this scenario file corresponds to the identification information according to the third aspect and the reproduction state according to the fourth aspect of the present invention.

In this embodiment, as shown in FIG. 9, a thumbnail F is selected (operation 2), and F1 is displayed as a scenario file.

If the highlighted thumbnail is again touched, the microprocessor 31 detects the operation and displays a list of scenario files of motion images.

The microprocessor 31 checks whether a touch operation is performed on the scenario file list display region and the thumbnail, and detects a scenario file selected by the operator.

Figure 10:
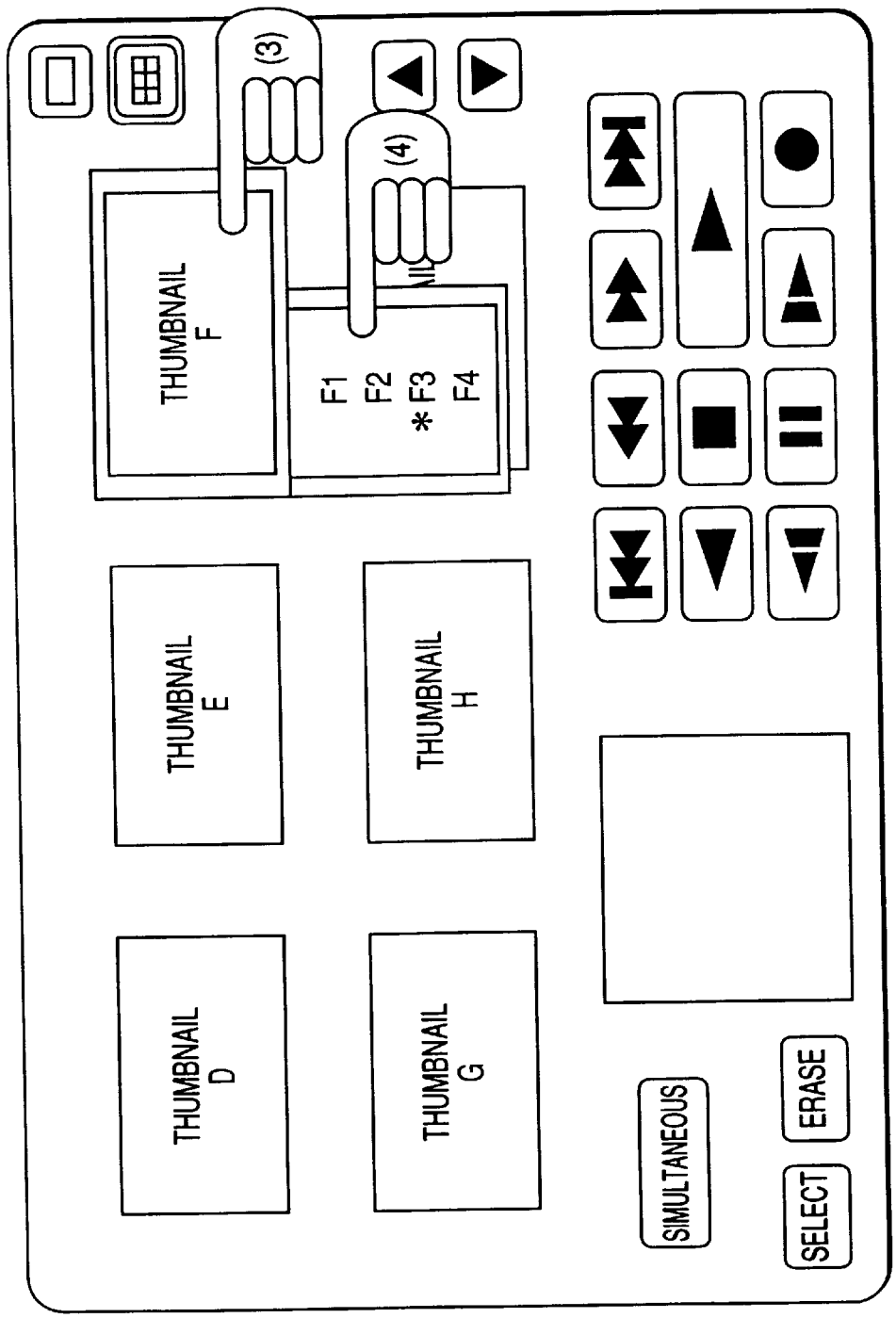
FIG. 10 is a view for explaining a thumbnail screen display for displaying a scenario file list.

For example, if the thumbnail F is touched as shown in FIG. 10 (operation 3), the microprocessor 31 displays a list of F1 to F4 as scenario files.

When a touch operation is performed in the scenario file list display region (operation 4), the microprocessor 31 sequentially moves a symbol * downward on the display. If the touch operation is repeated, the microprocessor 31 returns the symbol * on the display.

If the thumbnail F is again touched when the symbol * is displayed beside F3 (operation 5), the microprocessor 31 detects that F3 is determined as a scenario file.

Additionally, if the select button 54 is touched, the microprocessor 31 detects that the determined scenario file is selected, and displays the scenario file in the selected scenario display window 52.

Figure 11:
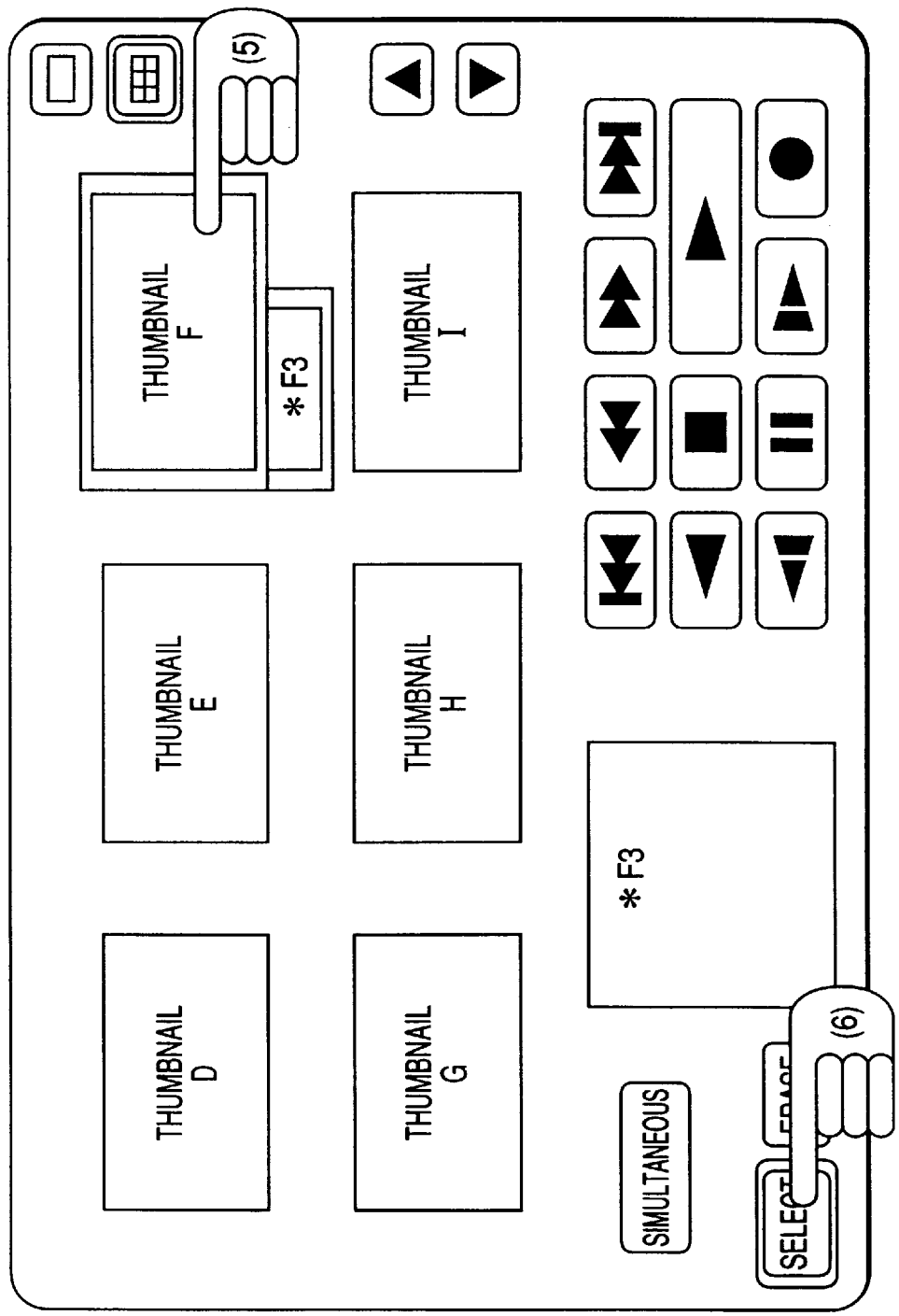
FIG. 11 is a view for explaining a thumbnail screen display for selecting a scenario file.

If the select button 54 is touched (operation 6) as shown in FIG. 11, the microprocessor 31 displays the scenario file F3 of the motion image F in the selected scenario display window 52. Note that even if operation 6 is performed without performing operation 5, the microprocessor 31 detects that the scenario file is selected.

Figure 12:
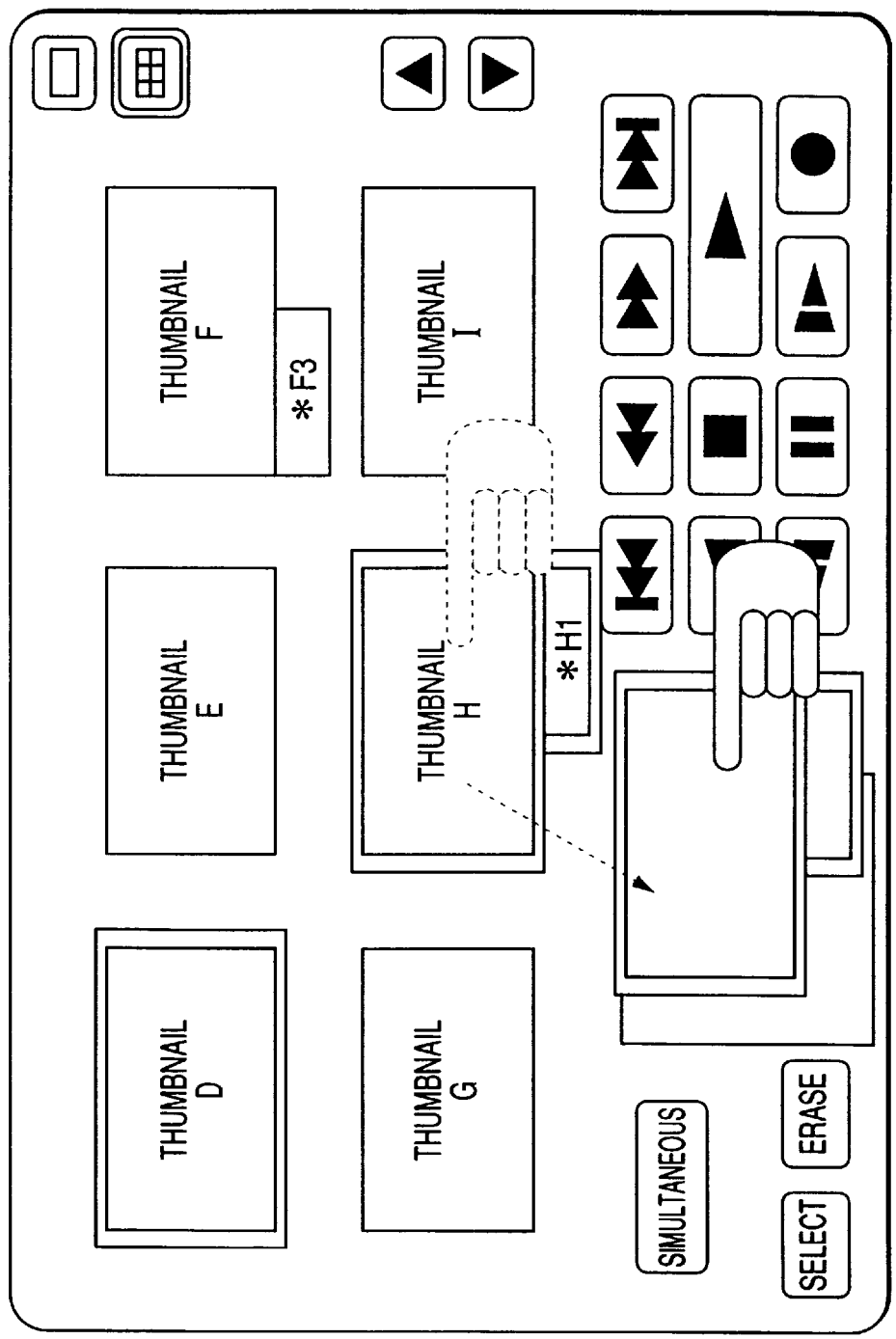
FIG. 12 is a view for explaining the thumbnail screen display for selecting a scenario file.

The following method is also usable as the method of selection. As shown in FIG. 12, when the operator drags (touches the touch panel 28 and moves) a thumbnail H, the microprocessor 31 moves the thumbnail H following the finger of the operator. When the operator performs a drop operation (releases the finger from the touch panel 28) in the selected scenario display window 52, the microprocessor 31 detects that a scenario file H1 is selected, and displays the scenario file H1 in the selected scenario display window 52.

The microprocessor 31 displays a scenario file list in a portion below the left side of each thumbnail in the first column, and in a portion below the right side of each thumbnail in the second column. Therefore, the displayed scenario file lists do not overlap each other.

Figure 13:
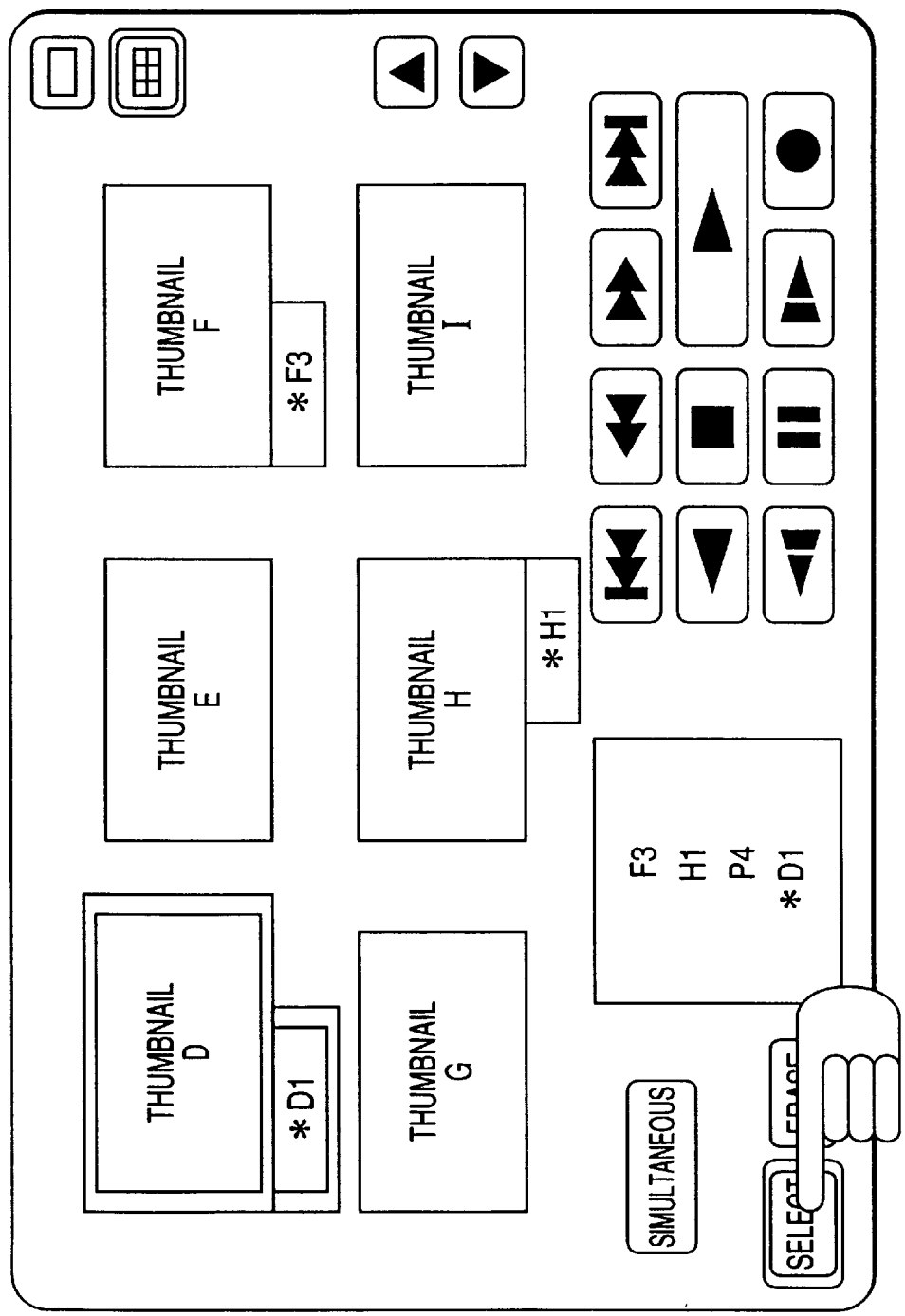
FIG. 13 is a view for explaining the thumbnail screen display for selecting a scenario file.

FIG. 13 is a view showing the state in which scenario files P4 and D1 are also similarly selected.

Figure 14:
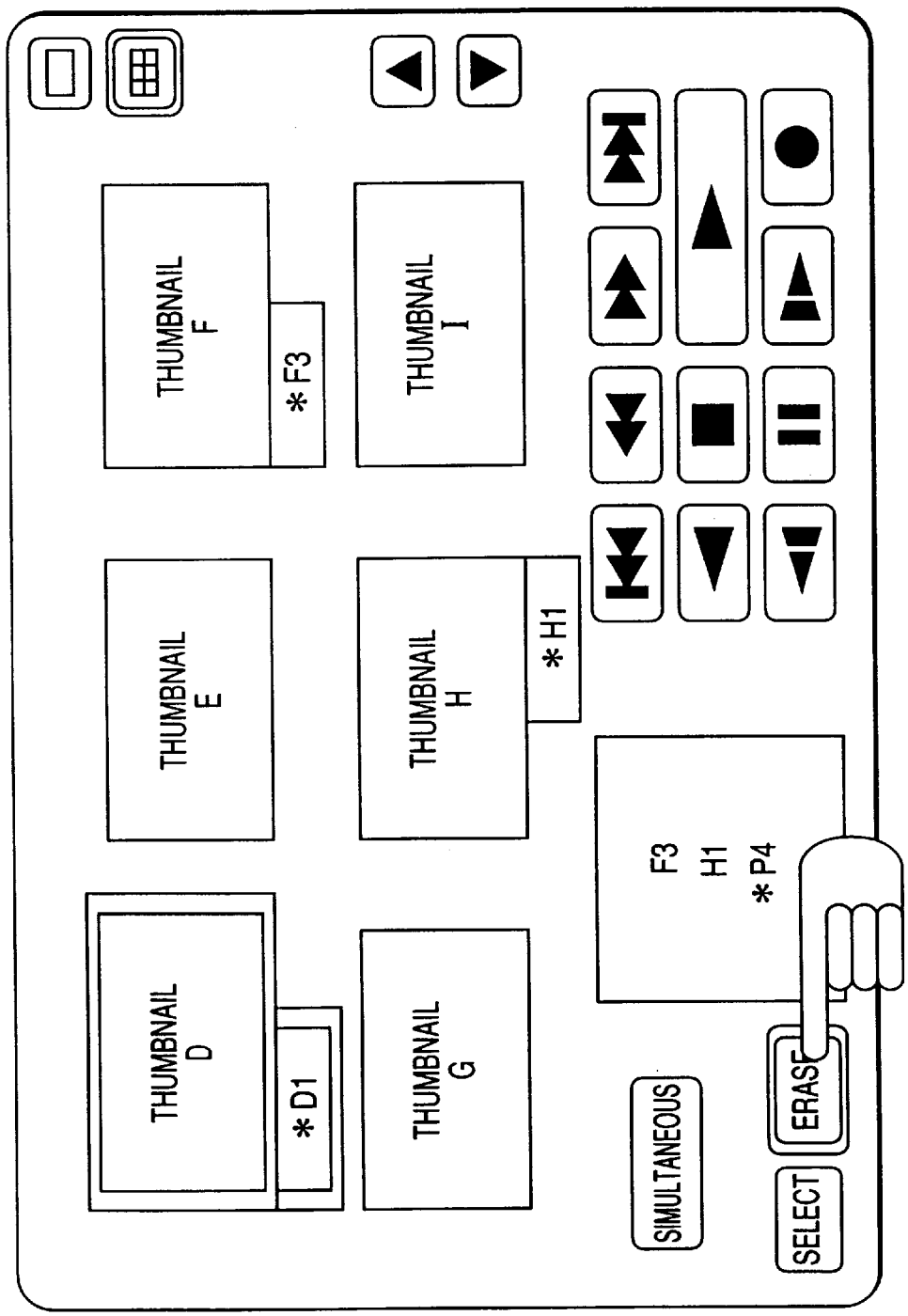
FIG. 14 is a view for explaining a thumbnail screen display for canceling selection.

If the erase button 55 is touched in this state, the microprocessor 31 cancels the selection of the scenario file (in this case D1) on the side of which the symbol * is displayed in the selected scenario display window 52. As shown in FIG. 14, the microprocessor 31 erases this scenario file from the selected scenario display window 52.

Figure 15:
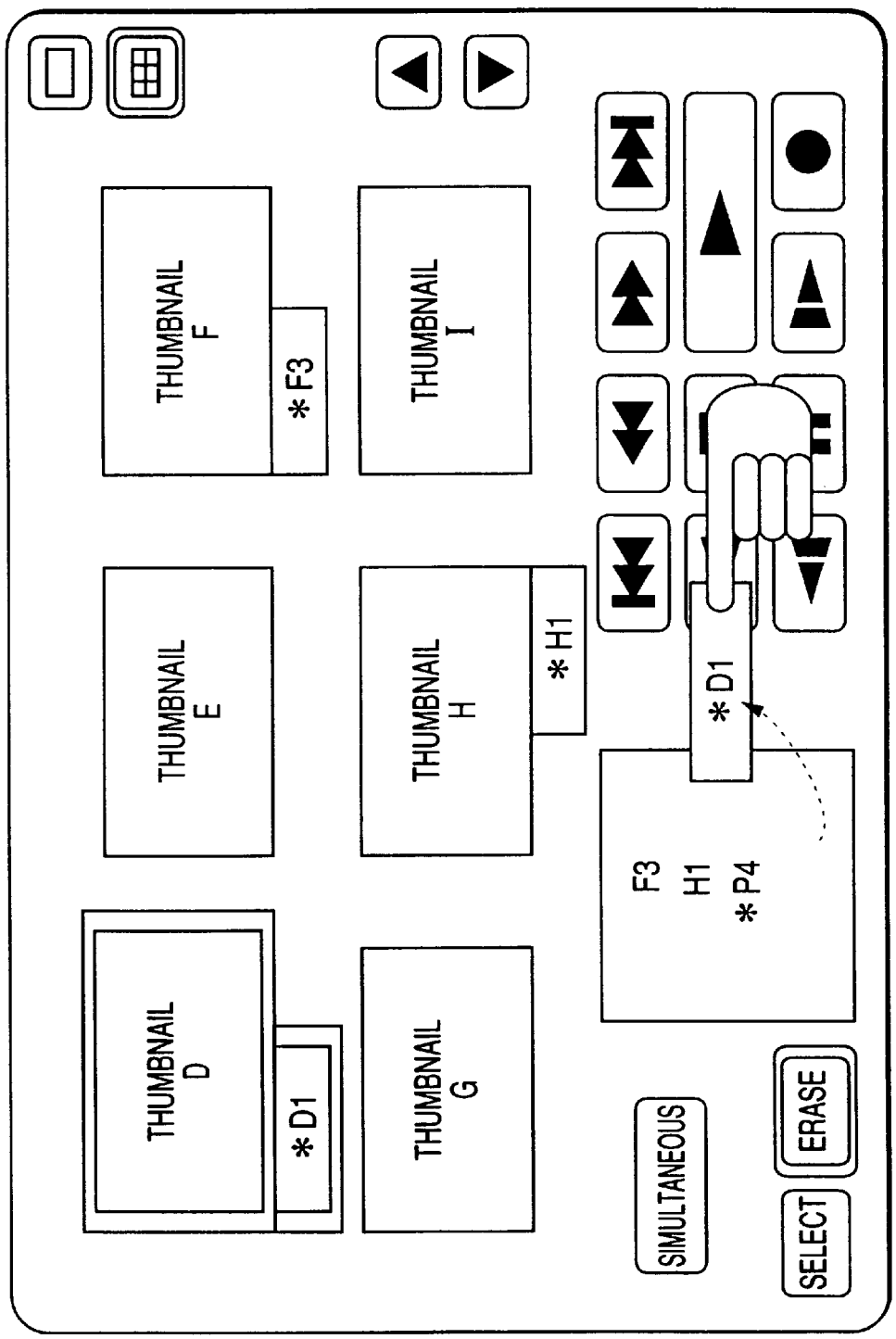
FIG. 15 is a view for explaining the thumbnail screen display for canceling selection.

In another erase method, as shown in FIG. 15, when the operator moves the scenario file D1 outside the selected scenario display window 52 by drag-and-drop, the microprocessor 31 erases this scenario file from the selected scenario display window 52.

Figure 16:
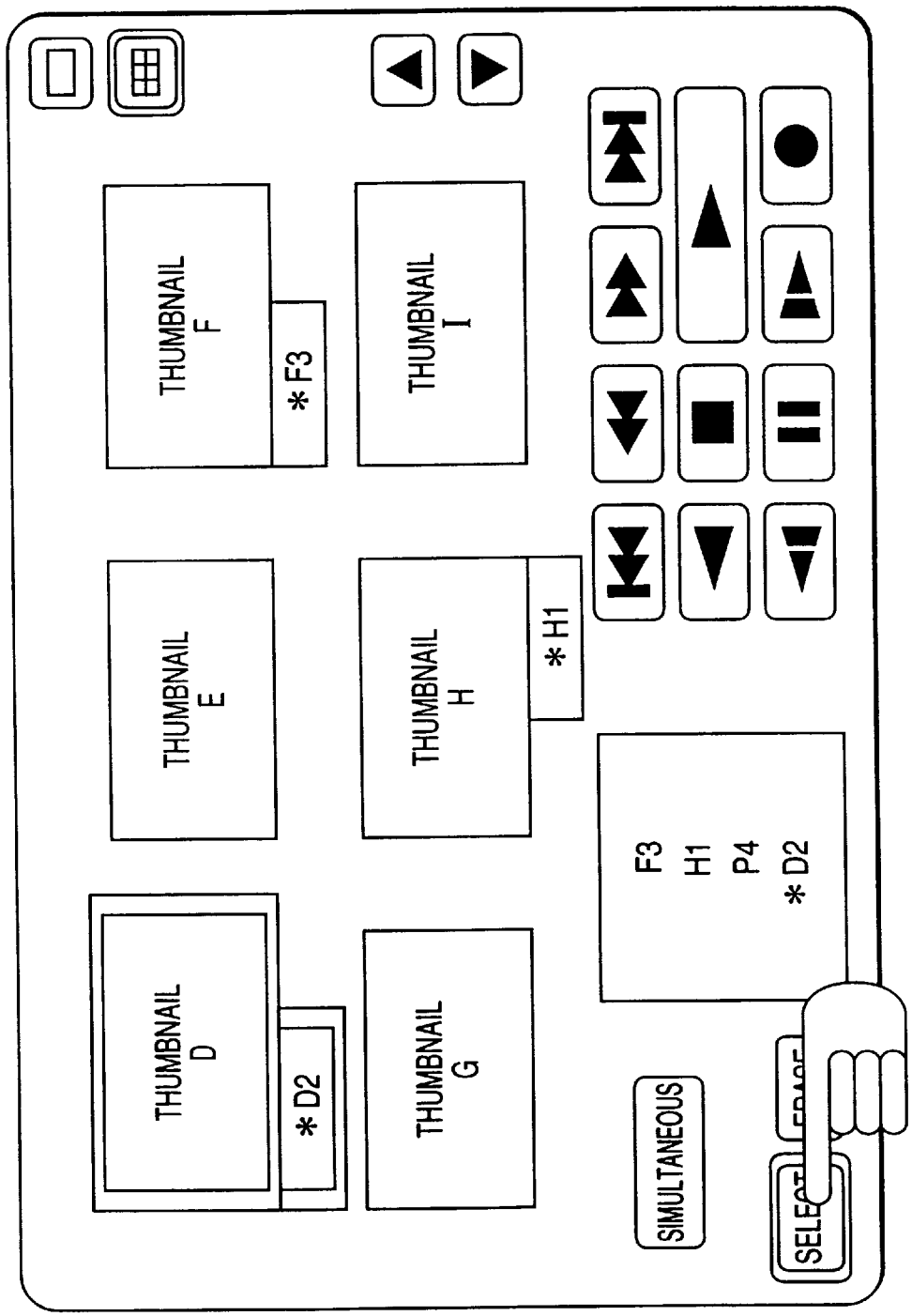
FIG. 16 is a view for explaining a thumbnail screen display for selecting a scenario file.
Figure 17:
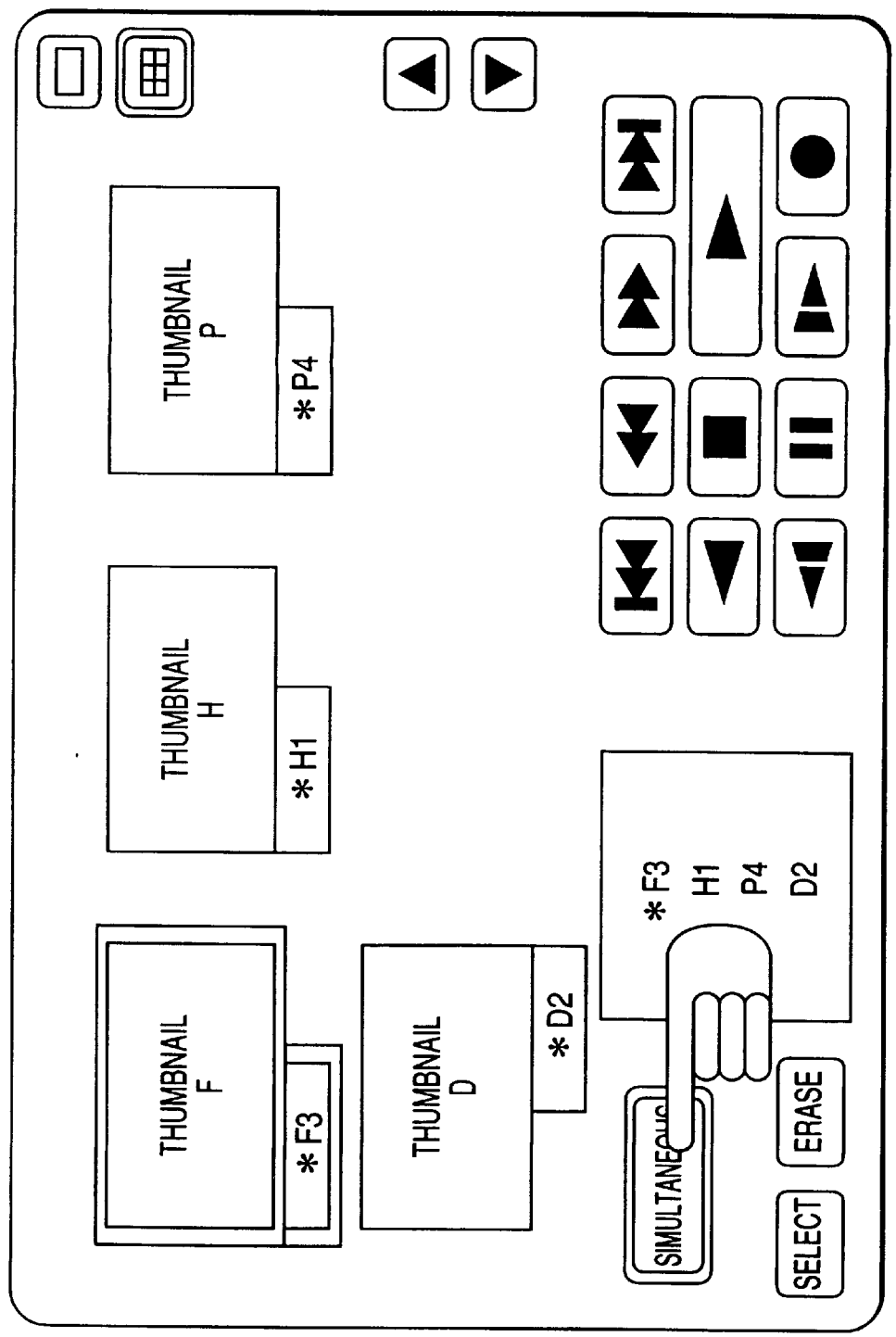
FIG. 17 is a view for explaining a thumbnail screen display for selectively displaying a thumbnail.

FIG. 16 is a view showing the state in which a scenario file D2 is newly selected by the scenario file selecting operation. If the simultaneous mode button 53 is touched while a plurality of scenario files are selected (steps S2 and S3 in FIG. 6), as shown in FIG. 17, the microprocessor 31 selectively displays only thumbnails corresponding to scenario files in the selected scenario display window 52 (step S4 in FIG. 6).

Figure 18:
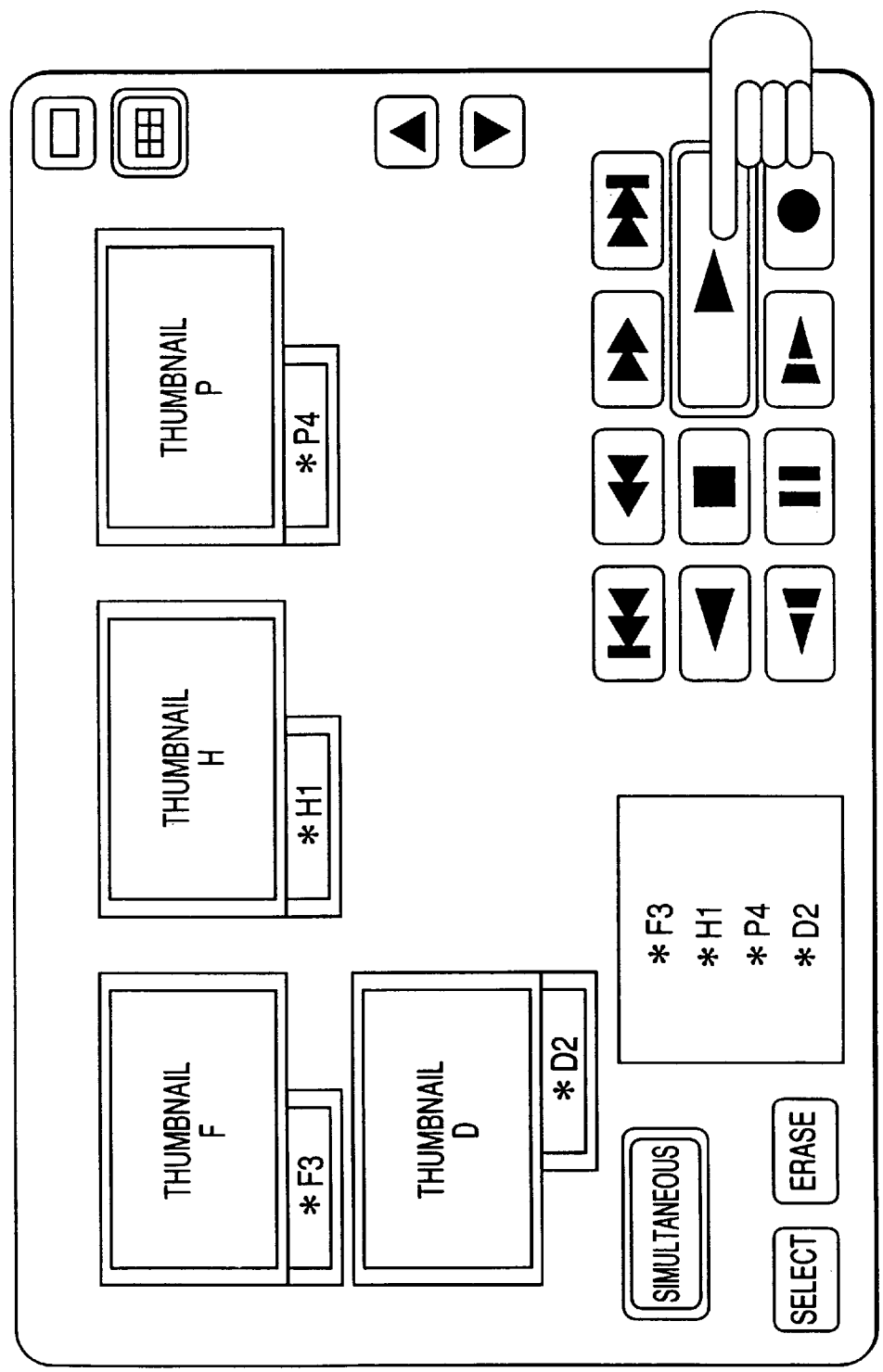
FIG. 18 is a view for explaining a thumbnail screen display for performing concurrent reproduction.

If the play button 47 is touched (step S5 in FIG. 6), as shown in FIG. 18, the microprocessor 31 starts reproducing motion images respectively corresponding to these thumbnails at the same timing, with the size of a thumbnail display region. These motion images are concurrently reproduced in accordance with the scenario files (step S6 in FIG. 6). The reproducing operations sequentially terminate from an image with the shortest reproduction time.

Figure 7:
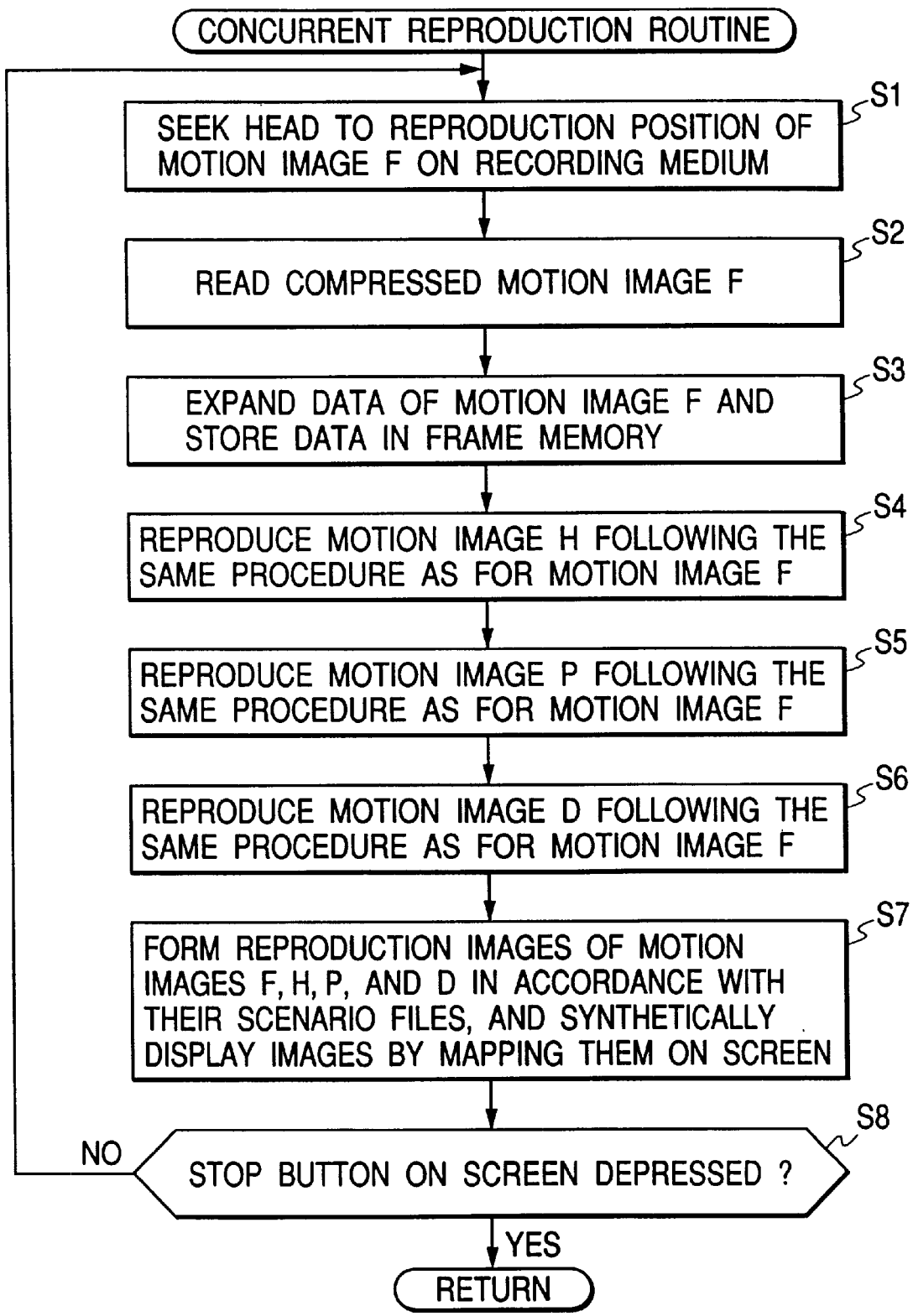
FIG. 7 is a flow chart showing a concurrent reproduction routine.

The operation of this concurrent reproduction at the same timing will be described below with reference to the flow chart (FIG. 7).

A motion image F recorded on the magnetooptical recording medium 22 is sought (step S1 in FIG. 7) and read out from the magnetooptical recording medium 22 (step S2 in FIG. 7). The image data is expanded by the data compressing/expanding unit 24 and stored in the frame memory 25 (step S3 in FIG. 7).

Subsequently, the image data of motion images H, P, and D are sequentially read out and stored in the frame memory 25 (steps S4, S5, and S6 in FIG. 7).

The display image forming unit 26 forms image data on the basis of their scenario files and synthesizes and displays the image data in predetermined positions (step S7 in FIG. 7).

For example, if the scenario file F3 indicates fast-forward reproduction, the display image forming unit 26 forms image data with a reduced number of frames.

The above operation is repeated until the stop button 46 is depressed (step S8 in FIG. 7).

As described above, concurrent reproduction at the same timing is performed by time-divisionally reading motion images, forming images, and synthetically displaying the images.

The formation of a scenario file which records the presently performed concurrent reproduction and regenerates the reproduction state will be described below.

Figure 19:
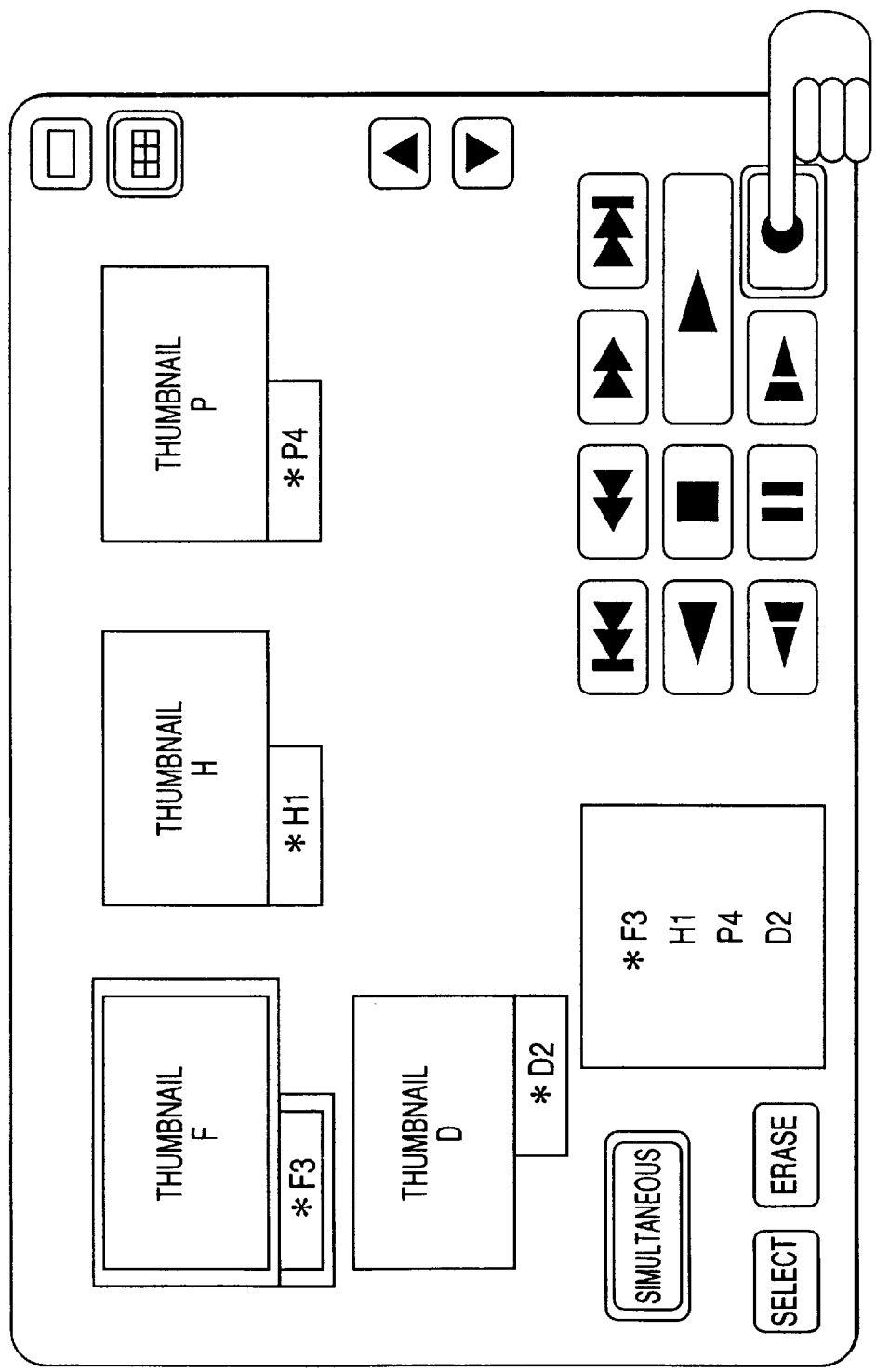
FIG. 19 is a view for explaining a thumbnail screen display for recording concurrent reproduction.

If the record button 51 is touched as shown in FIG. 19 when the concurrent reproduction is completed, the microprocessor 31 records the presently performed reproduction state as sequential data and newly forms a scenario file for regenerating the reproduction state.

The microprocessor 31 records this scenario file in the magnetooptical recording medium 22 via the data access unit 23. In this embodiment, the microprocessor 31 records information such as the file names of motion images concurrently reproduced at the same timing, scenario files attached to these motion images, and the reproduction display positions and reproduction display regions of these motion images.

More specifically, a scenario file Q1 is formed which instructs the microprocessor 31 to concurrently reproduce the motion images F, H, P, and D at the same timing in the thumbnail display regions in accordance with the scenario files F1, H1, P4, and D2.

This scenario file Q1 is stored in the magnetooptical recording medium 22 via the data access unit 23.

Figure 20:
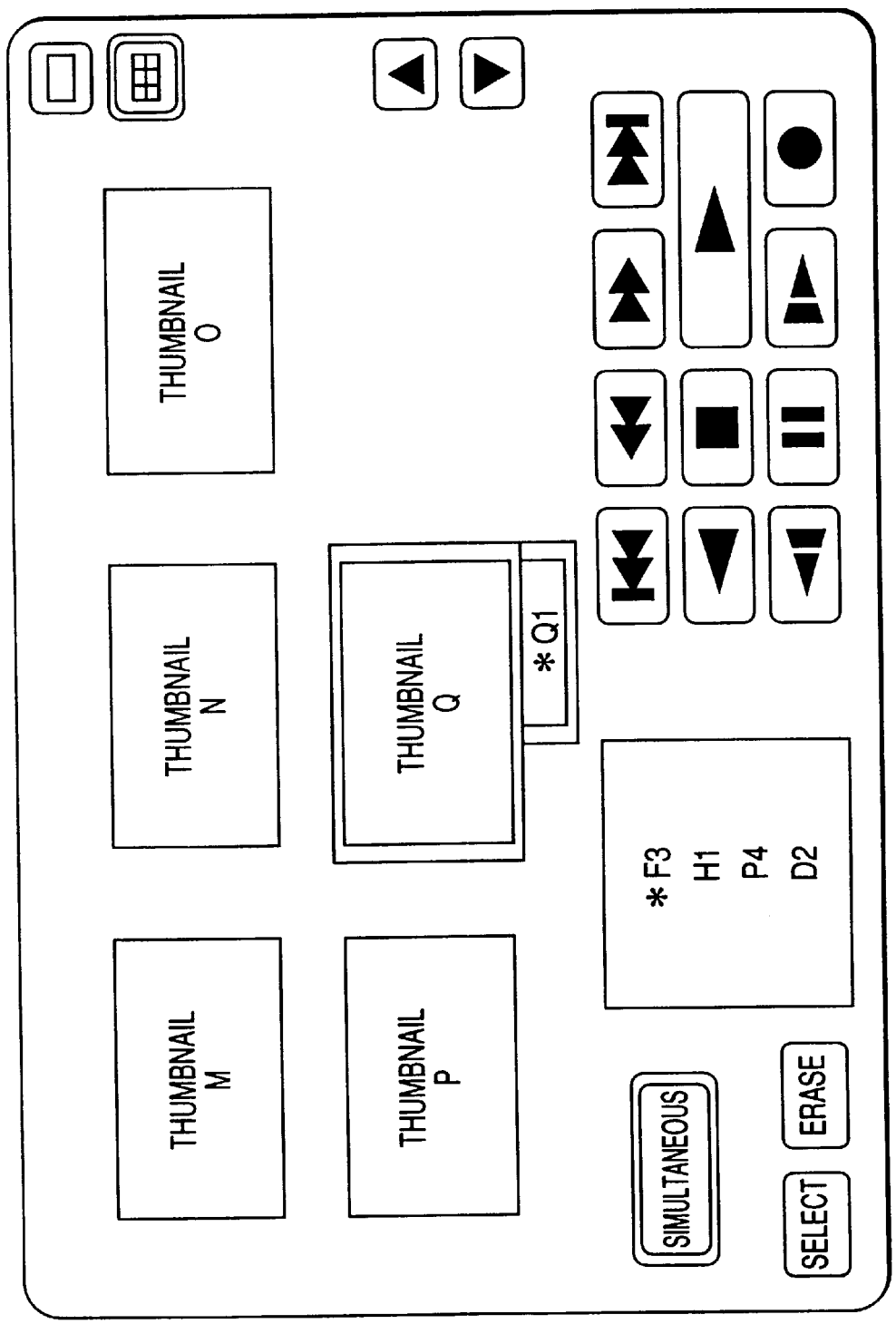
FIG. 20 is a view for explaining a thumbnail screen display for forming a scenario file.

Also, as shown in FIG. 20, the microprocessor 31 additionally displays a thumbnail Q at the end of the thumbnail screen display. An image used as the thumbnail Q is the same image as the thumbnail F.

Thereafter, when the scenario file Q1 is selected and the play button 47 is depressed, the microprocessor 31 reads the scenario file Q1 from the magnetooptical recording medium 22 and regenerates the reproduction state in accordance with the scenario file. In this embodiment, the state shown in FIG. 18 is regenerated and the concurrent reproduction is performed at the same timing.

The rearrangement of thumbnails will be described below.

When an operator wants to rearrange the selectively displayed thumbnails in FIG. 17, he or she moves a thumbnail to an intended insertion position by a drag-and-drop operation. Consequently, all the thumbnails are rearranged and displayed.

Figure 21:
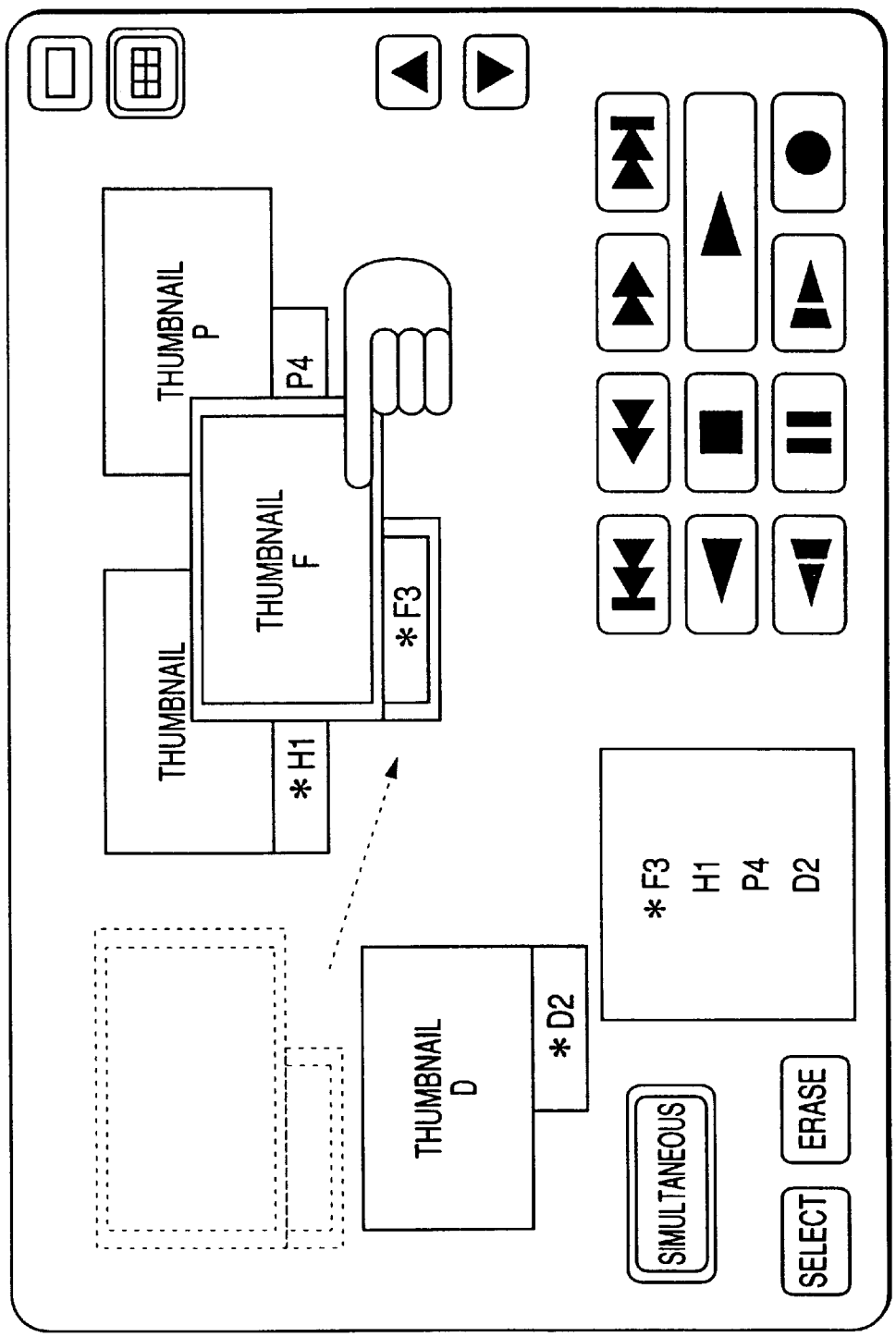
FIG. 21 is a view for explaining a thumbnail screen display for rearranging thumbnails.
Figure 22:
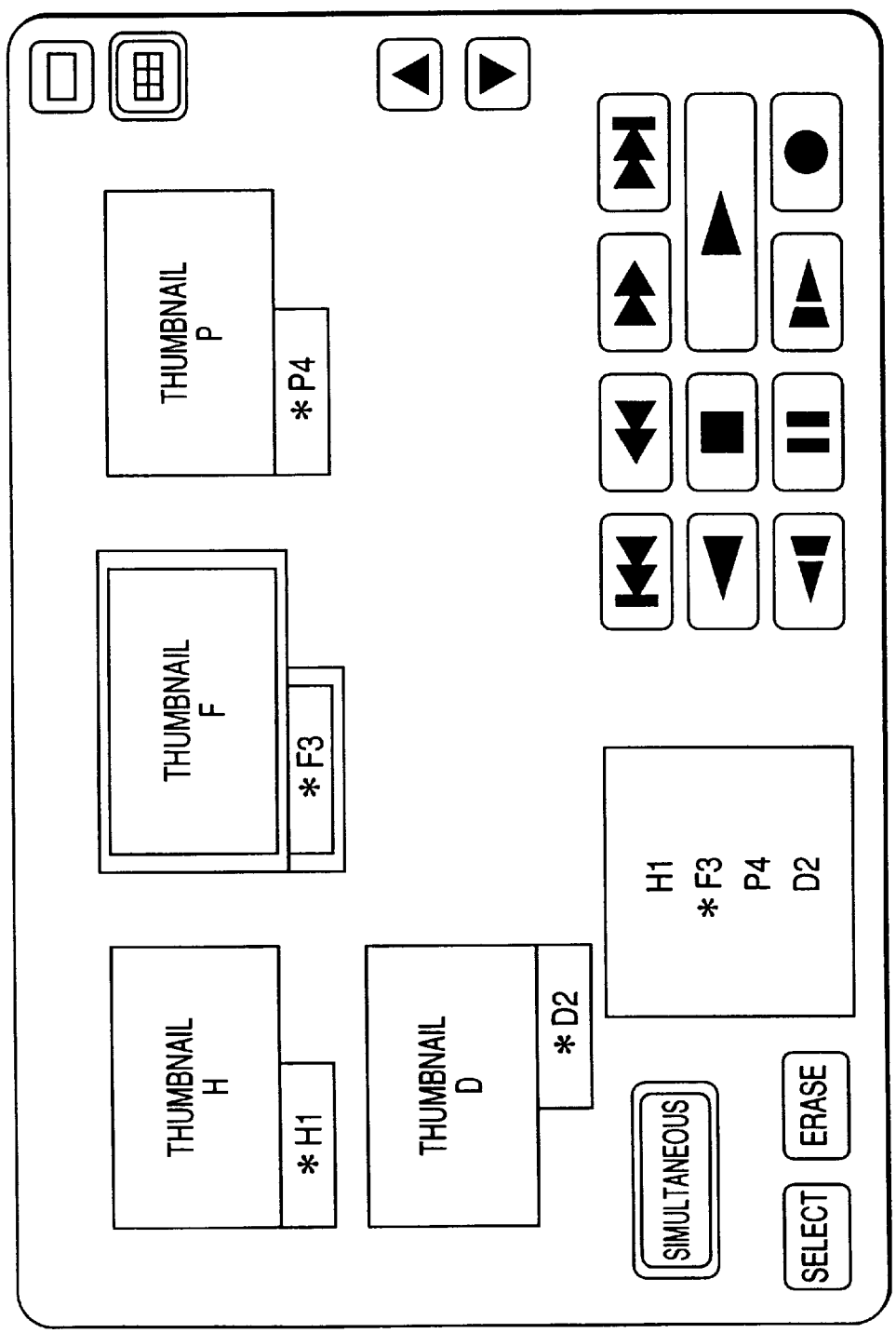
FIG. 22 is a view for explaining the thumbnail screen display for rearranging thumbnails.

Assume that the operator intends to insert the thumbnail F between the thumbnails H and P as shown in FIG. 21 to rearrange the thumbnails as shown in FIG. 22.

In this operation, the microprocessor 31 selects the thumbnail (in this case the thumbnail F) corresponding to the touched position. Following the drag operation by the operator, the microprocessor 31 moves the thumbnail F and inserts the thumbnail F in the drop position (between the thumbnails H and P), thereby rearranging and displaying the thumbnails.

Figure 23:
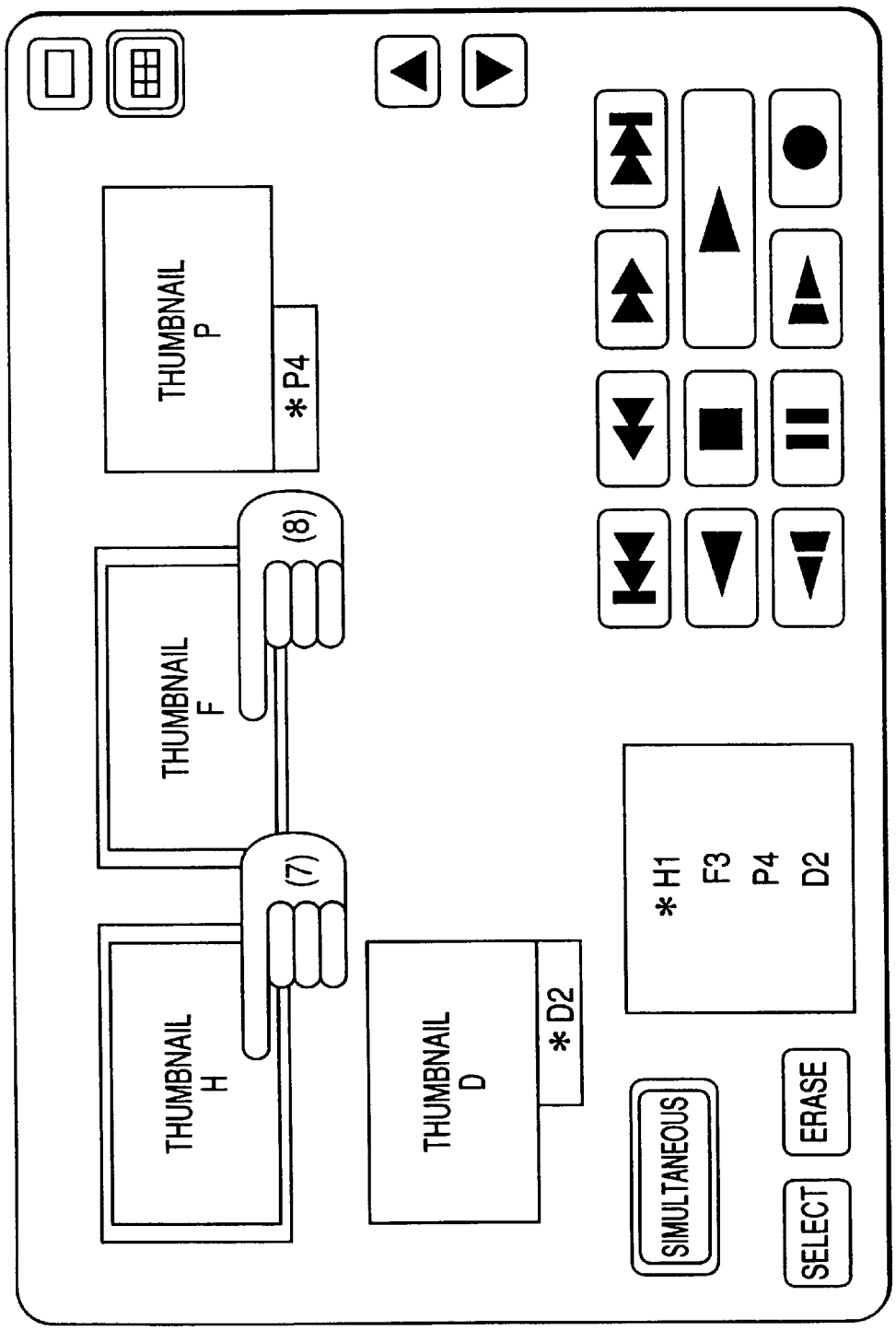
FIG. 23 is a view for explaining the thumbnail screen display for rearranging thumbnails.

Thumbnails can also be rearranged by an operation shown in FIG. 23. When the thumbnails H and F are quickly touched twice (corresponding to double click of a mouse) (operations 7 and 8), the microprocessor 31 detects that the two thumbnails H and F are selected for switching.

Figure 24:
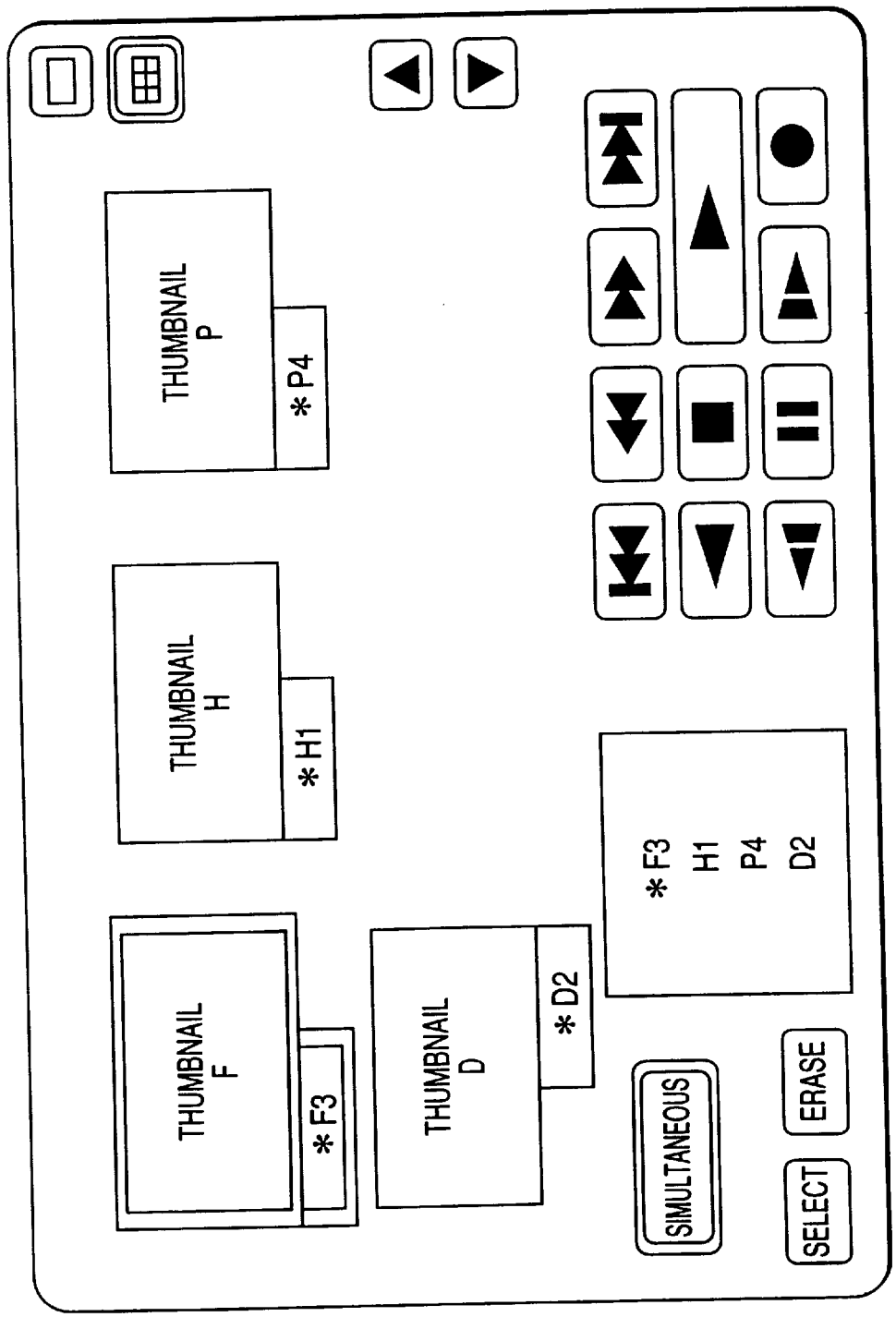
FIG. 24 is a view for explaining the thumbnail screen display for rearranging thumbnails.

Subsequently, the microprocessor 31 switches the display positions of the two selected thumbnails and displays them as shown in FIG. 24.

Figure 25:
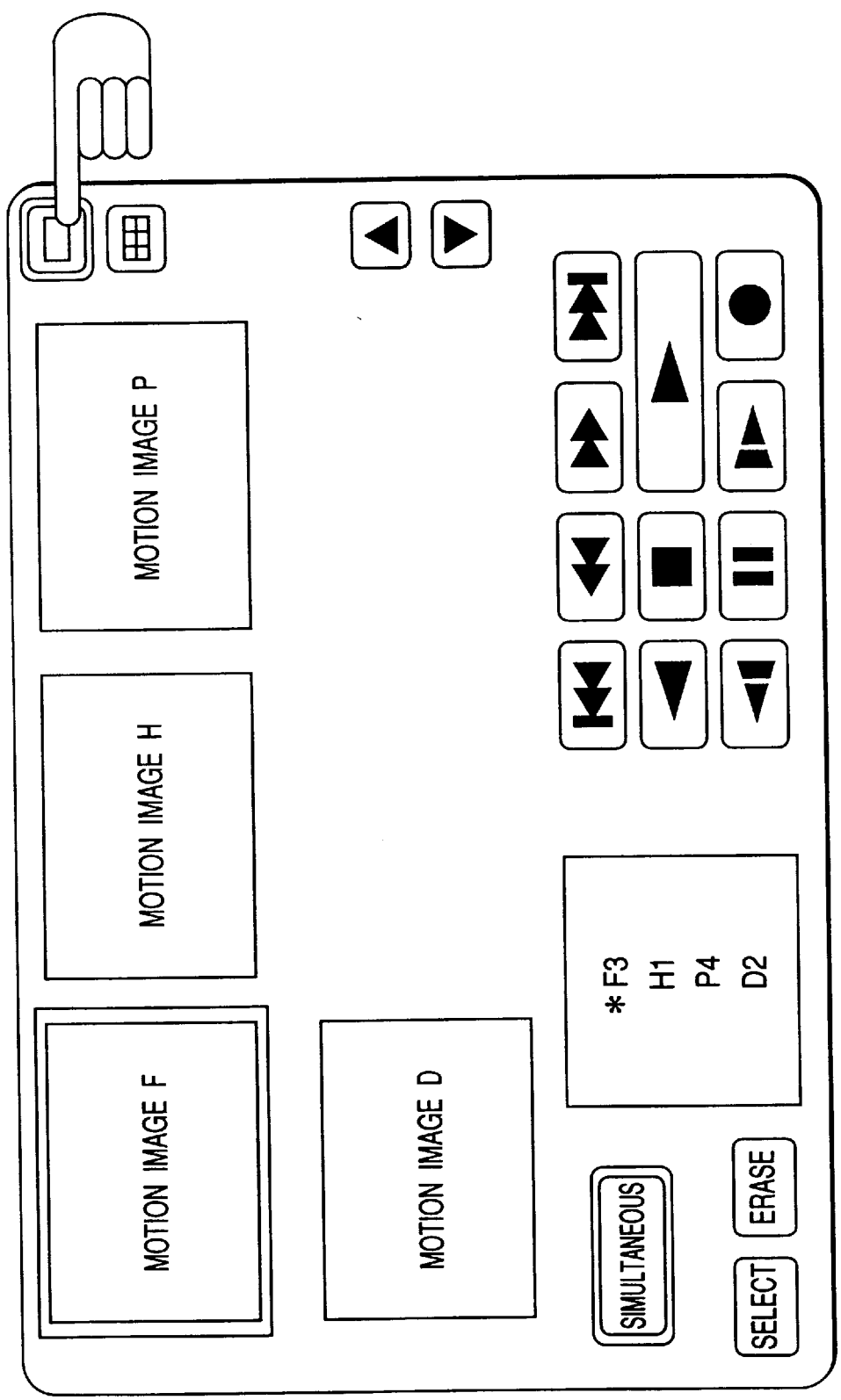
FIG. 25 is a view for explaining a thumbnail screen display in a standard size.

When the standard size button 38 is touched, the display regions of selected thumbnails are changed to display the thumbnails in an enlarged scale. For example, the display form is changed as shown in FIG. 25. When the standard size button 38 is touched, the microprocessor 31 displays the display regions of images in an enlarged scale. Images with this new size are formed by multiplying the number of pixels by an integer, dividing the product in units of predetermined blocks, and averaging the results.

Figure 26:
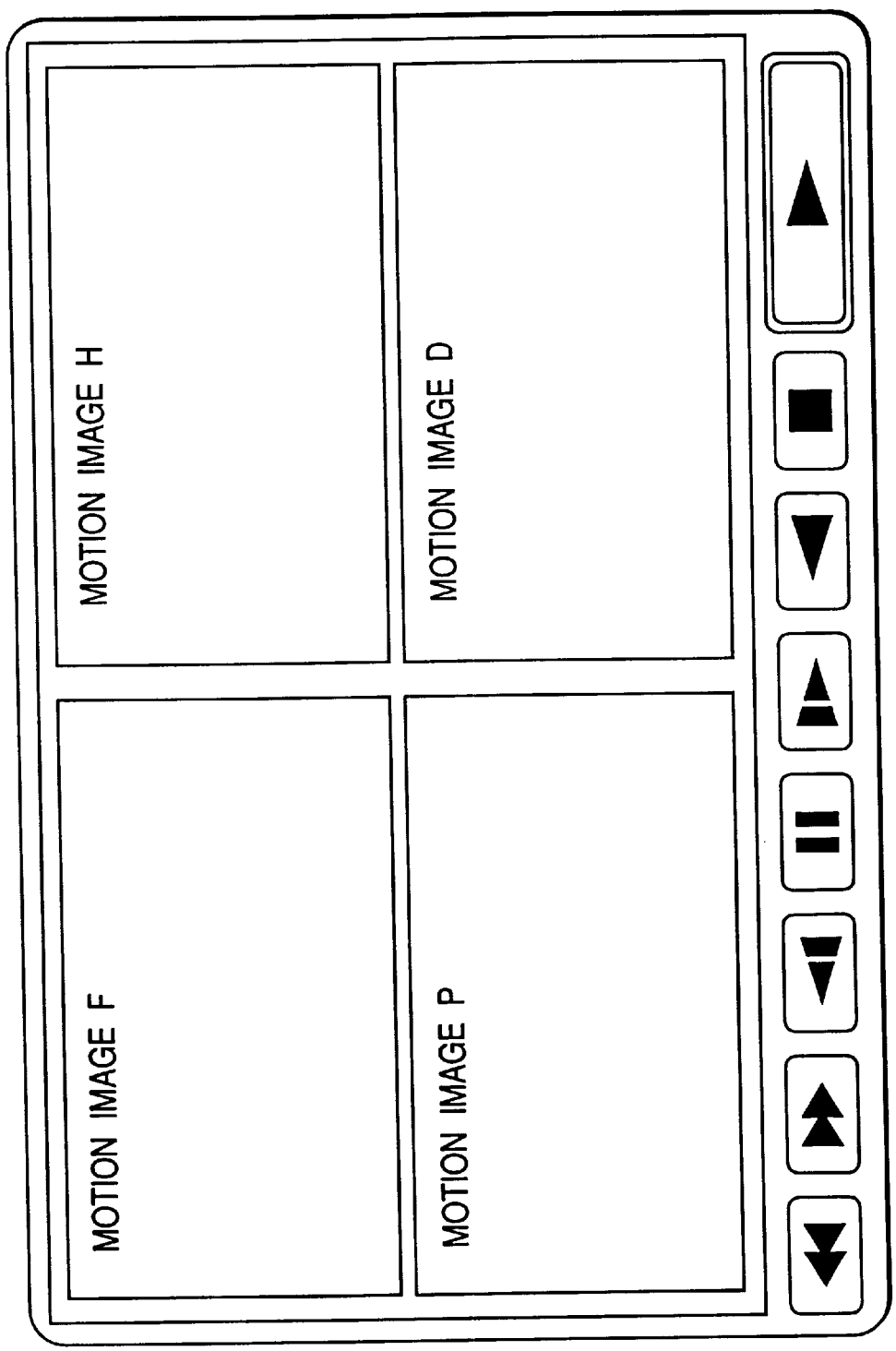
FIG. 26 is a view for explaining a thumbnail screen display in a maximum size.

As shown in FIG. 26, reproduction display regions can also be maximized in concurrent reproduction.

Figure 27:
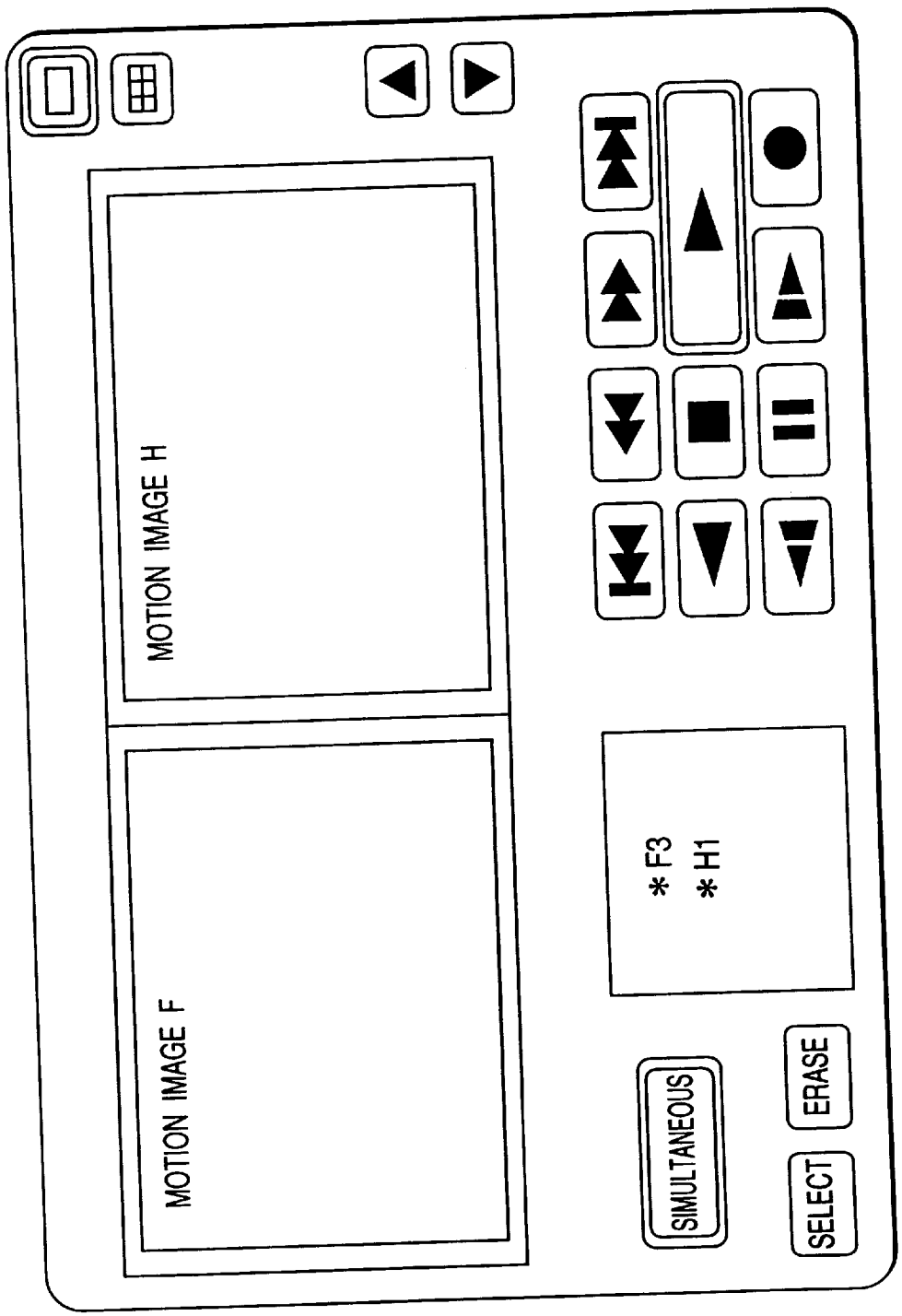
FIG. 27 is a view for explaining a thumbnail screen display in a maximum size.

Furthermore, when two motion images are to be concurrently reproduced at the same timing, these two images are displayed as shown in FIG. 27. That is, the size of a display region is previously set in the microprocessor 31 in accordance with the number of motion images to be reproduced. Therefore, the microprocessor 31 appropriately changes display regions in accordance with the number of motion images to be reproduced.

Note that the main body 21 includes the camera unit 32 in which the image pickup device 34 photoelectrically converts an image obtained by the taking lens 33 and the A/D converter 35 converts the signal into a digital signal.

The signal processor 36 performs signal processing such as white balance adjustment, gamma correction, and pixel interpolation. The data is compressed by the data compressing/expanding unit 24 via the frame memory 25. The compressed data is recorded on the magnetooptical recording medium 22 via the data access unit 23.

The image data in the frame memory 25 is monitored on the liquid crystal display 27 via the display image forming unit 26.

As described above, the image reproducing apparatus of this embodiment can concurrently reproduce a plurality of motion images at the same timing. The apparatus can also properly change display regions in accordance with the number of motion images to be reproduced.

Additionally, the reproduction state of the last motion image can be regenerated with a simple operation.

Furthermore, since thumbnails can be rearranged by a simple operation, motion images can be effectively displayed while being compared with each other.

Figure 28:
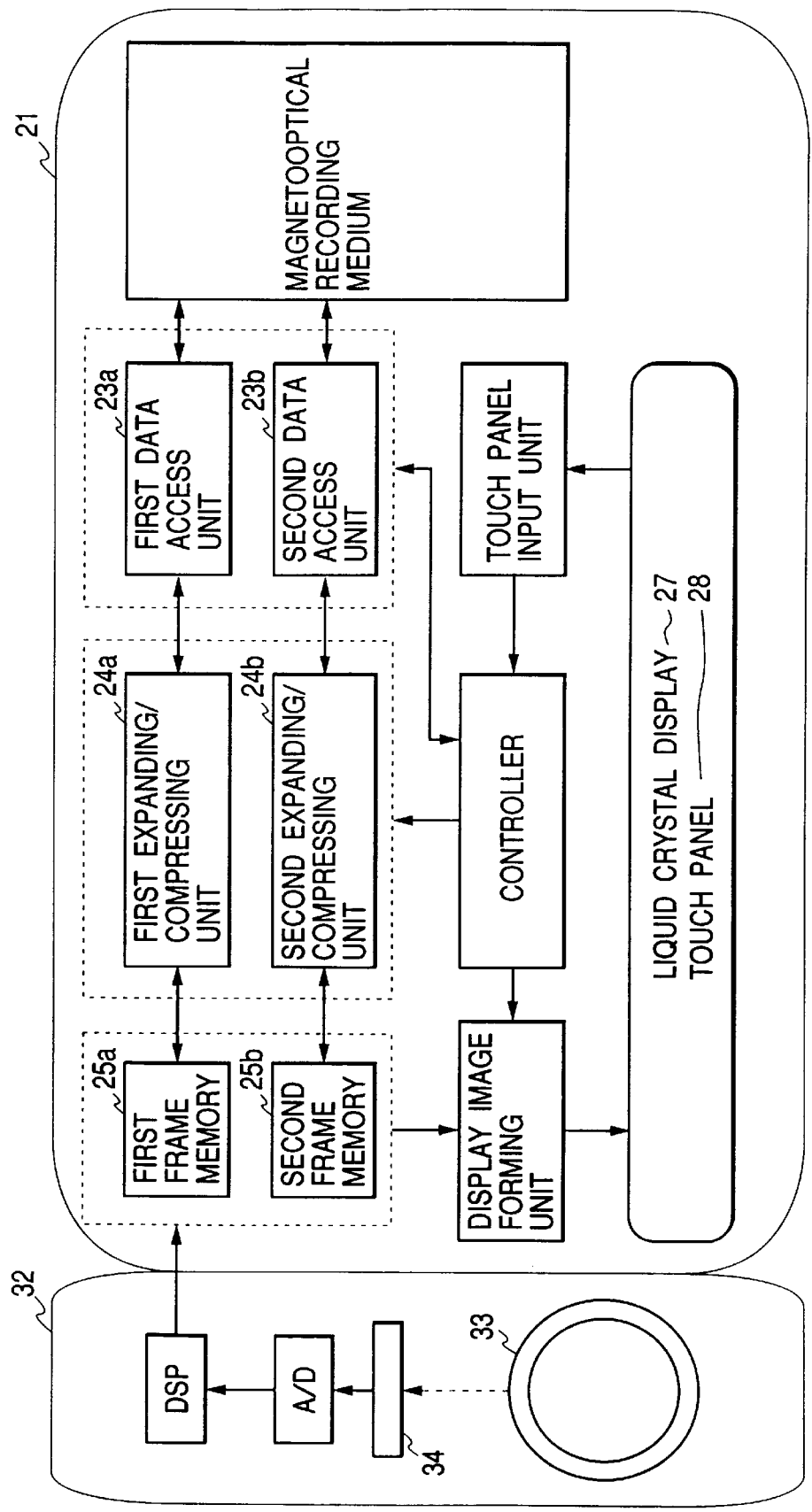
FIG. 28 is a functional block diagram of a modification of the first embodiment.
Figure 29:
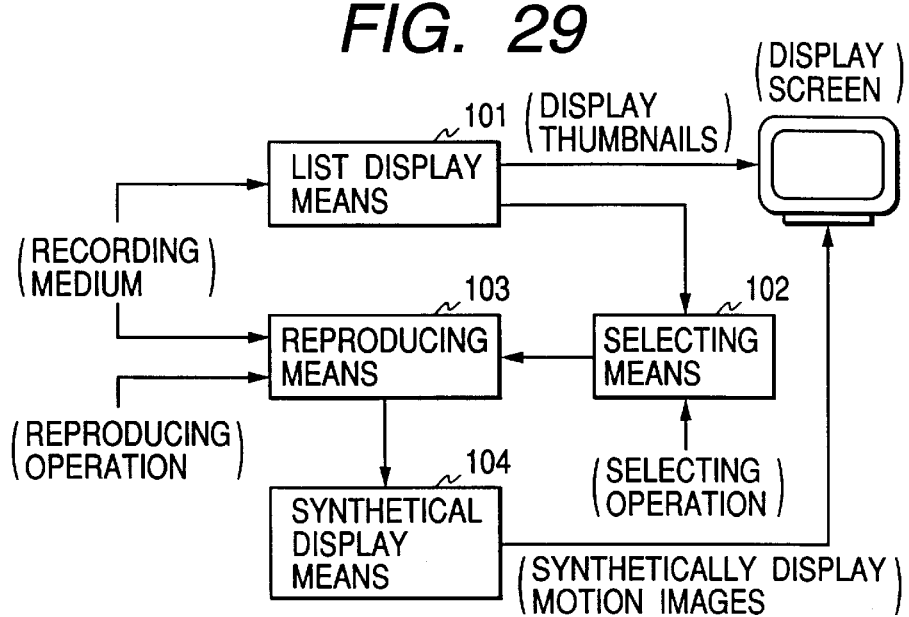
FIG. 29 is a block diagram for explaining the principle of the eighth to eleventh aspects of the present invention.
Figure 30:
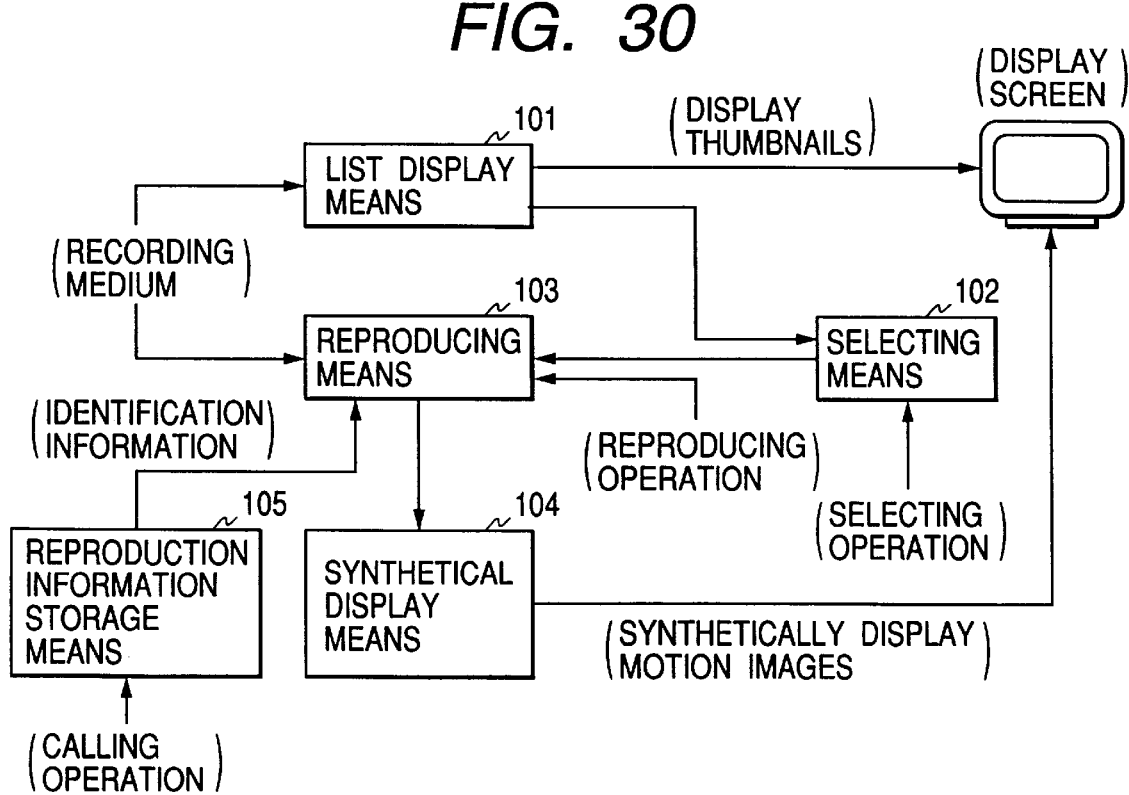
FIG. 30 is a block diagram for explaining the principle of the twelfth aspect of the present invention.
Figure 31:
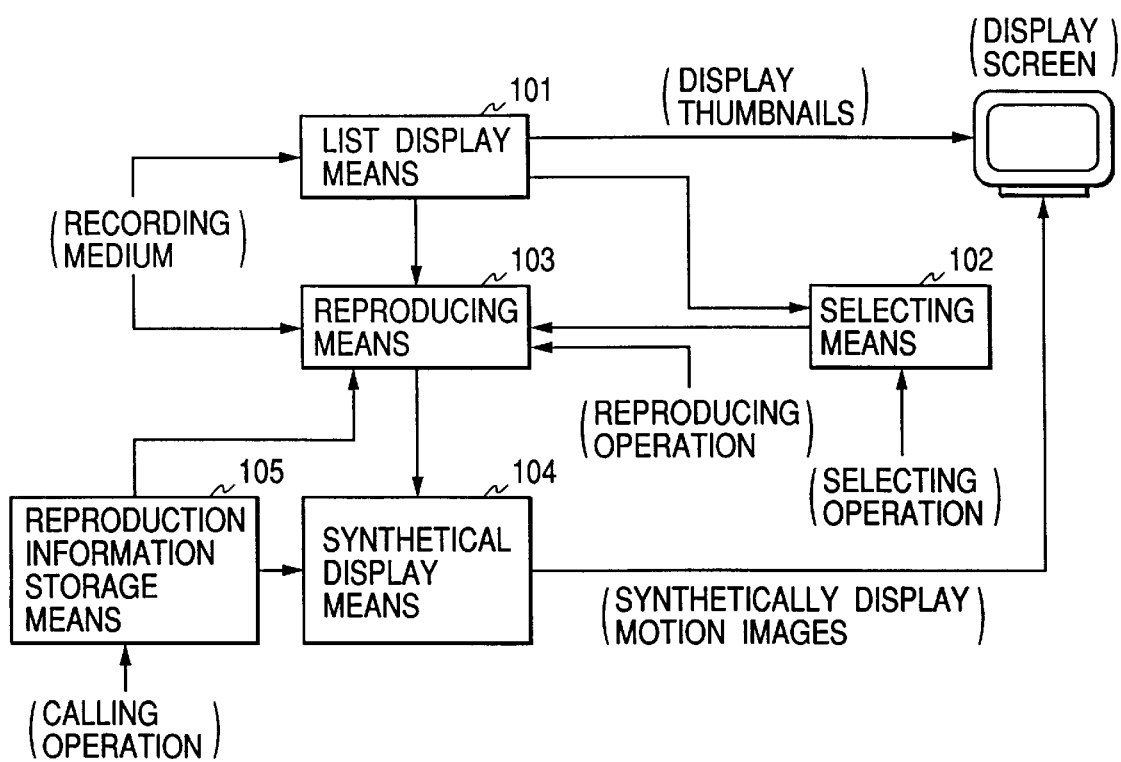
FIG. 31 is a block diagram for explaining the principle of the thirteenth and fourteenth aspects of the present invention.

As a modification of this embodiment, as shown in FIG. 28, a plurality of motion images can also be concurrently reproduced at the same timing by using pairs of data access units 23*a* and 23*b*, data compressing/expanding units 24*a* and 24*b*, and frame memories 25*a* and 25*b*.

Although a thumbnail is automatically formed for the first scene of a motion image file in this embodiment, the present invention is not limited to this embodiment. For example, it is also possible to allow an operator to select an arbitrary scene of a motion image file and display the selected scene as a thumbnail.

Furthermore, scenario files are recorded together with motion images on the magnetooptical recording medium 22. However, scenario files can also be recorded in another recording medium.

Note that a file name is used as the identification information in this embodiment, but the identification information is not restricted to a file name. For example, information for specifying a motion image, e.g., address information is also usable.

Although a touch panel is used as the operation input unit in this embodiment, the input unit is not limited to a touch panel. For example, operation buttons can be separately provided, or a mouse can be used.

A magnetooptical recording medium is used in this embodiment, but the recording medium is not limited to a magnetooptical recording medium. For example, it is possible to use a magnetic recording medium, an optical recording medium, and a semiconductor recording medium.

The second embodiment of the present invention will be described below with reference to the accompanying drawings.

Figure 32:
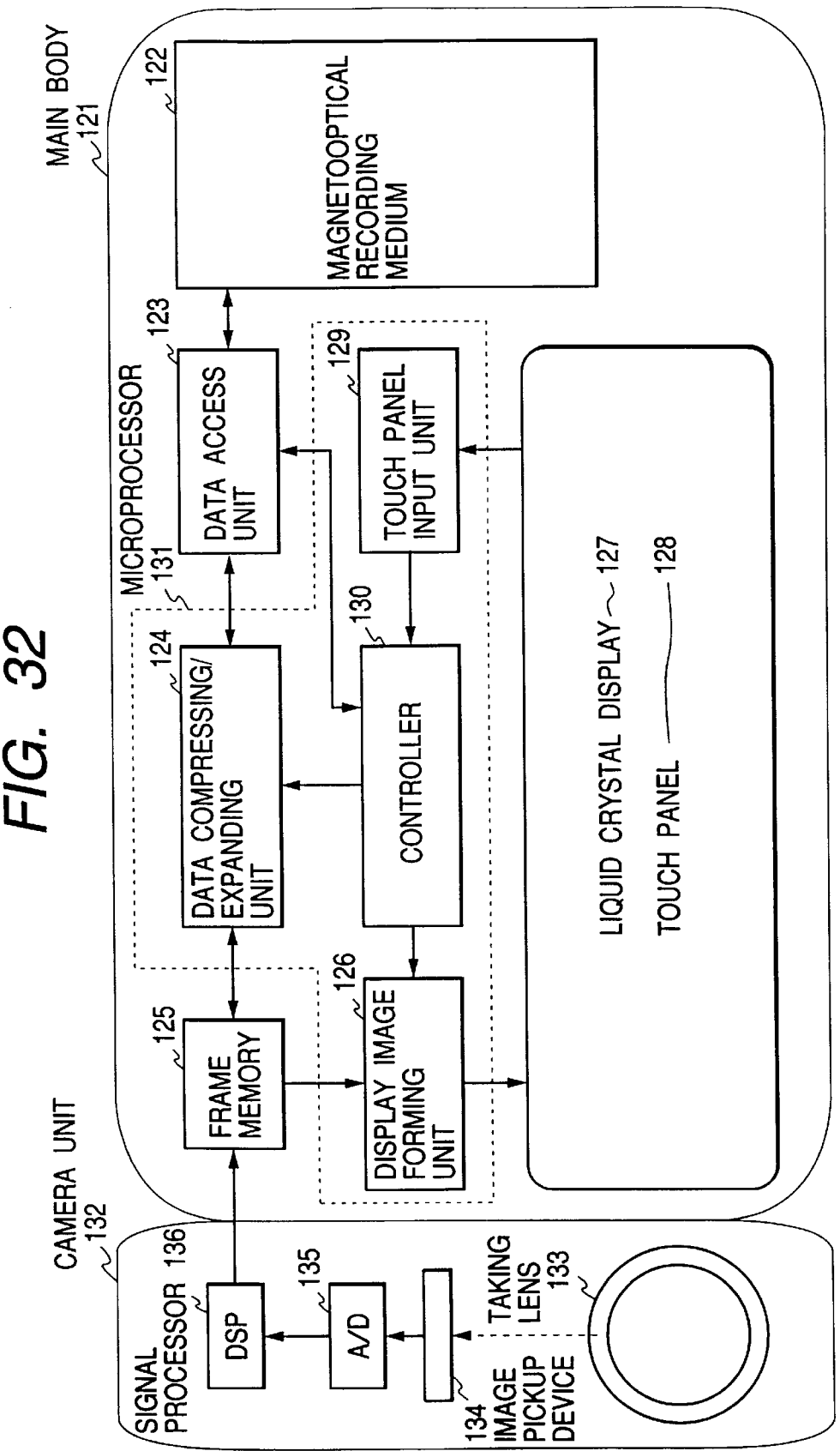
FIG. 32 is a functional block diagram of the second embodiment of the present invention in an electronic camera.

FIG. 32 is a functional block diagram of the second electronic camera embodiment (corresponding to the eighth to fourteenth aspects of the present invention) of the present invention.

Referring to FIG. 32, a magnetooptical recording medium 122 is detachably loaded in a main body 121.

A data access unit 123 for performing read and write operations to the magnetooptical recording medium 122 is connected to a frame memory 125 via a data compressing/expanding unit 124. An output from the frame memory 125 is input to a liquid crystal display 127 via a display image forming unit 126. A touch panel 128 is attached to the liquid crystal display 127. Position information detected by the touch panel 128 is input to a controller 130 via a touch panel input unit 129.

A control output from the controller 130 is input to the data compressing/expanding unit 124 and the display image forming unit 126. The output from the controller 130 is also connected to the data access unit 123.

The functions of the data compressing/expanding unit 124, the display image forming unit 126, the touch panel input unit 129, and the controller 130 are realized by a microprocessor 131.

A camera unit 132 of the main body 121 includes a taking lens 133. An image pickup device 134 is arranged in a position where an image of an object obtained through the taking lens 133 is received.

An output signal from the image pickup device 134 is input to the frame memory 125 via an A/D converter 135 and a signal processor (digital signal processor) 136.

The correspondence of the components of the eighth to eleventh aspects of the present invention previously described with the components of this embodiment is as follows. The list display means 1 corresponds to the function of causing the data access unit 123, the data compressing/expanding unit 124, the frame memory 125, and the display image forming unit 126 to acquire or form thumbnails and display them in the form of a list. The selecting means 102 corresponds to the touch panel 128 and the touch panel input unit 129. The reproducing means 103 corresponds to the data compressing/expanding unit 124, the touch panel input unit 129, and the controller 130. The synthetical display means 104 corresponds to the function of synthetically displaying a reproduced image of the display image forming unit 126.

The correspondence of the components of the twelfth to fourteenth aspects of the present invention to the components of this embodiment is, in addition to the above correspondence, that the reproduction information storage means 105 corresponds to the magnetooptical recording medium 122, the data access unit 123, and the controller 130.

The operation of this embodiment will be described below with reference to FIGS. 33 and 34 as flow charts for explaining the operation of this embodiment and FIGS. 35 to 46 as views for explaining thumbnail screen displays.

When the magnetooptical recording medium 122 is loaded in the main body 121, the data access unit 123 reads the first scenes of a plurality of motion images recorded on the magnetooptical recording medium 122. The display image forming unit 126 forms thumbnails on the basis of these image data and displays a list on the liquid crystal display 127 (step S101 in FIG. 33).

Figure 35:
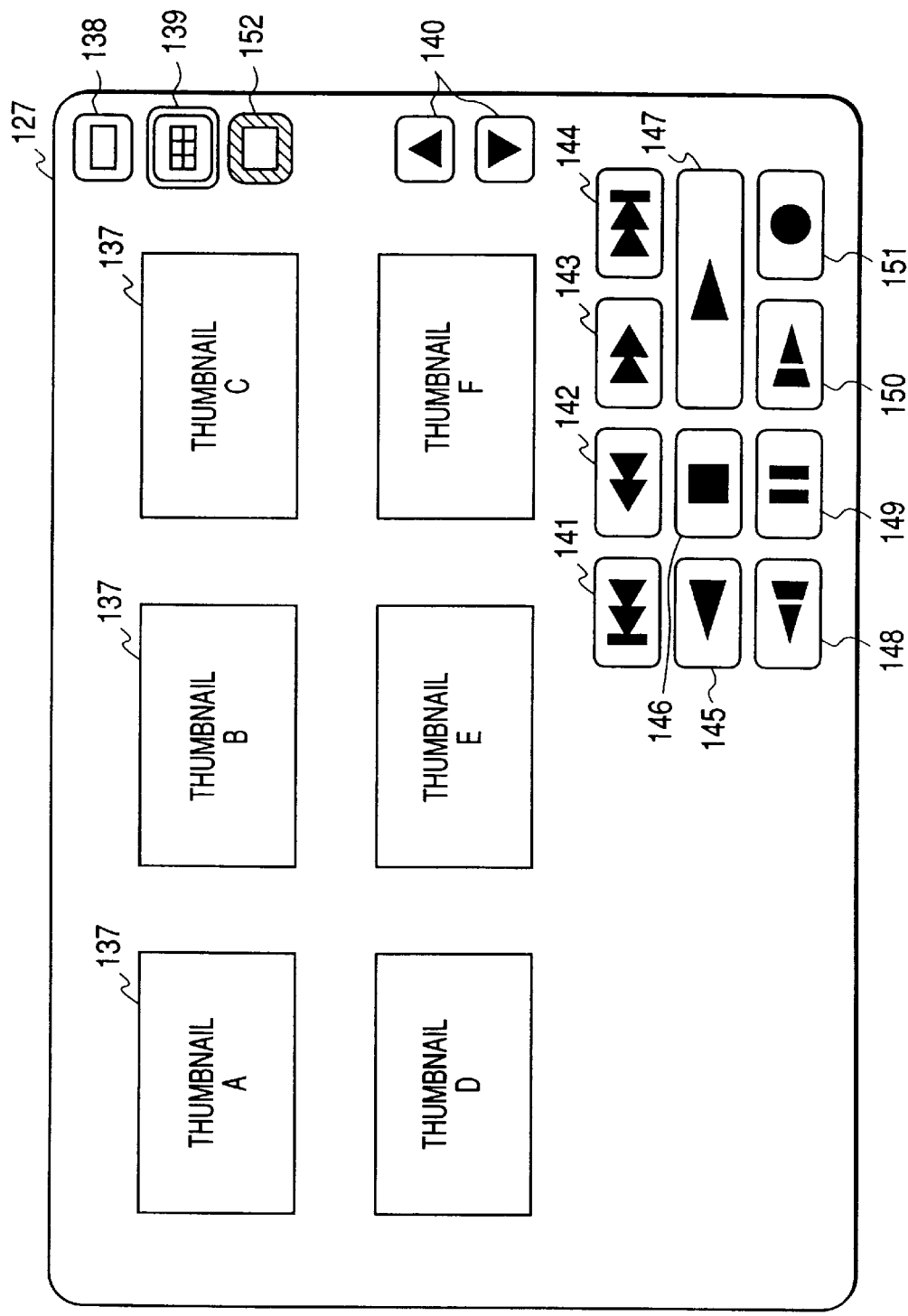
FIG. 35 is a view for explaining an initial thumbnail screen display.

FIG. 35 is a view for explaining an initial screen display on the liquid crystal display 127.

A list of thumbnails 137 is displayed on the screen of the liquid crystal display 127. A standard size button 138, a thumbnail display button 139, and a background image button 152 are arranged in the upper right corner of the liquid crystal display 127. Scroll buttons 140 for scrolling the thumbnails 137 are arranged below the buttons 138, 139, and 152.

Operation buttons for recording and reproduction are arranged in the lower right portion of the liquid crystal display 127. That is, a reverse skip button 141, a fast rewind button 142, fast forward button 143, a skip button 144, a reverse play button 145, a stop button 146, a play button 147, a slow reverse button 148, a pause button 149, a slow forward button 150, and a record button 151 are arranged in this order from the upper left one.

When any of these operation buttons is operated, the operated button is highlighted to indicate its operating state.

Figure 36:
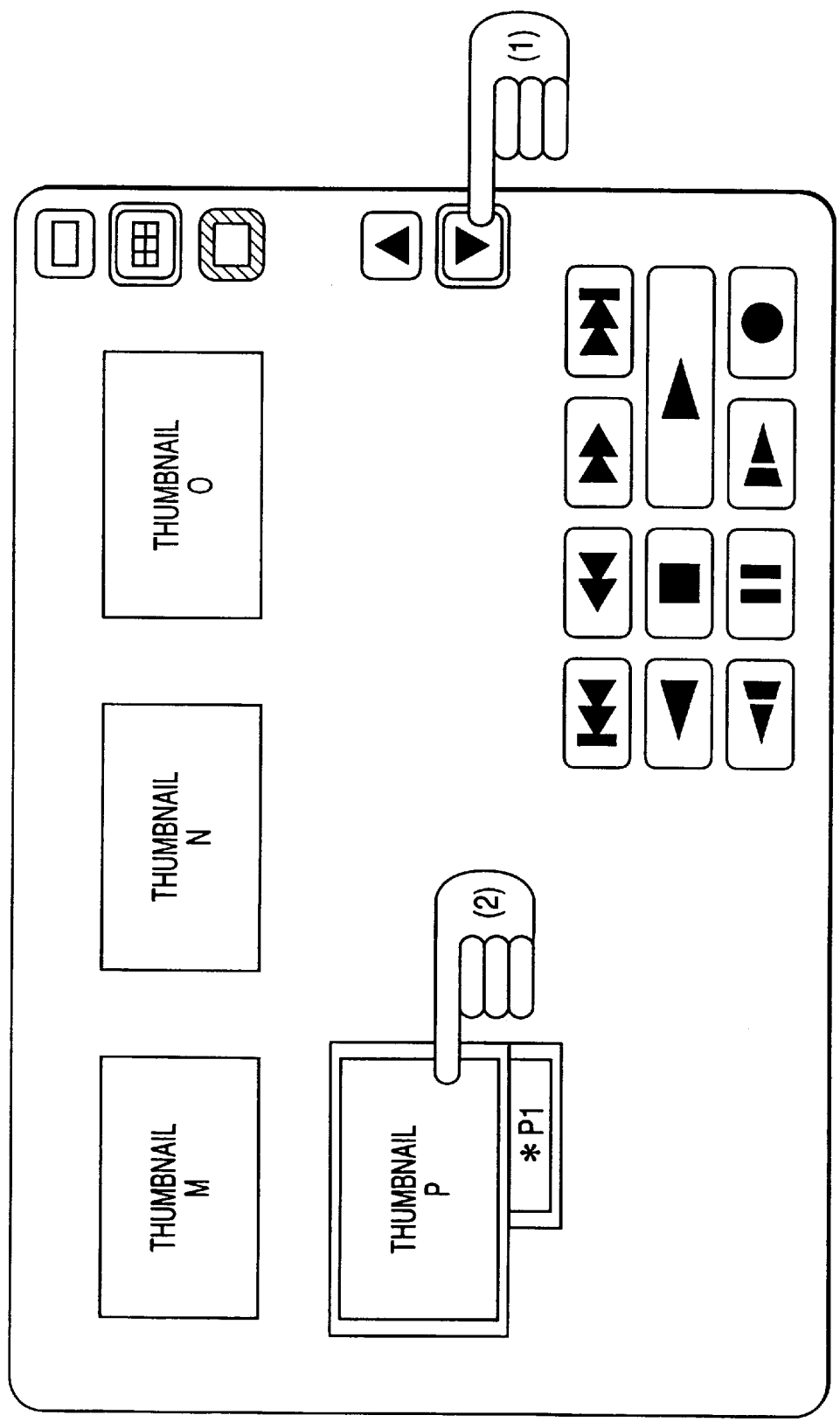
FIG. 36 is a view for explaining a thumbnail screen display for scroll and selecting a thumbnail.

When the scroll button 40 is touched (operation 1) as shown in FIG. 36, the display image forming unit 126 scrolls the screen display. In this embodiment, motion images A to P are recorded as image files on the magnetooptical recording medium 122. The display image forming unit 126 displays thumbnails corresponding to these motion images as thumbnails A to P.

An operator performs all operations via the touch panel 128 by using a GUI (Graphical User Interface) as a well-known technology or the like.

That is, the liquid crystal display 127 displays the thumbnails and operation buttons as objects, and the touch panel 128 and the touch panel input unit 129 sense a touch of an operator to these objects.

In accordance with this touch, the controller 130 generates a message related to the object on the screen. The display image forming unit 126 acquires the message and changes the screen display or the like. A description of this part of the operation will be omitted.

When a thumbnail is touched, the controller 130 detects that the thumbnail and a motion image corresponding to the thumbnail are selected, and highlights the thumbnail via the display image forming unit 126.

The selected motion image is added with a scenario file which indicates in the form of data the way the motion image is to be reproduced (e.g., slow reproduction, fast-forward reproduction, fade-in fade-out reproduction, or the size of a display region). This scenario file is added to, e.g., the header of each motion image file, or formed as a separate file related to a motion image file, and recorded on the magnetooptical recording medium 122.

Note that this scenario file corresponds to the identification information according to the twelfth aspect and the display state according to the fourteenth aspect of the present invention.

For example, if a thumbnail P is selected as shown in FIG. 36 (operation 2), P1 is previously initially set as a scenario file of a motion image P. If the highlighted thumbnail is again touched, the controller 130 detects the operation and displays a list of scenario files of motion images via the display image forming unit 126.

The controller 130 checks whether a touch operation is performed for the scenario file list display region and the thumbnail, and detects a scenario file selected by the operator.

Figure 37:
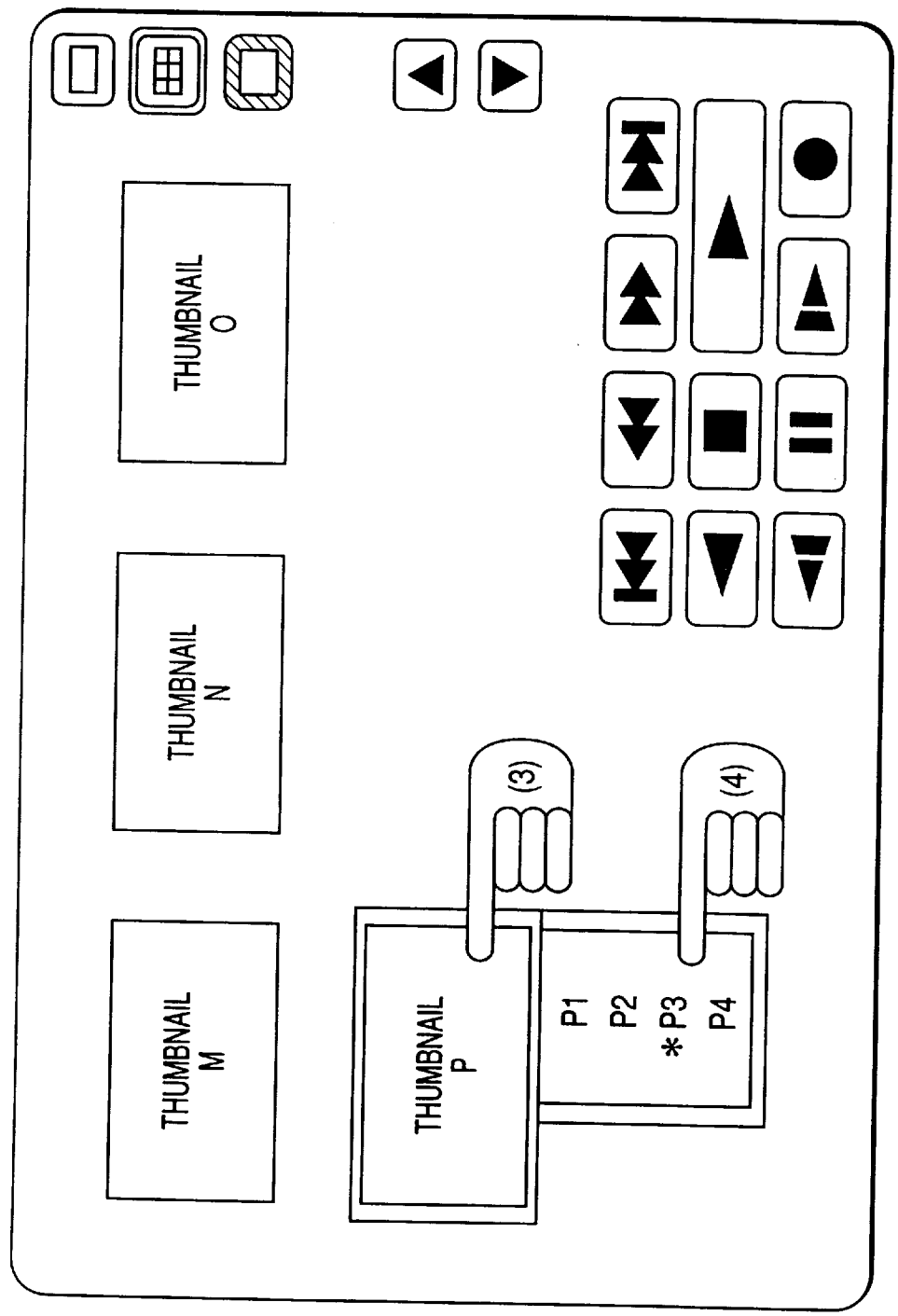
FIG. 37 is a view for explaining a thumbnail screen display for displaying a scenario file list.
Figure 38:
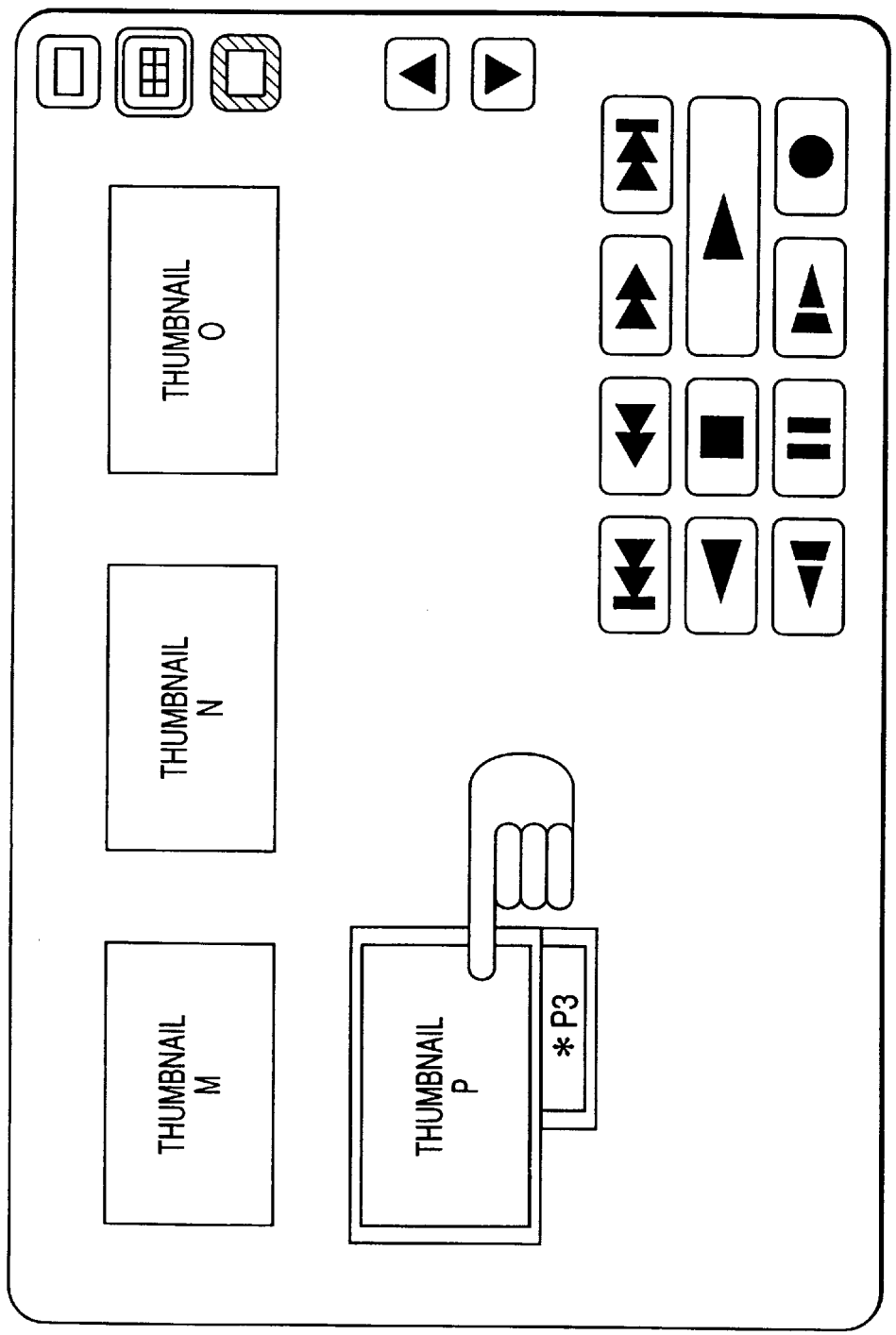
FIG. 38 is a view for explaining a thumbnail screen display for determining a scenario file.

For example, if the thumbnail P is touched as shown in FIG. 37 (operation 3), the controller 130 displays a list of P1 to P4 as scenario files via the display image forming unit 126.

If a touch operation is performed in the scenario file list display region (operation 4), the controller 130 sequentially moves a symbol * downward on the display via the display image forming unit 126. If the touch operation is repeated, the controller 130 returns the symbol * on the display.

Figure 39:
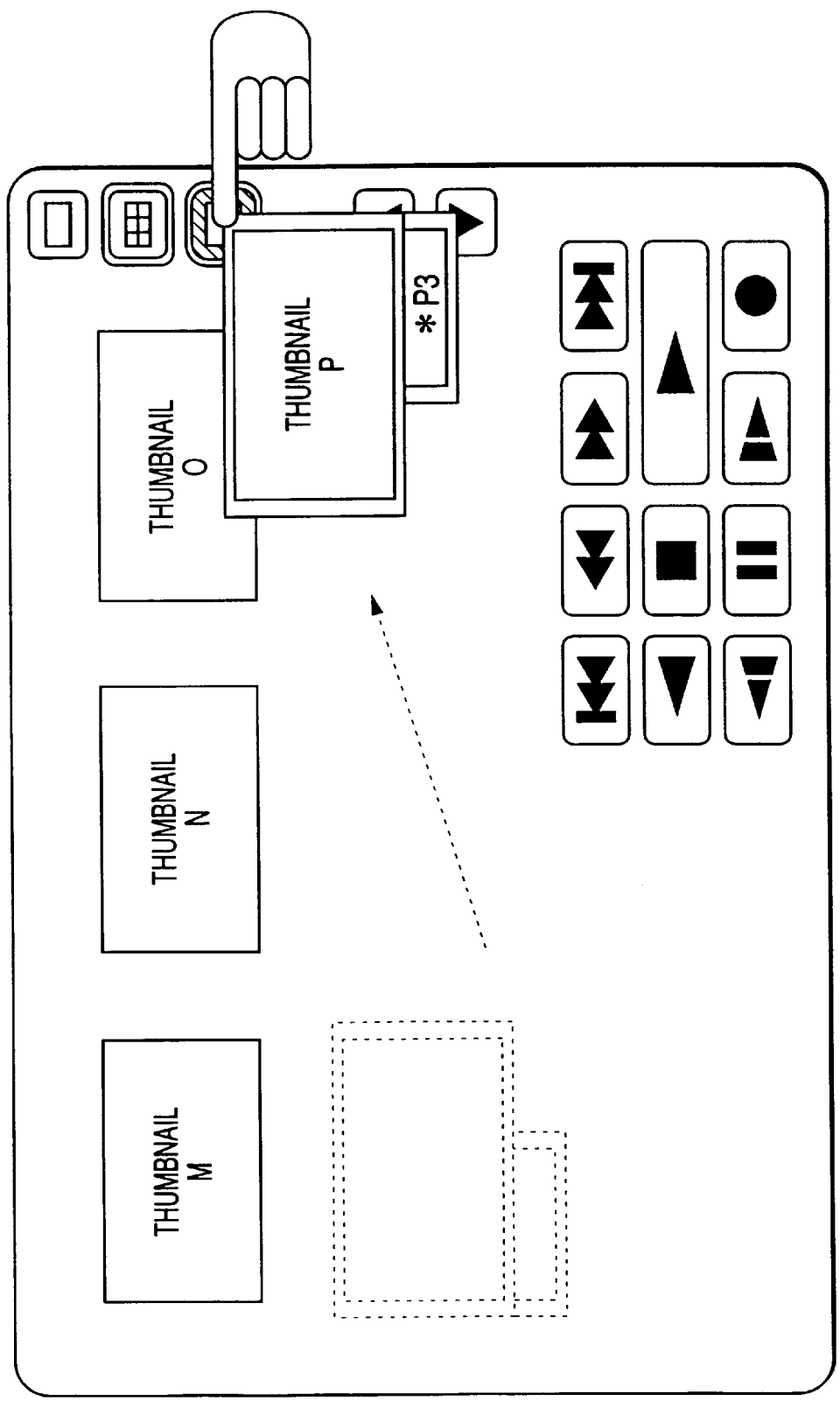
FIG. 39 is a view for explaining a thumbnail screen display for selecting a background image.

If the thumbnail P is again touched when the symbol * is displayed beside P3 as shown in FIG. 39, the controller 130 detects that P3 is determined as a scenario file.

If a drag-and-drop operation (by which an operator moves a finger in contact with the touch panel 128 and releases the finger in a predetermined position) is performed on the touch panel 128, the controller 130 detects the start position of the operation and moves a thumbnail in that position to the drop position.

If the operator performs the drag-and-drop operation for the thumbnail P as shown in FIG. 39, the controller 130 displays the thumbnail P while moving it following the finger of the operator via the display image forming unit 126.

Figure 33:
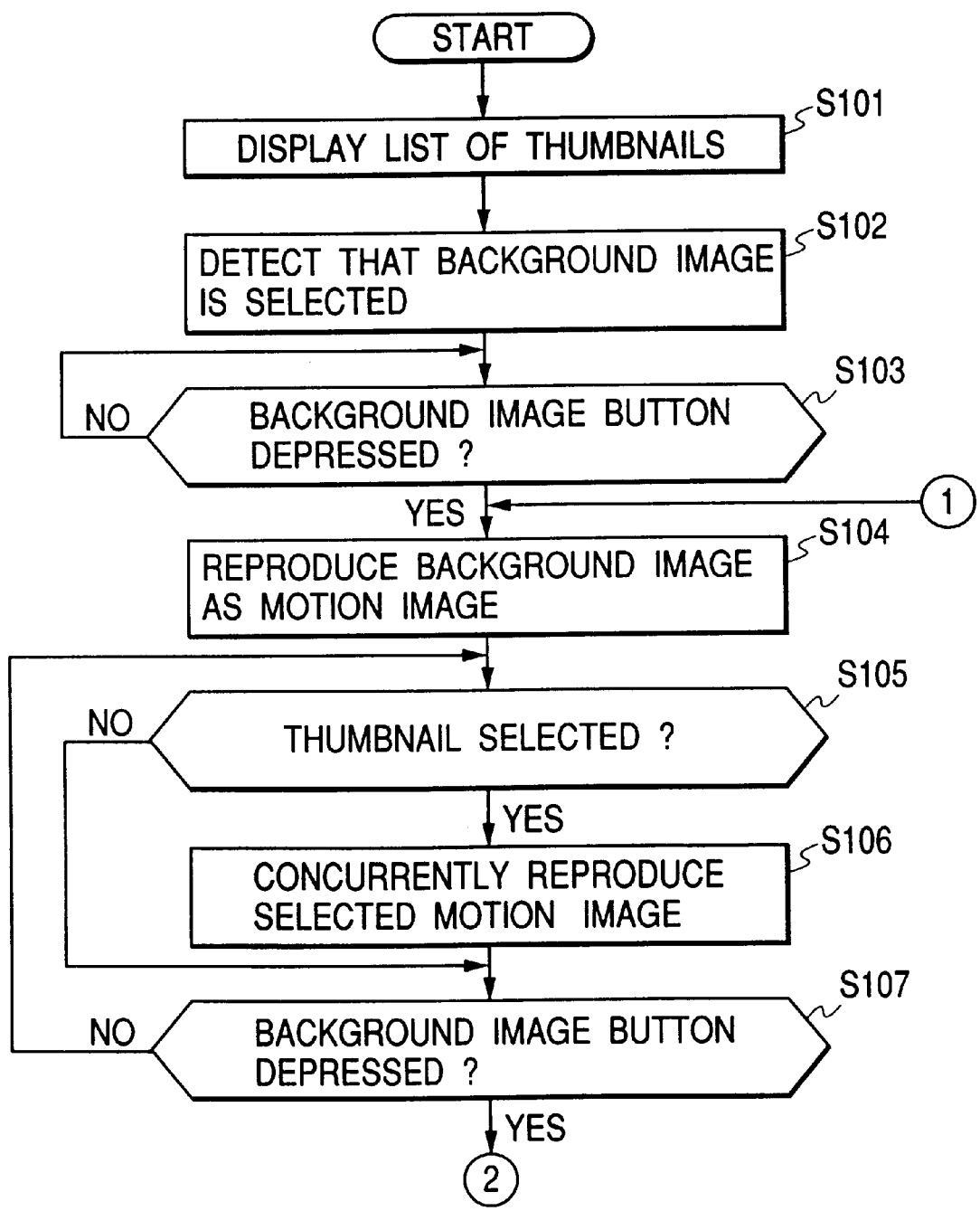
FIG. 33 is a flow chart for explaining the operation of the second embodiment of the present invention.

If the finger dragging the thumbnail P drops it on the background image button 152, the controller 130 detects that the motion image P corresponding to the thumbnail P and the scenario file of the image are selected as a background image (step S102 in FIG. 33).

Figure 40:
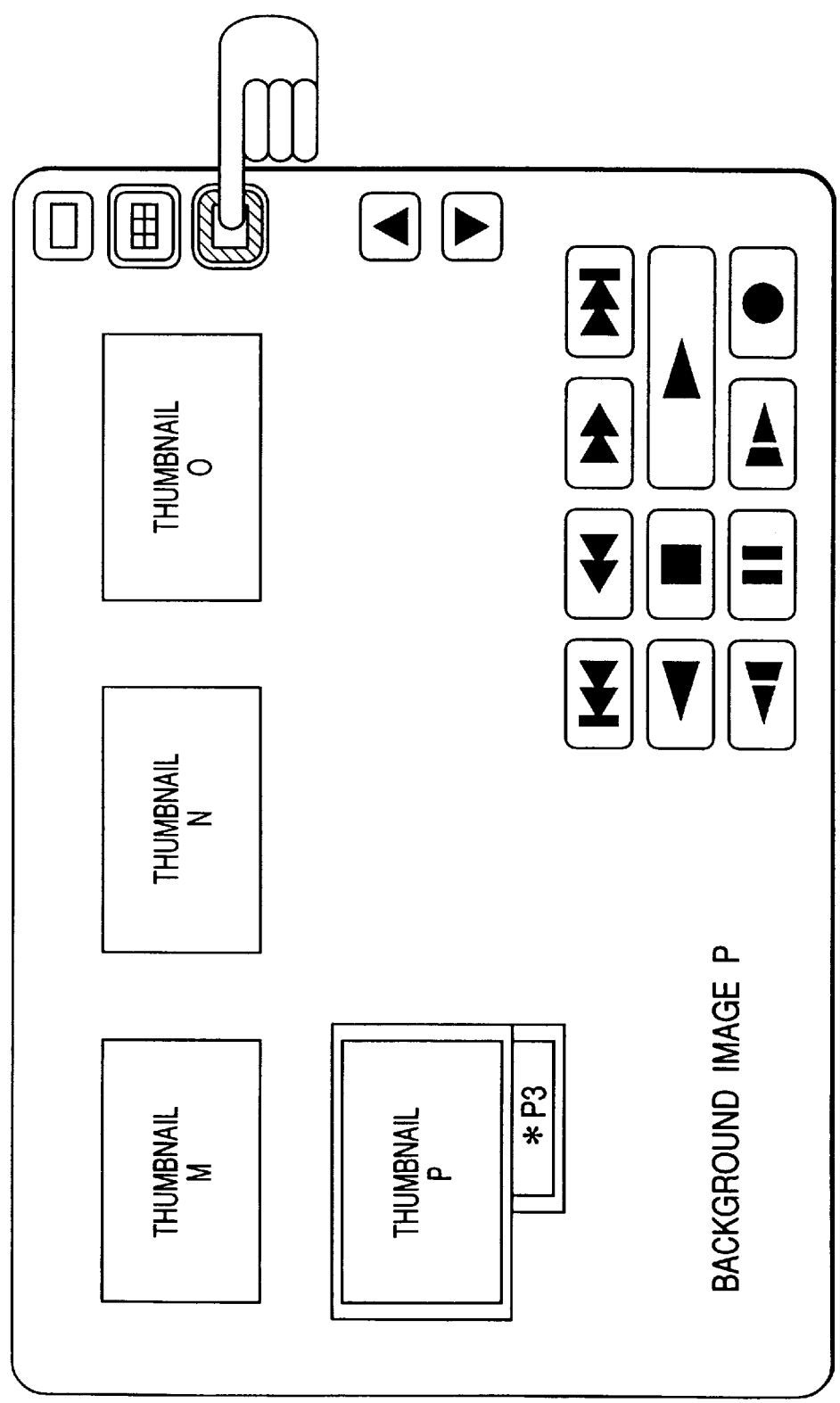
FIG. 40 is a view for explaining a thumbnail screen display for displaying a background image.

If the background image button 152 is touched as shown in FIG. 40 (step S103 in FIG. 33), the controller 130 displays the selected motion image as a background image via the display image forming unit 126 (step S105 in FIG. 33).

A background image is displayed as follows. First, the display image forming unit 126 processes the image data of the motion image P read from the magnetooptical recording medium 122 in accordance with the scenario file P3 and displays the processed data on the liquid crystal display 127.

Next, the display image forming unit 126 synthetically displays the operation buttons and the thumbnails on the motion image P, thereby displaying the motion image P as a background image.

Figure 41:
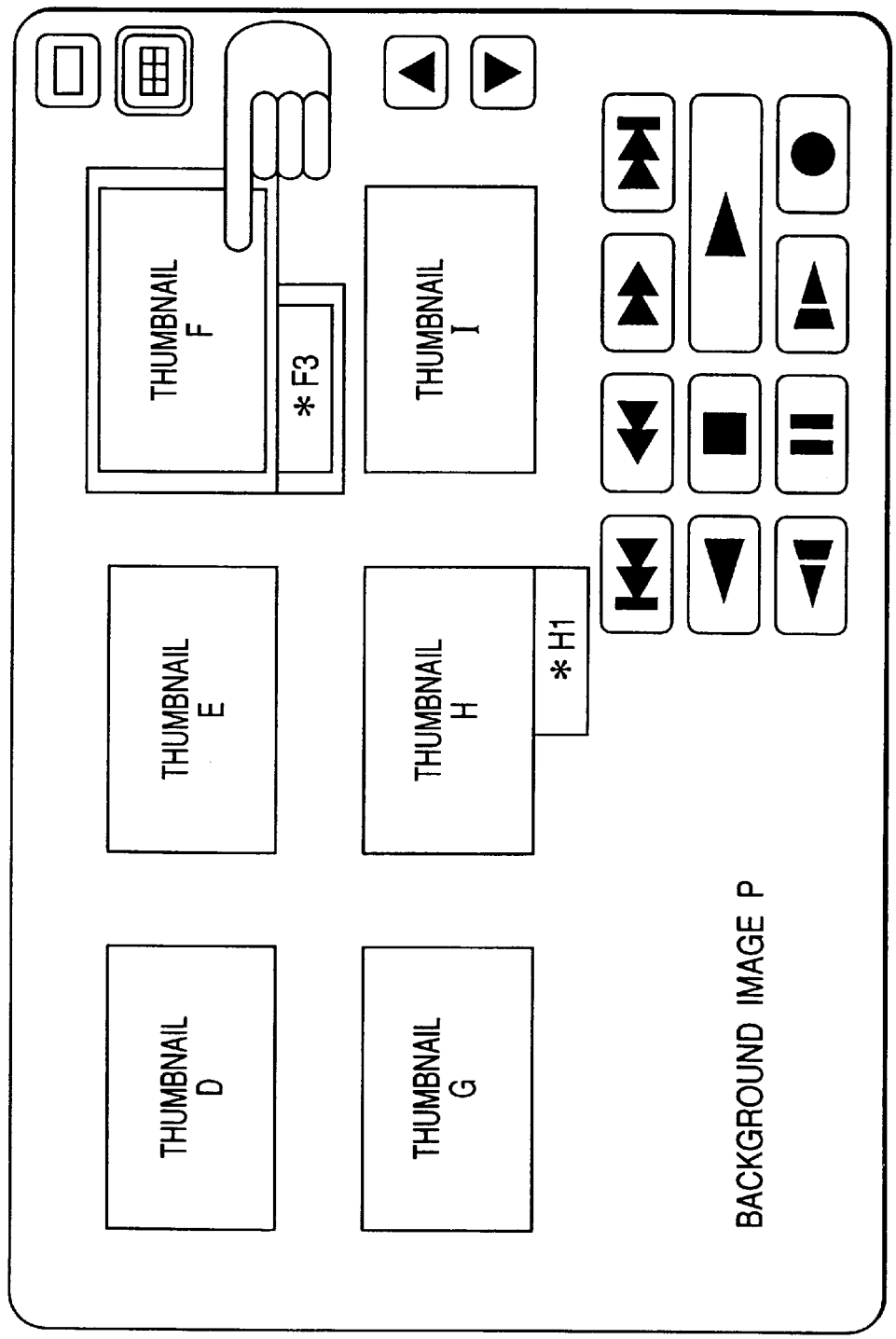
FIG. 41 is a view for explaining a thumbnail screen display for selecting a thumbnail.

If a thumbnail and a motion image corresponding to the thumbnail are selected as shown in FIG. 41 while the motion image P is displayed as a background image (step S105 in FIG. 33), the controller 130 detects the motion image and its scenario file. In this embodiment, the controller 130 detects that a motion image F corresponding to a thumbnail F is to be reproduced by a scenario file F3.

Figure 42:
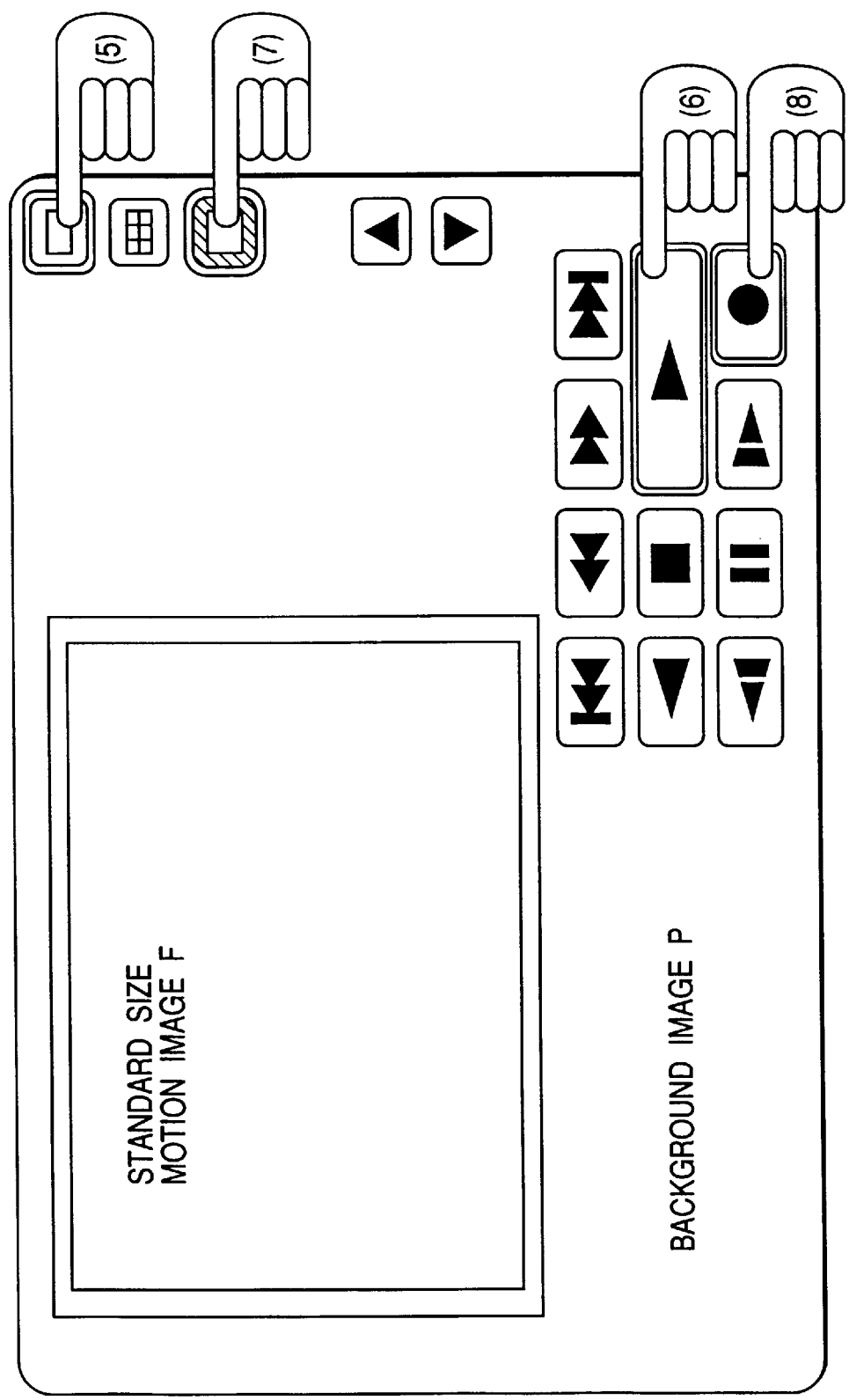
FIG. 42 is a view for explaining a thumbnail screen display for performing concurrent reproduction.

If the standard size button 138 is touched as shown in FIG. 42 (operation 5), the controller 130 changes the screen display from a thumbnail screen display to a standard screen display via the display image forming unit 126. If the play button 147 is touched (operation 6), the controller 130 detects the operation and reproduces the motion image F in accordance with the scenario file F3 via the data access unit 123.

Since the controller 130 has already displayed the motion image P as a background via the display image forming unit 126, the controller 130 concurrently reproduces the motion image F.

The timing of the concurrent reproduction of the two motion images is as follows. That is, when operation 6 in FIG. 42 is performed, the controller 130 restarts the reproduction of the motion image P via the data access unit 123, thereby starting the concurrent reproduction of the two motion images at the same timing.

This concurrent reproduction will be described below.

The file of the motion image P recorded on the magnetooptical recording medium 122 is sought, and the motion image P is read out from the file.

The image data is expanded by the data compressing/expanding unit 124 and stored in the frame memory 125.

Subsequently, the image data of the motion image F is read out and stored in the frame memory 125.

The display image forming unit 126 forms image data on the basis of their scenario files. For example, if the scenario file F3 of the motion image F indicates fast-forward reproduction, the display image forming unit 126 forms image data with a reduced number of frames.

The image data of the motion images P and F are synthetically displayed in a predetermined position.

The above operation is repeated until the reproduction of the motion image F is completed.

As described above, concurrent reproduction is performed by time-divisionally reading the motion images P and F, forming images, and synthetically displaying the images.

When the reproduction of the motion image F is completed, the initial thumbnail images are restored.

Also, since the motion image P as a background is repetitively reproduced and displayed, the motion image P is kept reproduced and displayed even after the reproduction of the motion image F is completed.

The controller 130 repeats the processing in steps S105 and S106 until a touch on the background image button 152 is detected. If another motion image is selected, for example, the controller 130 concurrently reproduces this motion image and the motion image P via the data access unit 123.

Figure 34:
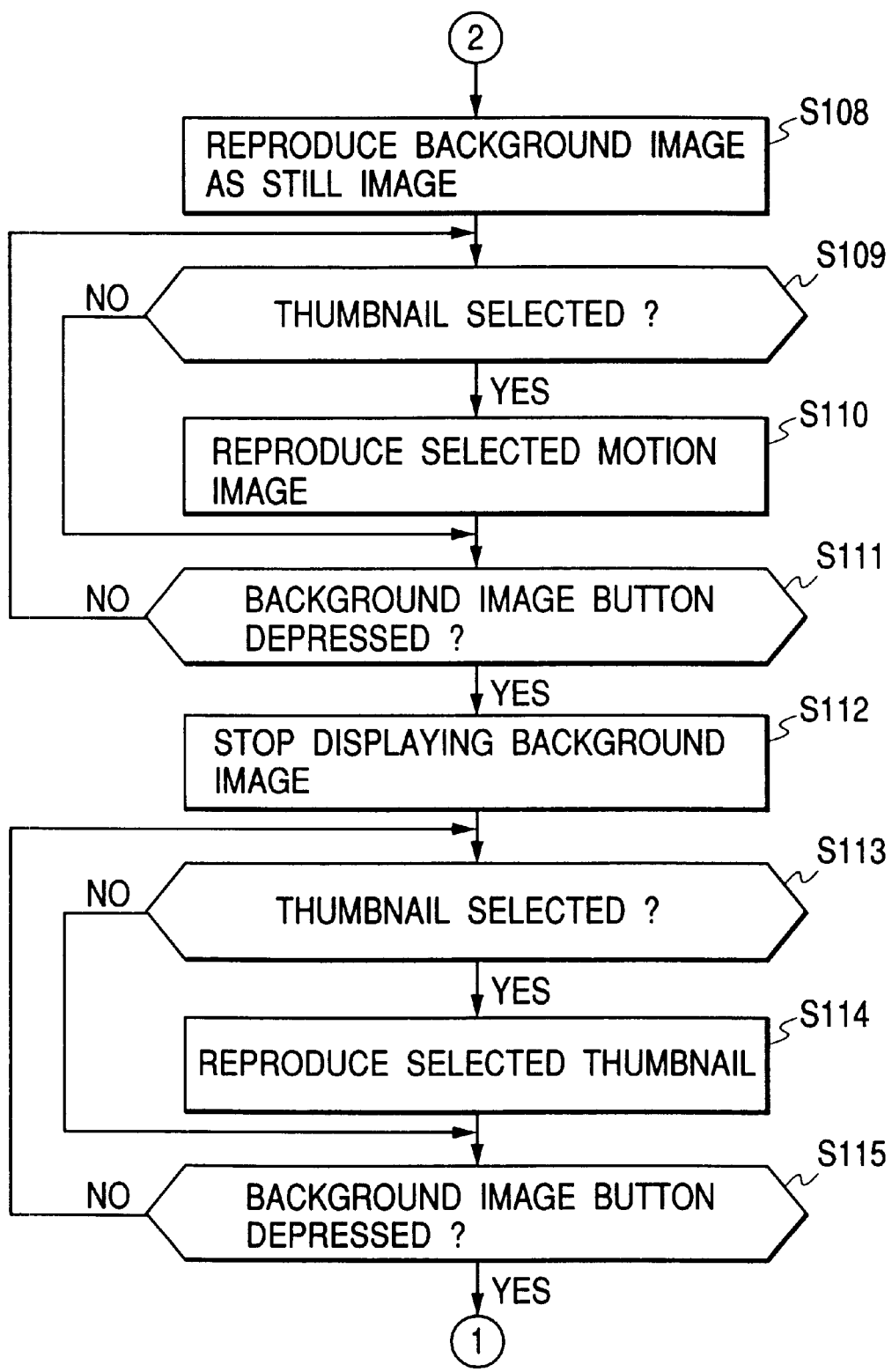
FIG. 34 is a flow chart for explaining the operation of the second embodiment of the present invention.

If the background image button 152 is touched as indicated by operation 7 (step S107 in FIG. 33), the controller 130 changes the reproduction state of the motion image P via the display image forming unit 126 and displays the motion image P as a still image (step S108 in FIG. 34).

As the motion image P, an image usable as a still image is previously stored in the magnetooptical recording medium 122. The data access unit 123 reads the image data. The image data is stored in the frame memory 125 via the data compressing/expanding unit 124.

The display image forming unit 126 displays the image data as a still image P on the liquid crystal display 127. Furthermore, the display image forming unit 126 displays the still image P as a background image by synthetically displaying the operation buttons on it.

If a thumbnail and a motion image corresponding to the thumbnail are selected while the background image is the still image P (S109 in FIG. 34), the controller 130 reproduces the motion image via the data access unit 123 (step S110 in FIG. 34) and synthetically displays the image on the still image P.

Furthermore, if the background image button 152 is touched (step S111 in FIG. 34), the controller 130 stops the reproduction and display of the background image (step S112 in FIG. 34). In this embodiment, a single color of blue is displayed instead of the still image P. Note that a motion image can be selected and reproduced even in this state (steps S113 and S114 in FIG. 34).

If the background image button 152 is again touched, the controller 130 detects the operation and again reproduces and displays the motion image P as a background image (step S104 in FIG. 33).

As described above, each time the background image button 152 is touched, the display state of a background image is changed in the order of "motion image", "still image", and "no display".

The formation of a scenario file which records the presently performed reproduction state and regenerates the reproduction state will be described below.

If the record button 151 is touched as indicated by operation 8 when the reproduction of the motion image F is completed (steps S107, S111, and S115), the controller 130 sequentially records the performed reproduction state as data and newly forms a scenario file for regenerating the reproduction state.

The controller 130 records this scenario file on the magnetooptical recording medium 122 via the data access unit 123. In this embodiment, the controller 130 records information such as the file names of reproduced motion images, the reproduction display positions of these motion images, and the size and shape of the reproduction display regions of the images, as a scenario file.

More specifically, a scenario file Q1 is formed which instructs the controller 130 to reproduce the motion image F in a standard size in accordance with the scenario file F3 and concurrently reproduce the motion image P as a background image in accordance with the scenario file P3.

This scenario file Q1 is stored in the magnetooptical recording medium 122 via the data access unit 123.

Figure 43:
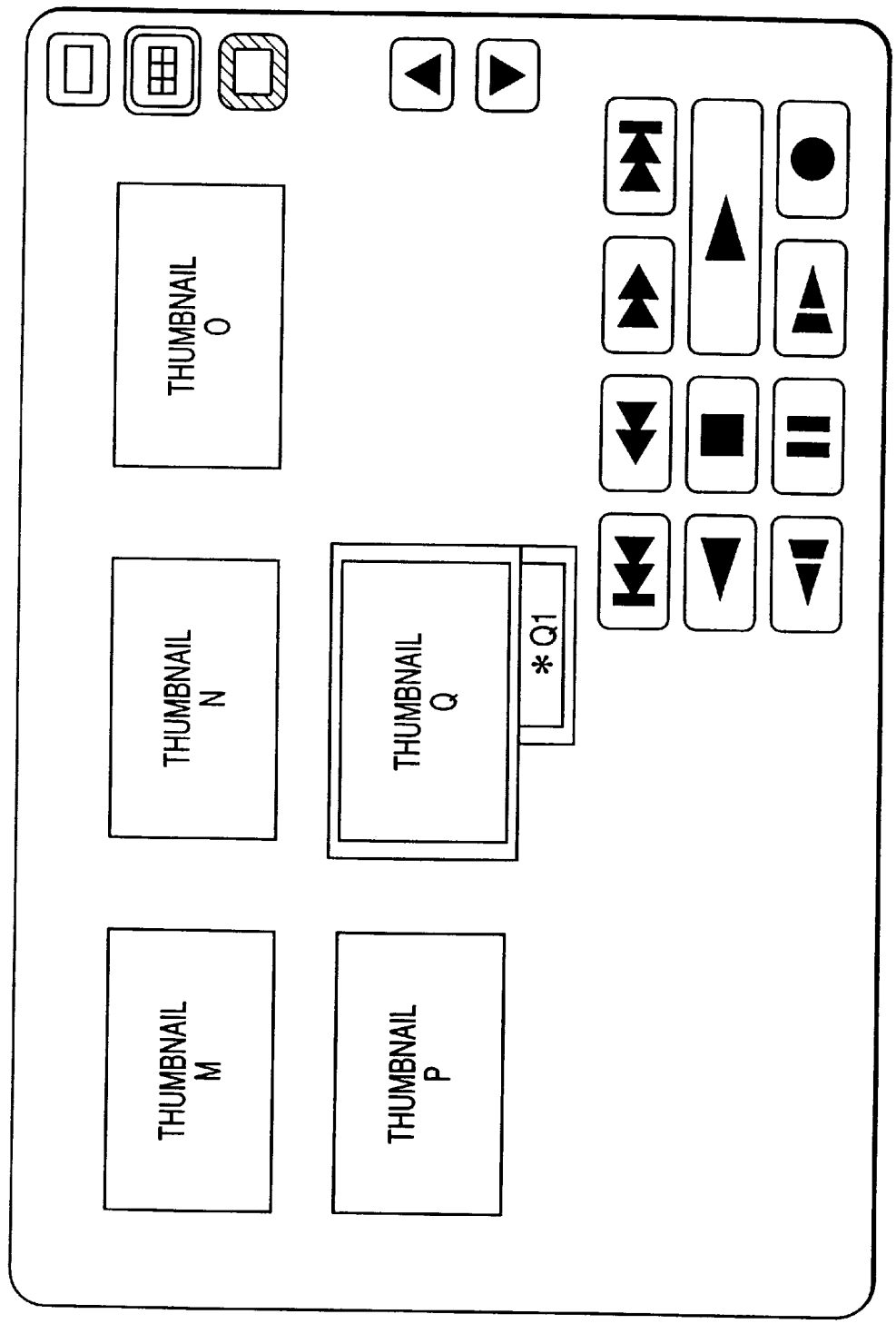
FIG. 43 is a view for explaining a thumbnail screen display for forming a scenario file.

Also, as shown in FIG. 43, the controller 130 additionally displays a thumbnail Q at the end of the thumbnail screen display via the display image forming unit 126. An image used as the thumbnail Q is the same image as the thumbnail F.

Thereafter, when the scenario file Q1 is selected and the play button 147 is touched, the controller 130 reads the scenario file Q1 from the magnetooptical recording medium 122 and regenerates the reproduction state in accordance with the scenario file. In this embodiment, the state shown in FIG. 42 is regenerated.

A change in the shape of a display frame will be described below.

Figure 44:
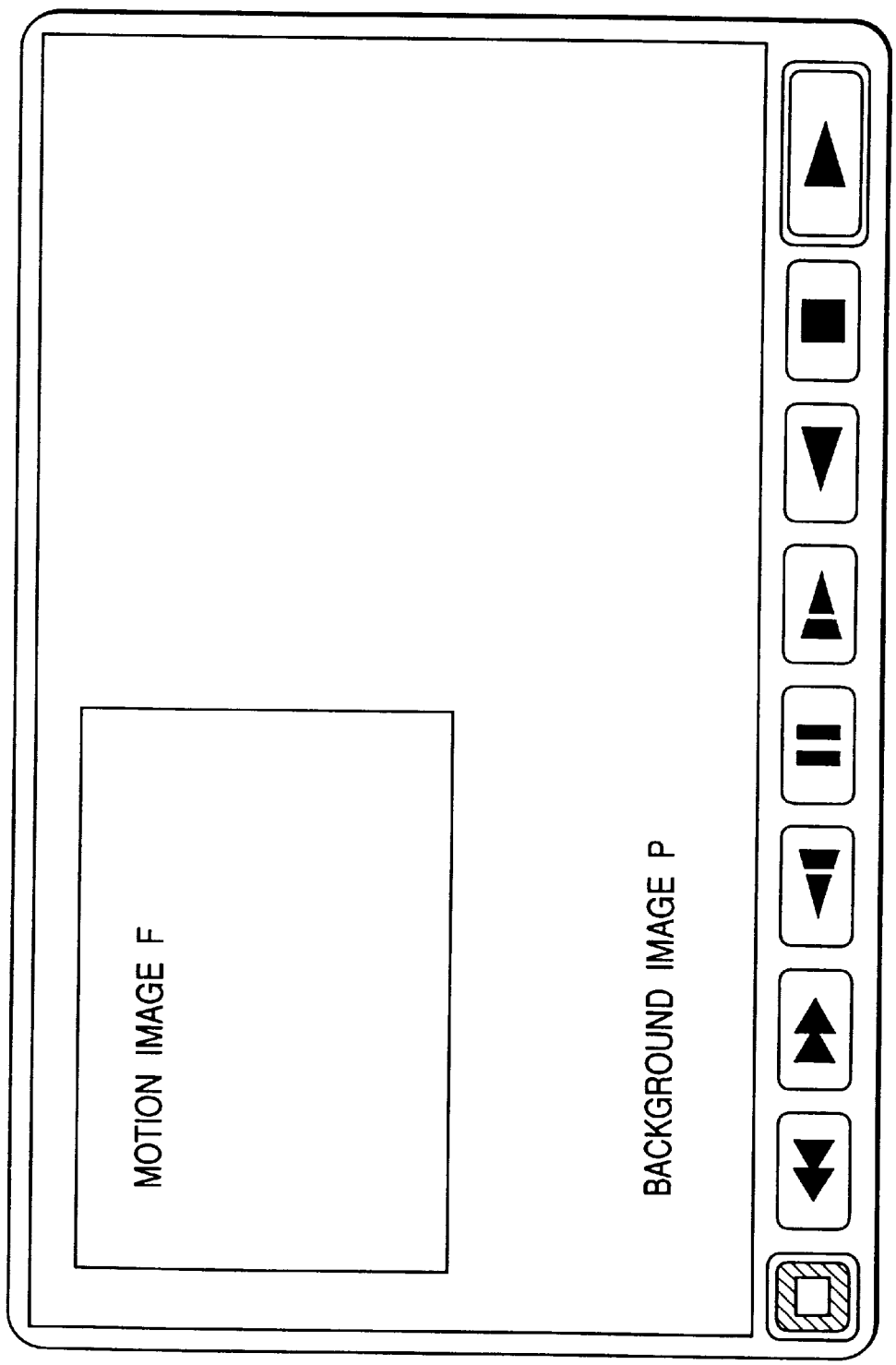
FIG. 44 is a view for explaining a thumbnail screen display for displaying a background image in a maximum size.

As another example of the screen display, a background image as shown in FIG. 44 can also be displayed in a maximum size.

Figure 45:
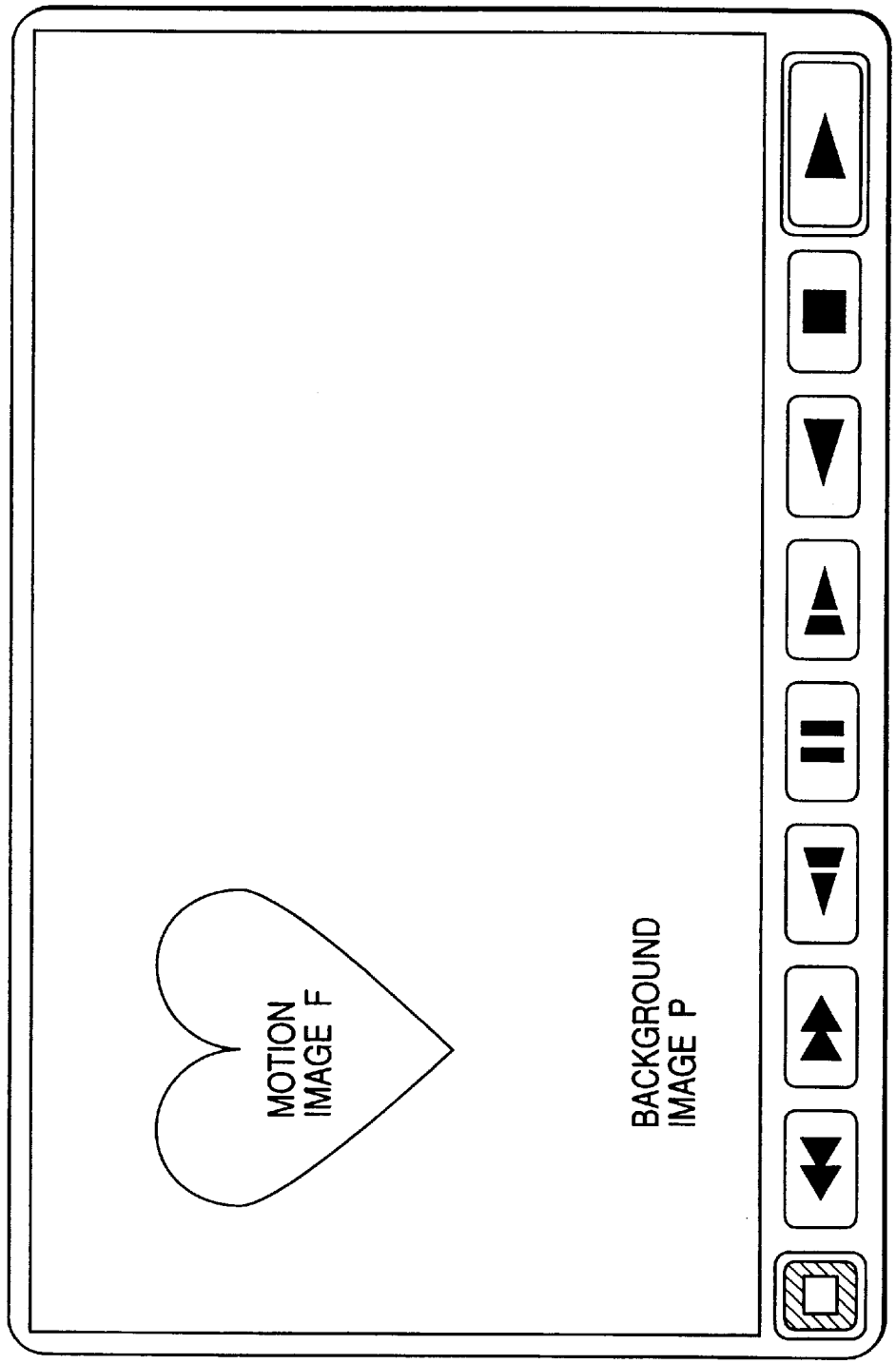
FIG. 45 is a view for explaining a thumbnail screen display for changing the shape of a display frame.

The shape of the display frame of the motion image F at this time is changed from the state shown in FIG. 44 to the state shown in FIG. 45.

Several types of masks for trimming motion images are previously set in the controller 130. Consider a heart-shaped mask in this embodiment. 8-bit data exists per dot for each of R, G, and B both inside and outside the mask. Each dot inside the mask has data FFH FFH FFH, and each dot outside the mask has data 00H 00H 00H. When an AND operation is performed for the mask for each frame constituting the motion image F, an image of the motion image F is extracted into the mask, and an image having 00H is obtained outside the mask.

The display image forming unit 126 replaces 00H outside the mask with the image data of the background image P. Consequently, as shown in FIG. 45, the display image forming unit 126 can form the heart-shaped motion image F and synthetically display the image on the background image P.

Note that the main body 121 includes the camera unit 132 in which the image pickup device 134 photoelectrically converts an image obtained by the taking lens 133 and the A/D converter 135 converts the signal into a digital signal.

The signal processor 136 performs signal processing such as white balance adjustment, gamma correction, and pixel interpolation. The data is compressed by the data compressing/expanding unit 124 via the frame memory 125. The compressed data is recorded on the magnetooptical recording medium 122 via the data access unit 123.

On the other hand, the image data in the frame memory 125 is monitored on the liquid crystal display 127 via the display image forming unit 126.

As described above, the image reproducing apparatus of this embodiment can concurrently reproduce a motion image and a background image. Therefore, it is possible to synthesize and reproduce two motion images like a single motion image and create a new work of images.

Furthermore, since a work once created remains as a scenario file, the work can be immediately regenerated without repeating the reproduction operation.

Figure 46:
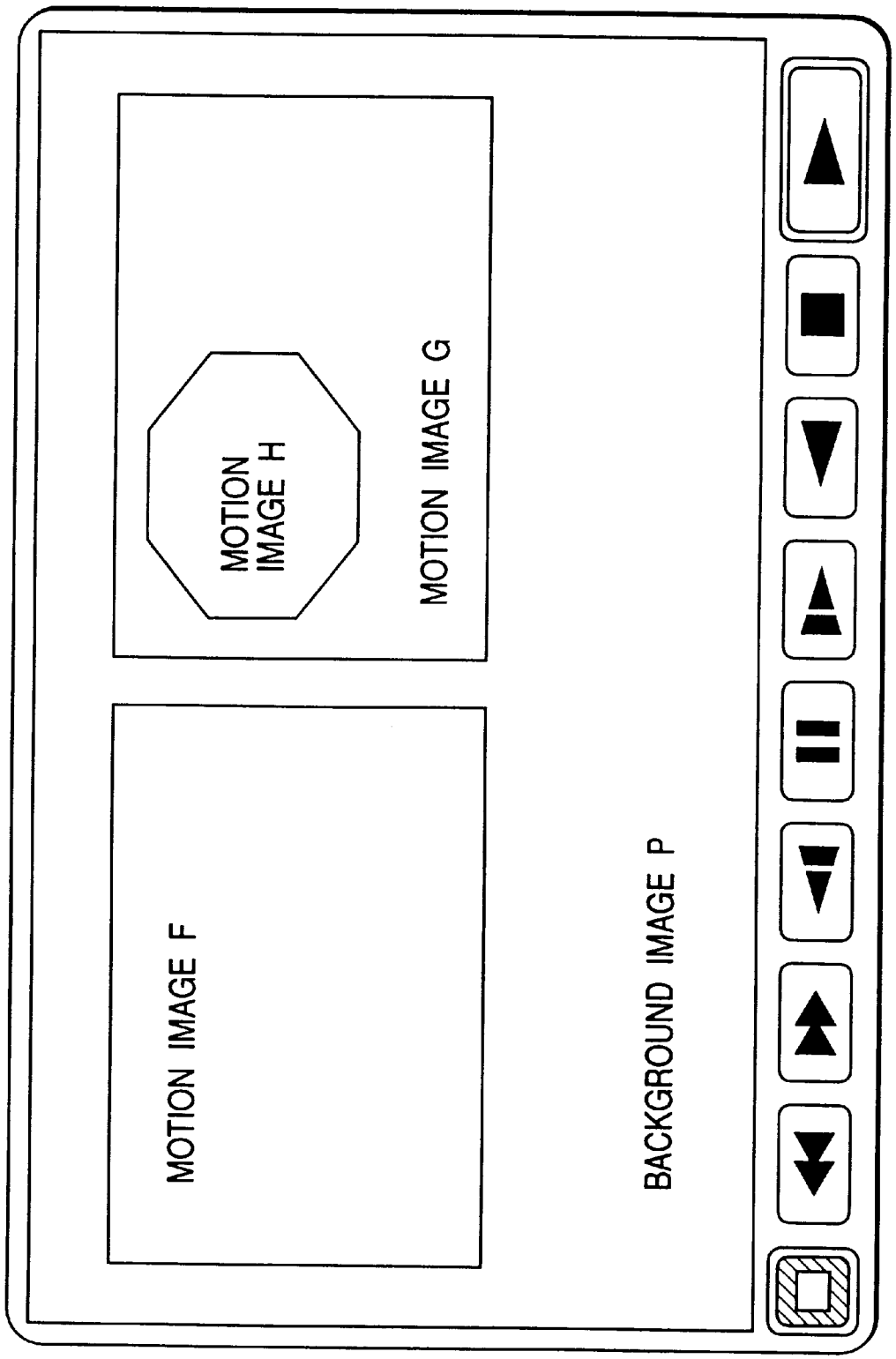
FIG. 46 is a view for explaining a thumbnail screen display having another screen display.

In this embodiment, two motion images are concurrently reproduced and synthetically displayed. However, the present invention is not limited to this embodiment. As shown in FIG. 46, a plurality of motion images can be reproduced and displayed by overlapping them in a nested form.

Also, motion images are started to be concurrently reproduced at the same timing in this embodiment, but the present invention is not limited to this embodiment. Although the reproduction of the motion image P is restarted in the embodiment, motion images can be started to be reproduced at different timings.

Figure 47:
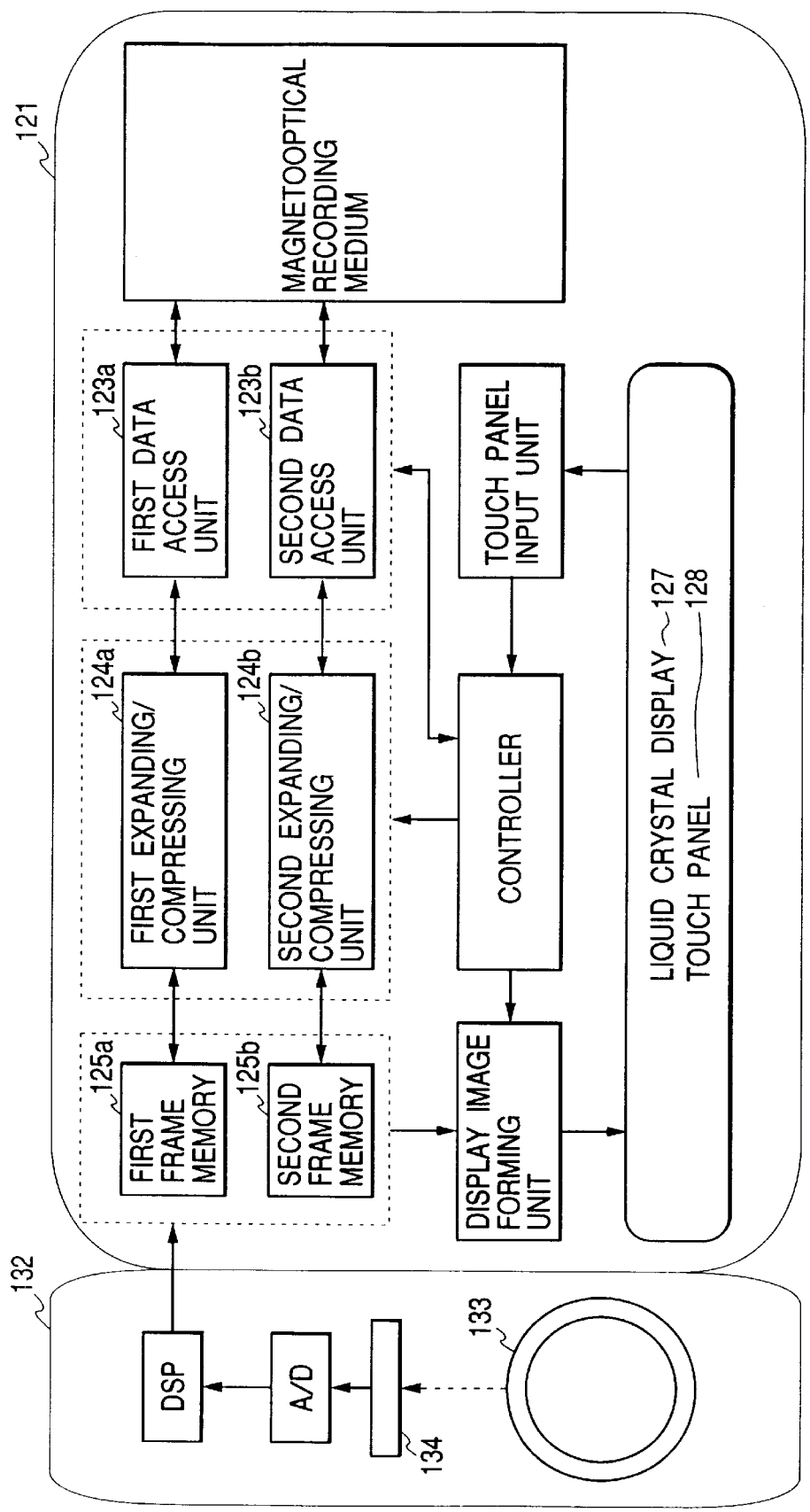
FIG. 47 is a functional block diagram of a modification of the second embodiment.

As another embodiment, as shown in FIG. 47, a plurality of motion images can also be concurrently reproduced at the same timing by using pairs of data access units 123a and 123b, data compressing/expanding units 124a and 124b, and frame memories 125a and 125b. Although a thumbnail is automatically formed for the first scene of a motion image file in this embodiment, the present invention is not limited to this embodiment. For example, it is also possible to allow an operator to select an arbitrary scene of a motion image file and display the selected scene as a thumbnail.

Furthermore, scenario files are recorded together with motion images on the magnetooptical recording medium 22. However, scenario files can also be recorded on another recording medium.

Note that a file name is used as the identification information in this embodiment, but the identification information is not restricted to a file name. For example, information for specifying a motion image, e.g., address information is also usable.

Although a touch panel is used as the operation input unit in this embodiment, the input unit is not limited to a touch panel. For example, operation buttons can be separately provided, or a mouse can be used.

A magnetooptical recording medium is used in this embodiment, but the recording medium is not limited to a magnetooptical recording medium. For example, it is possible to use a magnetic recording medium, an optical recording medium, and a semiconductor recording medium.

What is claimed is:

1. An electronic camera comprising, in one portable unit:
   a photoelectric convertor to convert an image into output electronic image information;
   a recording medium to store the electronic image information as a motion image file;
   a display to display a plurality of symbols respectively representing a plurality of the motion image files on a display screen;
   a selecting device to select some of the symbols displayed by the display in accordance with an external selecting operation;
   a reproducing device to reproduce motion image files respectively corresponding to the symbols selected by the selecting device at the same time in accordance with an external reproducing operation; and
   an array display device to display an array of the motion image files reproduced by said reproducing device on the display screen.

2. An electronic camera according to claim 1, wherein said array display device changes display regions of motion image files to be displayed in the form of an array in accordance with the number of motion image files to be reproduced by said reproducing device.

3. An electronic camera according to claim 1, further comprising a reproduction information storage device to store identification information that identifies a plurality of motion image files to be reproduced by said reproducing device, and wherein said reproducing device concurrently reproduces a plurality of motion image files corresponding to the identification information in accordance with a calling operation for the identification information stored in said reproduction information storage device.

4. An electronic camera according to claim 3, wherein
   said reproduction information storage device stores, in addition to the identification information, a reproduction state indicating a way each of the motion image files is reproduced the last time, and said reproducing device regenerates the reproduction state stored in said reproduction information storage device for each of the motion image files in accordance with the calling operation.

5. An electronic camera according to claim 1, wherein when two symbols are selected by said selecting device, said display device switches display positions of the two symbols.

6. An electronic camera according to claim 1, further comprising a screen operating device to accept an operation on the display screen, and wherein said display device moves a symbol corresponding to a start position of an operation accepted by said screen operating device to an end position of the operation, and, if the end position is present between two symbols on the display screen, displays the moved symbol between the two symbols to rearrange the symbols on the screen.

7. An electronic camera according to claim 6, wherein the operation on the screen is a drag-and-drop operation.

8. An electronic camera comprising, in one portable unit:
a photoelectric convertor to convert an image into output electronic image information;
a recording medium to store the electronic image information as a motion image file;
a display to display a plurality of symbols respectively representing a plurality of the motion image files on a display screen;
a selecting device to select some of the symbols displayed by the display in accordance with an external selecting operation;
a reproducing device to reproduce motion image files respectively corresponding to the symbols selected by the selecting device concurrently in accordance with an external selecting operation;
a reproducing device to reproduce motion image files respectively corresponding to the symbols selected by the selecting device concurrently in accordance with an external reproducing operation; and
a synthetical display device to synthetically display the motion image files concurrently reproduced by the reproducing device by overlapping the images in a nested form on the display screen.

9. An electronic camera according to claim 8, wherein said reproducing device starts concurrently reproducing the motion image files at the same timing.

10. An electronic camera according to claim 8, wherein said synthetical display device displays at least one of the motion image files concurrently reproduced by said reproducing device as a still image by repetitively displaying one predetermined frame or field constituting the motion image file.

11. An electronic camera according to claim 8, wherein said synthetical display device displays a boundary of two motion image files synthetically displayed on the screen in a predetermined form other than a rectangle.

12. An electronic camera according to claim 8, further comprising a reproduction information storage device to store identification information that identifies a plurality of motion image files to be reproduced by said reproducing device, and
wherein said reproducing device concurrently reproduces a plurality of motion image files corresponding to the identification information in accordance with a calling operation for the identification information stored in said reproduction information storage device.

13. An electronic camera according to claim 12, wherein said reproduction information storage device stores, in addition to the identification information, a reproduction state indicating a way each of the motion image files is reproduced the last time, and, when the reproduction state is stored in said reproduction information storage device, said reproducing device regenerates the reproduction state of each of the motion image files in accordance with the calling operation.

14. An electronic camera according to claim 12, wherein said reproduction information storage device stores, in addition to the identification information, a display state indicating a way each of the motion image files is displayed the last time, and, when the display state is stored in said reproduction information storage device, said synthetical display device regenerates the display state of each of the motion image files in accordance with the calling operation.

15. An electronic camera comprising, in one portable unit:
photoelectric convertor means for converting an image into output electronic image information;
recording means for storing electronic image information as a motion image file;
display means for displaying a plurality of symbols respectively representing a plurality of the motion image files on a display screen;
selecting means for selecting some of the symbols displayed by the display means in accordance with an external selecting operation;
reproducing means for reproducing motion image files respectively corresponding to the symbols selected by the selecting means at the same time in accordance with an external reproducing operation; and
array display means for displaying an array of the motion image files reproduced by the reproducing means on the display screen.

16. An electronic camera comprising, in one portable unit:
photoelectric convertor means for converting an image into output electronic image information;
recording means for storing electronic image information as a motion image file;
display means for displaying a plurality of symbols respectively representing a plurality of the motion image files on a display screen;
selecting means for selecting some of the symbols displayed by the display means in accordance with an external selecting operation;
reproducing means for reproducing motion image files respectively corresponding to the symbols selected by the selecting means at the same time in accordance with an external reproducing operation; and
synthetical display means for synthetically displaying the motion image files concurrently reproduced by the reproducing means by overlapping the images in a nested form on the display screen.

* * * * *